United States Patent [19]
Nater et al.

[11] 3,898,438
[45] Aug. 5, 1975

[54] PROGRAMMABLE METHOD FOR DIGITAL ANIMATION APPARATUS FOR ASSEMBLING ANIMATION DATA

[75] Inventors: Robert A. Nater, Granada Hills; William H. Roberts, Corona del Mar, both of Calif.

[73] Assignee: Walt Disney Productions, Burbank, Calif.

[22] Filed: Sept. 28, 1972

[21] Appl. No.: 293,018

[52] U.S. Cl. ............ 235/151; 40/106.3; 40/106.32; 444/1
[51] Int. Cl. ........................................... G06f 15/20
[58] Field of Search ................... 35/1, 28, 49, 53; 40/106.3, 106.32; 444/1; 235/151

[56] References Cited
UNITED STATES PATENTS

| | | | |
|---|---|---|---|
| 754,825 | 3/1904 | Spencer et al. | 40/106.32 X |
| 2,700,250 | 1/1955 | Williams | 40/106.32 X |
| 2,890,535 | 6/1959 | Kenworthy | 40/106.32 X |
| 3,699,318 | 10/1972 | Underkoffler et al. | 444/1 |

*Primary Examiner*—Malcolm A. Morrison
*Assistant Examiner*—R. Stephen Dildine, Jr.
*Attorney, Agent, or Firm*—Fulwider, Patton, Rieber, Lee & Utecht

[57] ABSTRACT

A method programmable on a general purpose digital computer for use in a system for controlling animation devices, such as animated human or cartoon figures. In the system for generating the signals for use in controlling such devices, an input console is used to input digital and analog positioning information for the controlled animation devices. A programmed general purpose digital computer accepts the entered data, formats it properly, adds identifying information and retrievably stores the data. Units of stored data are associated with timing signals which are used to determine the sequence in which the units are later retrieved and used to control one or more animated figures and related functions. By the method of this invention, units of animation data may be moved so as to be stored in association with different timing signals. In this way, animation data may be exactly synchronized with audio tracks and other show or presentation events. Further, by the method of this invention, segments of previously stored data for control of animated figures may be assembled into a complete show or presentation to control different animated figures.

1 Claim, 12 Drawing Figures

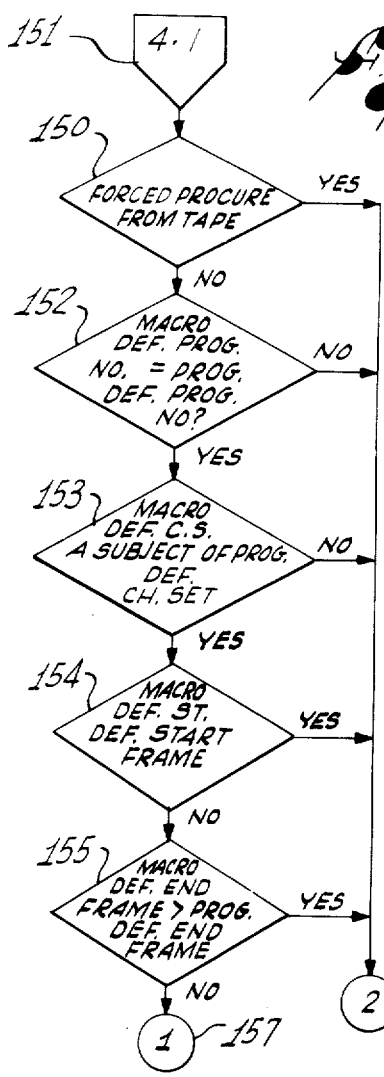
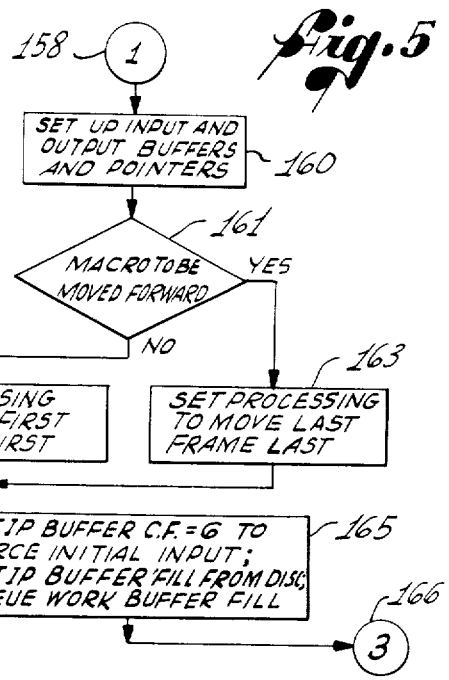
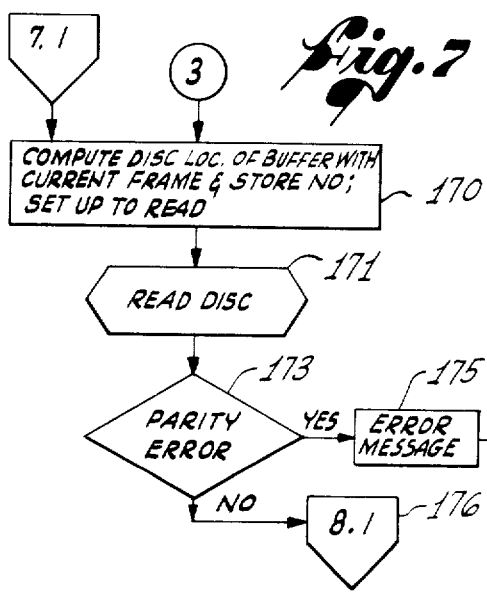
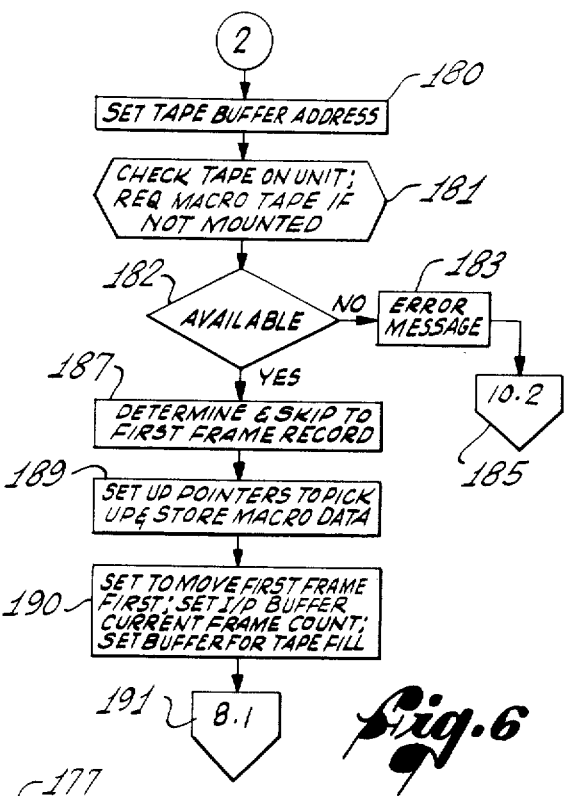

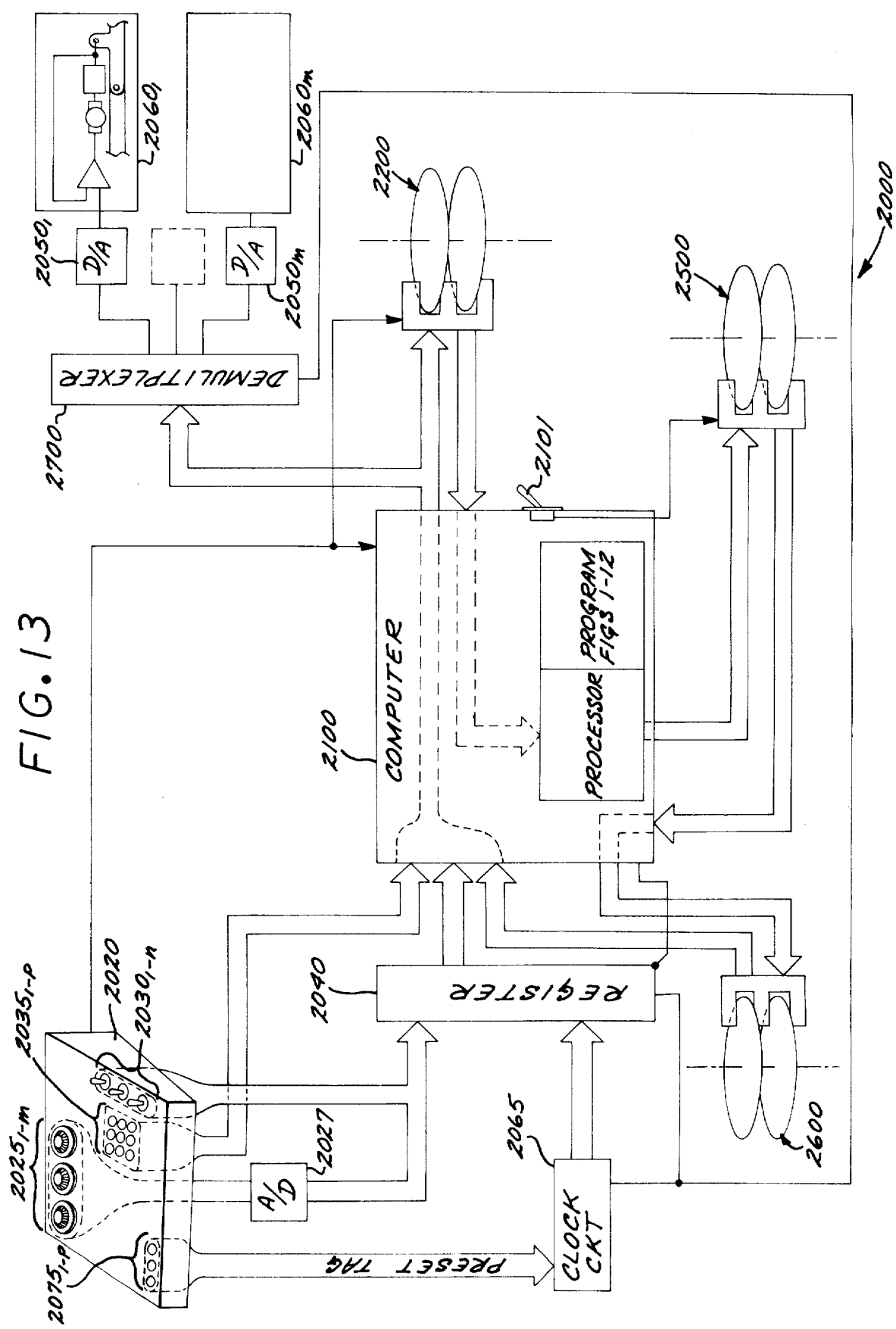

PROGRAMMABLE METHOD FOR DIGITAL ANIMATION APPARATUS FOR ASSEMBLING ANIMATION DATA

II. CROSS-REFERENCE TO RELATED APPLICATIONS

This specification contains disclosure relating to three previously filed applications: "Digital Animation Apparatus and Methods", filed on Jan. 11, 1971, and assigned Ser. No. 105,597, now U.S. Pat. No. 3,767,901; "Monitor System for Sensing Discrete Points", filed on Jan. 11, 1971, and assigned Ser. No. 105,560, abandoned in favor of a Continuation, Ser. No. 422,986, filed Dec. 10, 1973, now abandoned; and, "Method of Indexing and Arranging Data in Storage", also filed on Jan. 11, 1971, and assigned Ser. No. 105,455, now abandoned. Each of the cited applications and the inventions claimed therein are owned by the assignee of this invention, Walt Disney Productions.

III. BACKGROUND OF THE INVENTION

A. Field of the Invention

This invention relates generally to a method of generating, storing and manipulating digital data for selective read-out. More particularly, the invention involves a programmable method for use in a data processing system for assembling and manipulating stored data for the control of animated figures. The stored digital data is utilized in the system programmed according to the invention herein to control such animated presentations or shows as are found at Disneyland, Anaheim, California, and Disneyworld, Orlando, Florida, for the purposes of education, amusement and entertainment.

Broadly, in the use of the system in which this invention is utilized, animation information, both analog and digital, is entered and stored in digital form and selectively read out to control animated figures and associated show functions. Animated figures may be of an extremely complex type such as a completely lifelike human model or a simpler type such as a cartoon character. In each type, however, the figure is moved and positioned in a realistic fashion under control of stored digital data. Frequently, certain controlled motions, such as lip movement, are synchronized with recorded sound tracks.

Associated show functions encompass such controllable items as electric lights, sound levels, stage movement and curtain openings and closings. The overall system is disclosed and claimed in the application referenced above, entitled "Digital Animation Apparatus and Methods".

The system also provides for the generation of such digital data for storage. Animators enter information in both analog and digital form to a central computer via an animator's console. A programmed computer accepts the information, formats it properly and ultimately stores it in disc memories for later playback.

It is thought that a brief description of the type of animated presentation which is controlled by the system in which this invention is utilized would be helpful in understanding the field in which this invention may be employed. A "show" or "presentation", as the term is used herein, refers to one or a plurality of animated figures and/or on-off devices. The figures may be copies of human, animal, cartoon character or fantasy beings. Examples of on-off devices are stage movements, lights, sound, curtain movements, figure eye blinks, water flow, and so forth. A show is generally accompanied by sound tracks, either musical scoring, spoken roles or both.

For example, one presentation with which this invention may be practiced utilizes a figure of Abraham Lincoln. In that presentation, at present, the spectators are seated in an auditorium after which the main lights are dimmed and the stage curtains opened. A life sized figure of Lincoln is seated on the stage. After a musical introduction, the figure rises and delivers a speech, accompanied with head, arm and body movements. The spoken words are synchronous with mouth and body movements. Following the speech, the figure is seated after which the lighting is changed and the musical score continued. Upon conclusion of the presentation, the curtains close, house lights turn on and auditorium doors open. The entire show sequence is controlled automatically by the system of which this invention is a part. The methods of this invention may be used to originally generate and store certain of the data for later retrieval to control the show or to assemble previously stored blocks of animation data to control such a show.

A second type of presentation, for example, utilizes vehicles to transport the viewers. As each vehicle moves through the show, signals indicating vehicle position are sent to the show controlling system. Appropriate animation data is then routed to the general area of the vehicle. In this way, figures are animated in synchronism with the progress of vehicles through the presentation. Again, the entire presentation is controlled automatically.

B. Description of the Prior Art

Many prior art methods have been developed for causing a doll or marionette to move and otherwise imitate living or fanciful beings. Perhaps the earliest of such devices were the movable dolls used by puppeteers. Each puppet usually had a number of degrees of movement. Each degree of movement was controlled by hand by one or more puppeteers. Generally, the puppet was operated in synchronism with a spoken role or a musical score.

Obviously, the number of moving parts is limited by the skill of the puppeteers. The resultant realism and the repeatability of performances is quite limited.

Later, some automation was introduced by provision of movement control by moving cam surfaces. This type of animation control may be seen in U.S. Pat. Nos. 1,409,415 to Schimmel, 1,732,197 to Tadakuma, 2,615,282 to Veltschi and 3,024,551 to Oppenheim. In each, cam followers control, via linkages, movement of the automated figures. While many more movements may be simultaneously and repeatably controlled than in the prior manually operated puppets, many deficiencies still existed. For example, cams are difficult and expensive to produce. And, the resultant animated show is not easily changed. As with the manually controlled puppets, synchronism with spoken roles or music is not easily provided. Finally, it will be readily appreciated that a maximum number of controllable movements is rapidly approached in the practical sense as the complexity of a cam-controlled presentation is increased.

It was long recognized that animation of realistic human figures required life-like synchronized lip and mouth movement. Numerous patents have been issued for various methods for achieving such a result, usually via electrical control. Illustrative of such patents are U.S. Pat. Nos. 2,213,512 to Bailer, 2,247,329 to Deity and 2,890,535 to Kenwarthy. Typically, an electrical signal is derived which is proportional to the desired mouth movement. Actual movement is usually controlled by a solenoid. In many cases, the solenoid actuating signal is derived from the audio signal, thus assuring some synchronism of sound and movement. In at least one instance, that of U.S. Pat. No. 2,213,512 to Bailer, the solenoid actuation signals are derived from a track recorded synchronously with the sound track. The audiomovement sychronization which results from such a system is, at best, imperfect. Moreover, if recognizable synchronization problems occur, existing systems include no provision for changing the time relationship between the audio and the mechanical movement.

The electrical control approach has been extended to actuation of many animation movements in addition to mouth movement. For example, the systems disclosed in U.S. Pat. Nos. 2,700,250 to Williams, 2,867,049 to Brackensey, 3,131,497 to Rogers and 3,277,594 to Rogers et al utilize electrical control of a number of degrees of movement. The patents to Brackensey, Rogers and Rogers et al are presently assigned to the assignee herein, Walt Disney Productions, Inc.

Generally, in electrical control of animated figures wherein a plurality of degrees of movement are involved, a problem is soon encountered as to how to route animation signals to the proper movement actuator. In Brackensey and Rogers et al, signals are recorded in differing frequencies. All signals played back are then fed in parallel to a plurality of filters. This enables proper routing of the various animation signals to only the appropriate movement actuator. In Williams, the electrical connection is direct. That is, signals to control a given movement are only fed to the actuator for that movement. In all of these approaches, however, there is a maximum number of controllable movements. Also, the problem of audio-movement synchronism persists. The complexity and realism, therefore, of controlled animation shows or presentations is limited.

Digital data techniques have also seen limited use in the control of similar entertainment devices. In U.S. Pat. No. 3,461,457 to Kawamura et al, for example, a digital electrical system is disclosed for operating water valves of controllable water fountains in synchronism with recorded music. In the Kawamura et al system, however, the control signals consist of discrete pulses; each pulse operates a single discrete circuit. As a result, only on-off functions can be controlled. And, as mentioned above, on-off circuits cannot be used to attain high degrees of realism in animation devices.

In order to obtain maximum realism in an animated presentation, it is necessary to provide proportional control of each degree of movement of an animated figure. Further, exact synchronism between figure movement and recorded audio tracks must be provided. Unlike any patent of the prior art, these results are obtained by the system of which this invention is a part.

A process or method which has been used previously in the motion picture industry and which is broadly relevant to one aspect of the invention herein is that of stock film footage. In that standard method, a motion picture studio maintains a library of common or stock scenes. Segments of stock footage often appear in motion pictures to provide scene continuity or special interest material.

IV. SUMMARY OF THE INVENTION

In the animation data system in which this invention is used, as described above, an animator enters animation data via a console. The console is provided with a number of variable potentiometric devices and discrete devices or switches. By the proper entries via console control switches, the animator can assign any single console potentiometer to any single proportional control circuit or channel of an animated figure.

Each proportional control circuit or channel to which a potentiometer is assigned controls one degree of movement of the animated figure. For example, any single potentiometer may be assigned via the console controls to receive data to move the thumb of the animated figure's right hand by an amount proportional to the potentiometer displacement.

In actual practice, an animator may work with a single output circuit and potentiometer at a time or a plurality of each. Since the data entered is later merged on a time basis, the choice of number of output circuits or channels to be animated at any one time is arbitrary.

Animation data entered according to the above procedure is stored in combination with retrieval sequence or timing signals. In the preferred embodiment, the timing signals are termed foot and frame numbers. While this number will be defined in detail below, it is sufficient at this point to state that each different foot and frame number defines a frame time in standard 35 m.m. film projection rates, or a time span of 42 milliseconds. There are 16 frames per foot of standard 35 m.m. film length; thus, a given foot and frame number defines a single 42 millisecond time span occurring at a defined length of time after a starting point In the system in which this invention is used, then, an animator enters, via potentiometric devices, data values to be used in positioning one or more variably positionable devices which combine to constitute an animated figure. A timing device generates foot and frame numbers at a constant predetermined rate. As each new foot and frame number is generated, a data value according to the position of the one or more activated potentiometers is stored along with the foot and frame number. Animation data values are later retrieved in a sequence determined by the foot and frame numbers with which they are stored.

Each data value is also stored in association with the address, in the sense used in digital technology, of the variably positionable device or channel number the data value is to control. Accordingly, the system generates and stores units of animation data for use in controlling variably positionable devices which, together, constitute an animated presentation. Also generated and stored with the data units are addresses of devices to be controlled and retrieval sequence signals.

In order for an animated device to move smoothly and realistically, the movement must be controlled by successive data units spaced sufficiently close in time so that the movement will not appear to be jerky or uneven. This is, of course, the same effect overcome in motion picture projection, a succession of still photographs rather than, as here, a succession of discrete data units. It has been found in the practice of this animation system, as in the motion picture arts, that a new data unit should be supplied to a moving animated device about 24 times each second, or at an interval of some 42 milliseconds. With this interval, the resultant movement will appear constant and even to the human eye.

In accordance with this invention, segments of previously generated and stored animation data may be utilized at different times or in different presentations from those originally generated. In accordance with a first aspect of this invention, segments of animation data may be moved within the same show data so as to be retrievable at different times. As explained above, each unit of animation data is stored in association with retrieval sequence or timing numbers termed foot and frame numbers. It may happen in one case that the animator finds it necessary to move or shift a data segment in relation to the retrieval sequence numbers or foot and frame numbers in the same show. In another case, the animator may want to duplicate previously entered animation data in another part of the show. In each case, the methods of this invention will accomplish the desired result.

As an example of the first case, that of a shift of data in relation to foot and frame numbers, it sometimes happens that an animator finds that previously entered animation data controls movement in an animated figure which is slightly out of synchronization with the audio track. This may occur, for example, because of inertial drag of mechanical parts which make up an animated figure's mouth. By experimentation, an animator can determine how much of a lead or lag exists between mouth movement and the audio track. It it is, for example, determined to be one-quarter of a second, the control data must be shifted six frames (six frames is 0.252 seconds). Each data unit then, is shifted ahead or behind in the disc six frames from where it was originally stored.

As an example of the second case, an animated Disneyworld show includes three fanciful lifesized bears, Bubbles, Bunny and Beulah. Early in the preparation of animation data for the show, an animator entered the data necessary to control Bubbles to perform a short dance. Toward the end of the show, Beulah performs the same dance accompanied by different music. Rather than re-entering the data for storage in association with different foot and frame numbers, the animator simply shifted a copy of the previously entered data to storage in association with different foot and frame numbers.

In accordance with a second aspect of this invention, standard segments of animation data for the control of standard animated figures are generated and stored.

At a later time, composite shows of data are assembled by assembling standard short segments. In this way, an animated figure may be controlled by previously generated data segments.

V. BRIEF DESCRIPTION OF THE DRAWINGS

FIG. 4 is a high level flow chart of a portion of the software method according to this invention, including steps controlling tests to determine where the data to be moved is located.

FIG. 5 is a high level flow chart of a portion of the software method according to this invention, including steps of determining whether the data is to be moved forward or backward in the show.

FIG. 6 is a high level flow chart of a portion of the software method according to this invention, including steps of setting up the necessary pointers and addresses to obtain the animation data to be moved from a tape unit.

FIG. 7 is a high level flow chart of a portion of the software method according to this invention, including steps of setting up the necessary pointers and addresses to obtain the animation data to be moved from a disc unit.

FIG. 13 is a block diagram of a system adapted for use with the flow charts shown in FIGS. 1–12.

VI. DESCRIPTION OF THE PREFERRED EMBODIMENT

Figure 1:
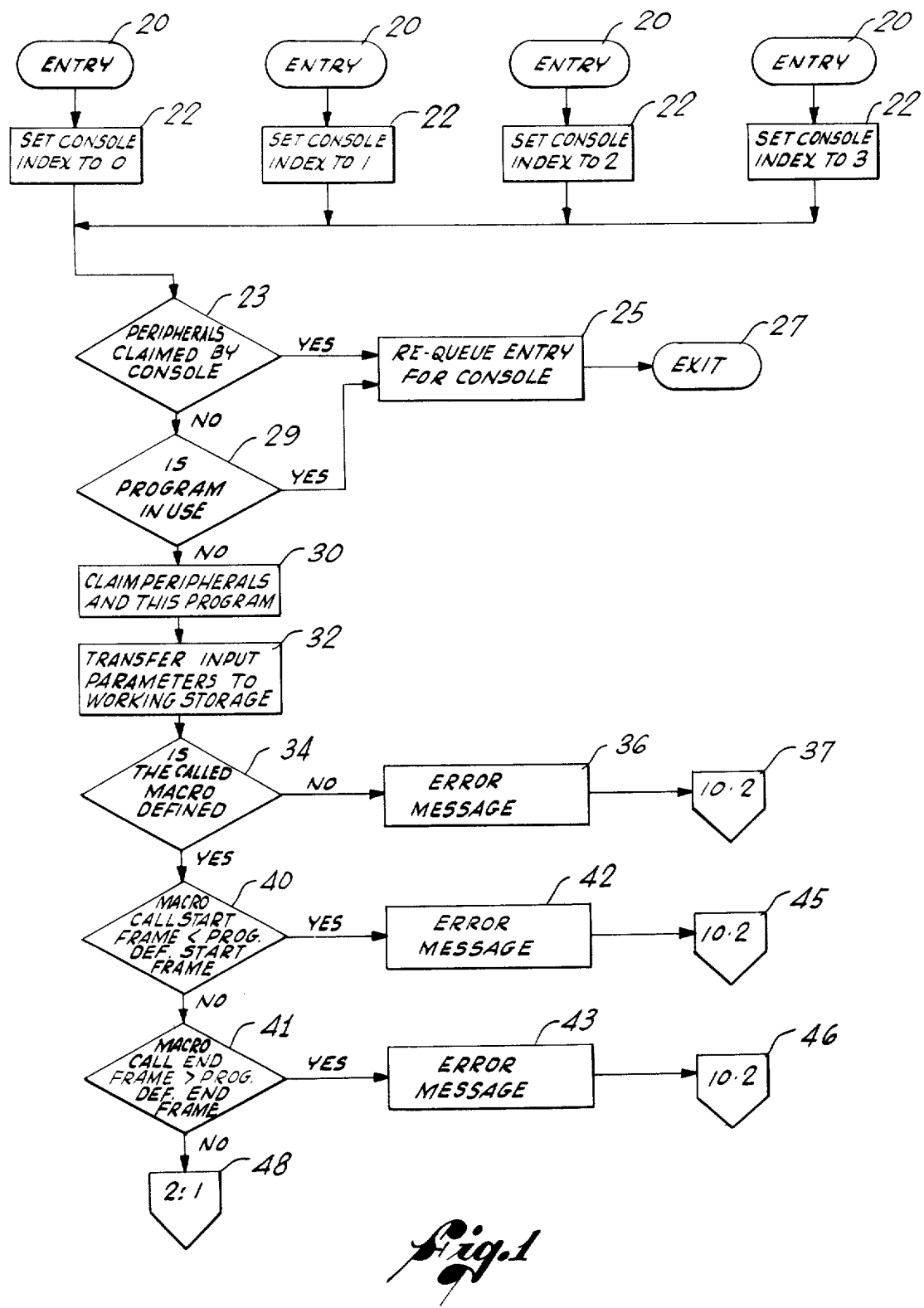
FIG. 1 is a high level flow chart of the entry portion of the software method according to this invention. The steps illustrated are concerned with such itmes as entry of the information necessary to begin the program and certain error routines necessary to the program.

This invention involves a method of assembly and manipulating previously generated digital animation data. While the method of this invention may be practiced with any appropriate hardware system including a general purpose programmable digital computer, it may be best understood by reference to the system in which it is employed in its preferred embodiment.

In order to understand completely the operation of the system in which this invention is employed, reference is made to the application cited above entitled "Digital Animation Apparatus and Methods", now U.S. Pat. No. 3,767,901, which application is incorporated herein by reference as disclosure. In order that this invention may be thoroughly understood, however, a brief description of the system in which the preferred embodiment is practiced will be given.

The system to be described operates in two principal modes, each of which will be briefly discussed.

As shown in FIG. 13, the first system mode to be discussed is that of generation and storage of animation data. Entry of such data into the system, generally designated 2000, is performed by an animator using a specially designed console 2020. The console is provided with a plurality of variable potentiometers $2025_{1-m}$ and discrete devices or switches $2030_{1-n}$. By operation of console control buttons $2035_{1-p}$, the animator can assign any single potentiometer $2025_{1-m}$ to a single output proportional control circuit $2050_{1-m}$, or channel, of an animated figure or figures. For purposes of this description, the animated figure may take the form of a cartoon character, such as Disney's Mickey Mouse or a human figure, such as Abraham Lincoln. It should be understood that this is illustrative only, as the animated device can take any desired form or forms.

Each proportional control circuit in the animated figure to which a console potentiometer is assigned controls one degree of movement of the figure by way of an associated servo loop $2060_{1-p}$. For example, any single potentiometer $2025_{1-m}$ may be assigned via the console control buttons $2035_{1-p}$ to move the thumb of the animated figure's right hand by an amount proportional to the potentiometer displacement.

In actual practice, an animator may select a single output circuit controlled by one potentiometer or a plurality of each. Since the data entered is later merged by the computer on a time basis, the choice of number of output circuits to be animated at any one time is arbitrary.

Similarly, the discrete switches may be assigned to discrete output circuits by the console control buttons. For example, any one of the switches may be assigned to turn a given light or motor on or off.

Accordingly, analog data is entered via potentiometers $2025_{1-m}$, discrete data via switches $2030_{1-n}$ and control data via buttons $2035_{1-p}$ on the animator's console 2020. As data is entered, it is tagged with a time reference, termed a foot and frame number, generated by a clock circuit 2065 which is utilized throughout the system in a register 2040. Each different foot and frame number defines a frame time, or 42 milliseconds. (At normal 35 m.m film rates, one frame time is 41.66 milliseconds. The 42 millisecond figure used herein in an approximation.) The foot and frame number accompanying each unit of entered data determines the exact time and sequence that the unit of data will later be read out of storage to control the animated figure during a presentation or show. The clock circuit 2065 may be preset by entry of the time tag through selected tag buttons $2075_{1-p}$ following which the potentiometer signal is entered in real time or may be incremented by frames.

By use of time tags, an animator may enter data for a single output control circuit at a time. If, for example, an animator tags or initiates a right thumb move entry with the same foot and frame number as an earlier entered left thumb move, the two units of data will be later read out of memory in the show control system mode (to be discussed below) within the same frame time or 42 millisecond time span. The two thumbs would then move at virtually the same instant. In this way, an animator can construct a show wherein hundreds of changes are occurring during the same frame time.

Data potentiometers $2025_{1-m}$ entered via the animator's control console, along with the associated time tag, is converted to digital form by an A/D converter 2027 and transmitted to a computer 2100. The computer accepts each unit of data and adds to it a number indicating the identity or address of the output circuit or channel to which the data unit is directed as selected by buttons $2035_{1-p}$. For example, if a left thumb move entry is received by the computer, it adds a number to each unit of data which is the address of the circuit controlling the left thumb. The computer 2100 then transfers the animation information, accompanying foot and frame number and the address number to a disc storage unit 2200. At the same time, the animation data and address number is routed by the computer, through a demultiplexer 2700 to circuits $2050_{1-m}$ which control movement of an animated figure through servo loops $2060_{1-m}$. If the address transmitted is that of the circuit controlling the figure's left thumb, for example, the left thumb is made to move to a position indicated by the entered data.

While generating data in the first system mode, then, the figure moves in response to entered data. This is for the purpose of aiding the animator and is not absolutely necessary for generation and storage of animation data.

Similarly, operation of a switch $2030_{1-n}$ on the control console 2020 is communicated to the computer with an accompanying foot and frame number. The switch may be assigned via console control buttons $2035_{1-p}$ to open curtains, turn on lights, switch on audio speakers, and so forth. As with animation data, the computer stores the discrete signal and accompanying foot and frame number with the address of the circuit or channel to be controlled, as, for example, the curtain motor, in a disc storage unit. At the same time, the discrete data is transmitted by the computer to the output circuit designated so that the animator may instantaneously see the results of his entry.

At the end of an animation task, the disc storage unit 2200 contains hundreds or thousands of units of animation data, each unit associated with a foot and frame number and an assigned address. Because data may have been entered at different times for the same output circuits during the animating task, data units with identical foot and frame numbers and addresses may be distributed throughout the disc in preassigned locations.

In response to a merge instruction entered via the animator's console, the computer 2100 executes a program which effectively sorts data on the disc by foot and frame number. The result, data sorted by ascending foot and frame number, is read into a further storage device, such as a tape or disc unit 2500.

The further storage device 2500 then contains all animation data and associated foot and frame numbers and addresses entered during a single animating task. If the device is, for example, a tape, it may be removed from its transport and saved until the animation is to be continued at a later time.

When the animation is continued, the prior data is merged with data entered during the next successive animation task. This data merge is repeated from task to task until animation data for a complete show is assembled in a single storage device.

When the single storage device 2500 has been finally loaded with animation data, the first mode is nearly complete. Via a command entered through the computer terminal 2101, all animation data, associated foot and frame numbers and addresses are loaded on a disc storage unit 2600. Under software control, a directory track for data indexing purposes is written on the disc. The disc is then ready to control an animated show via the second principal system mode, the show control mode. The loaded disc is transferred to the input of a show control unit or demultiplexer 2700, a data retrieval device disclosed in the above referenced application. Thereafter, animation data is selectively retrieved according to address to control the respective servo loops $2060_{1-m}$.

In addition to loading a show control disc and writing a directory track therein, the final disc-load program also compresses the data and inserts updates every thirty frames.

Data compression involves stripping out data entries which remain constant. This is, of course, done to conserve disc space. In exception to the data compression, however, is the thirty frame update. This procedure inserts data units to ensure that every output circuit receives data (updated) at least every thirty frames. The purpose of the thirty frame update is to control the mechanical output devices to maintain their position where their data inputs are unchanged.

To practice the second principal mode, discs loaded with data during the data generation mode are physically removed from the computer and connected to a show control unit. Essentially, the show control unit is a subsystem for retrieving animation data from discs in accordance with externally supplied or internally generated timing signals and transmitting the retrieved data to the animated presentation.

The most common external source of timing signals is a tape playback unit which provides successive foot and frame numbers. This unit plays a tape having a timing track and one or more audio tracks. Timing track signals, consisting of foot and frame numbers, are supplied to the show control unit. The audio signals, synchronized with the time signals, are routed to a speaker in the area of the presentation.

The show control unit receives the foot and frame numbers, searches the data discs for data having a corresponding foot and frame number and outputs the data serially over lines connected to the controlled devices in the animated presentation. In this way, data is delivered to the animated figure in synchronism with the sound track, regardless of minor speed variations in the tape playback unit.

Foot and frame numbers may be received from sources other than the tape playback unit. In a second timing mode, synchronizing signals are transmitted from the show area. This mode is utilized in those instances where viewers are carried through the show asynchronously and various segments of the total show must be played when viewers reach a predetermined position. The third timing mode utilizes an internal counter to supply sequential foot and frame numbers.

In each of the three timing modes, however, data is read from the discs in response to an externally supplied foot and frame number. This data is then transmitted to the animated figures and the discrete devices. Data sequentially received in this fashion animates the figures and operates the various discrete devices, such as lights and curtains. In this way, a complete animated presentation is controlled by digital data techniques.

The method of this invention is utilized in the first mode described above, that of storing animation data via the animator's console for later retrieval. Prior to a detailed description of the flow charts of the accompanying drawings, certain definitions necessary to an understanding of the program will be given.

The program disclosed herein, in its preferred embodiment, is termed Macro Call. The animation data segments previously generated and defined which are to be moved are termed, in the program source listing and on the flow charts, macros. The definition, then, of a macro is a uniquely definable block of animation data which may be moved, shifted or copied by an animator in creating a show or presentation.

In the program of this invention, a macro is defined by the following four parameters: Program Number; Channel Set Number; Start Foot-Frame; and, End Foot-Frame.

The Program Number identifies the show and subshow that contains the desired data. In the nomenclature adopted in the program of this invention, a show is an animated presentation comprising 1000 or less controlled functions or channels. An example of a controlled function or channel is the proportional device that controls movement of the right thumb of an animated figure. For details concerning the hardware devices involved in a single controlled function or channel, reference is made to FIG. 19 and the accompanying description in the above referenced application entitled "Digital Animation Apparatus and Methods". A subshow comprises 250 or less controlled functions or channels. A maximum of four subshows, then, comprise a show. Thus, a macro, or segment of animation data, may be found in the Mickey Mouse Review, show number 4, subshow number 2. The program number, then, in which the macro would be located, in this example, would be 042.

The Channel Set Number is, as the name implies, an identifying number given to a set, or arbitrary group, of channels or controlled functions with which an animator is currently operating. A channel set may comprise one or 25 or more channels. It need only be a subset of the show. For example, channel set number 13 of the above show 042 could comprise two channels, Number 88, mouth open, and Number 93, torso twist. The set, then, is simply an identification of less than the whole of the controlled channels.

Start Foot-Frame is a number of the frame with which the first unit of animation data is located. As explained above, foot and frame is a timing scheme used in this invention which is borrowed from the motion picture industry. There are sixteen frames to each foot; each frame is 42 miliseconds in length of time. Thus, an example of a Start Foot-Frame may be 10 feet, 10 frames, which would mean the animation data stored in association with the foot and frame number beginning 7.098 seconds after the start of the show.

End Foot-Frame is, of course, the number of the frame with which the last desired unit of animation data is stored. Continuing the above example, an End Foot-Frame could be 20 feet, 10 frames. In this example, the macro would include the data stored in association with the foot and frame number beginning 7.098 seconds after the start of the show to, and including, data stored in association with the foot and frame number beginning 14.616 seconds after the start of the show.

Thus, a macro may be defined as Macro Number 042-13-10, 10-20, 10. This defines precisely a segment of animation data units, each unit consisting of an eight bit word of positioning data linked to an eight bit address word.

In order to call the program of this invention, termed calling Macro Call, the parameters of Macro Call must be supplied to the computer via the animator's console. The purpose of the parameters is to define the macro to be retrieved and where the macro is to be inserted. The four required parameters are: Macro Number; Channel Set Number; Start Foot-Frame; and, End Foot-Frame.

Macro Number is, of course, the number defined above. It identifies the animation data to be obtained elsewhere for moving. An example of a Macro Number is that given above, Number 042-13-10,10-20, 10.

Channel Set Number identifies the channel or channels in the show currently being generated into which the macro will be inserted. Note, then, that two channel set numbers have been defined: the channel set number of the macro, contained in the macro definition, and the channel set number of the new show into which the macro is to be inserted.

Start Foot-Frame and End Foot-Frame is as described above, except that the numbers refer to the new show which is being generated.

As may be readily appreciated, it is necessary that the macro footage defined in the Macro Definition must be exactly the same length as the footage specified in Macro Call. That is, if the macro consists of five feet of data (e.g., 340 feet, zero frames to 345 feet, zero frames), the new show must have exactly the same length of footage, five feet, to allow for insertion of the macro.

The steps of this invention, then, allow for a change or shift of data within the same show or transfer of previously defined data segments to a new show. As may be readily appreciated, an entire animated show could conceivably be constructed from previously generated macro segments.

The discussion following will refer to the seven sheets of drawings depicting high level flow charts of the Macro Call program. While a substantial effort has been made to summarize standard steps in the flow charts, there are many steps which involve an operation or operations which would be readily understandable to one skilled in the programming arts. The following discussion, then, will not treat all steps with equal detail.

The Macro Call program of this invention is entered via entry steps 20 to console index steps 21. Index steps 22 control the setting of a software index number corresponding to the animator's console which called the program. In the preferred embodiment of this invention, up to four animator's consoles may be in use at any one time. While any one of the four consoles can call the program, the program can only operate on data supplied by a single console at one time. The console index, then, is a software index used by the program to identify which data belongs to which console.

After the console index is set, step 23 determines whether peripheral devices, such as discs and tapes, have previously been claimed by another program. As will be explained hereinbelow, it will be necessary for the Macro Call program to utilize various memory storage locations for the entered and calculated data. Step 23 determines upon entry of the program whether the needed peripheral devices are available.

If the peripheral devices are found to have been previously claimed, control is transferred to step 25 which sets up a queue procedure for that console. A wait light is turned on on the console. It remains on until the queueing procedure has reentered the program and the Macro Call procedures are completed. After the queue procedure is set up, the program is exited via step 27.

If the need peripheral devices are found to be available, control is transferred to step 29 which determines whether the Macro Call program is in use, that is, has been called by another animator's console. If the program is found to be in use, it is exited via queueing step 25 as described above.

If the Macro Call program is not found in use, step 30 claims the necessary peripheral devices and transfers control to step 32 which places the input parameters in working storage, a previously defined portion of core. As explained above, the input parameters, entered via the animator's console, are Macro Number, Channel Set Number, Start Foot-Frame and End Foot-Frame.

Step 34 then determines whether the called macro had been previously defined. As described above, the called macro is identified by four parameters in a Macro Definition. If not, the program cannot proceed and it is exited via error message step 36 and connector 37. The appropriate error message in this and each of the following cases is transmitted to the system Teletype and printed according to the steps of FIG. 12, as will be described below. Except for the description of FIG. 12, the error exiting will not be again described in detail.

Steps 40 and 41 determine whether the Macro Call Start Foot-Frame Number is less than the present program definition start frame or greater than the present program definition end frame. When the animator's console is signed on and an animating task begun, a current program definition is entered. It consists of a channel set and the desired length in feet and frames of the show to be animated. Typically, the starting foot and frame number is zero feet - zero frame. The maximum allowable number of feet in a show is 4096 feet. At the show speed of 24 frames per second, then, a maximum show running time is 45.5 minutes.

If the tested conditions are found by steps 40, 41 to not be met, the program is exited via error message steps 42, 43 and connectors 45, 46.

If the tested for conditions are met, control is transferred to macro definition step 50 (FIG. 2) via connectors 48, 49. It will be recalled that only the computer-assigned macro number was entered as one of the Macro Call parameters. Step 50 controls the computer to set up to go to an index on disc to read the four parameters discussed above which were entered during the Macro Definition.

Step 51 controls a reading of the Macro Definition parameters. In this and all future disc and tape read and write steps, the flow charts show no details. It is believed such tasks are well within the skill of the average programmer. However, the source listing which forms part of this specification includes the various read and write instructions.

Following the reading of the macro definition from the disc as controlled by step 51, steps 53 and 54 make the usual determination of whether a parity error occurred in the reading and, if so, the program makes the usual error message exit via connector 55.

If no parity error is found, step 57 transfers the macro definition to working storage, an allocated buffer area in core. At this point, then, the four parameters that define a macro, Program Number, Channel Set Number, Start and End Foot-Frame, are contained in core. No macro data has yet been inputted. Moreover, no determination has yet been made whether the macro animation data is contained in a storage device to which the computer currently has access.

Step 59 determines whether the macro definition numbers will fit into the working storage. The allocated area in core is shared by the four consoles; the space available to each console is dynamically allocated. If all four consoles, within short succession, attempt to use the Macro Call program, one of the later consoles could find insufficient space in the working storage. In that event, the program makes the usual error message exits via steps 60 and 61.

Steps 63, 64 and 65 control a determination of whether the necessary channel set has been defined. If not, the usual error message exit is controlled.

Following a finding that the necessary channel set is defined, control is transferred to step 68 which determines whether the number assigned to the defined channel set is greater than 5000. This refers to an alternate procedure for generating a single-channel macro and will be discussed below. For the discussion at this point it is assumed tha the channel set number entered to call the Macro Call program is less than 5000 and control is transferred to step 70.

Step 70 controls a determination of whether the channel set defined in the Macro Call entry is on the work tape. The work tape is the name given herein to the tape which contains prior and present animation entries. If, as will be seen, the channel set is found on the work tape, a tape read routine is set up. If it is found on disc, a disc read routine is set up. The purpose of each, however, is simply to input the channel set into core which was specified in the Macro Call entry. It should be noted again that there are, at this point, two channel sets: the first channel set number was found in the Macro Definition pointed to by the Macro Number in the Macro Call entry; the second channel set number was found in the Macro Call entry itself. The first channel set number refers to the source of the macro data; the second channel set number refers to the location to which the macro will be transferred.

If step 70 determines the channel set defined by the Macro Call entry is on the work tape, control is transferred to step 72 to determine if the work tape is mounted on a tape unit. If not, steps 73 and 75 transmits an error message which requests the computer operator, via a Teletype, to mount the tape. Thereafter, the program is exited via connector 77.

If the tape is found to be on the tape unit, step 76 controls a set up to read the channel set from the tape. Steps 79, 81 and 82 determine if a tape read error occurred, as usual. Thereafter, control is transferred to initial step 85 of FIG. 3.

Figure 2:
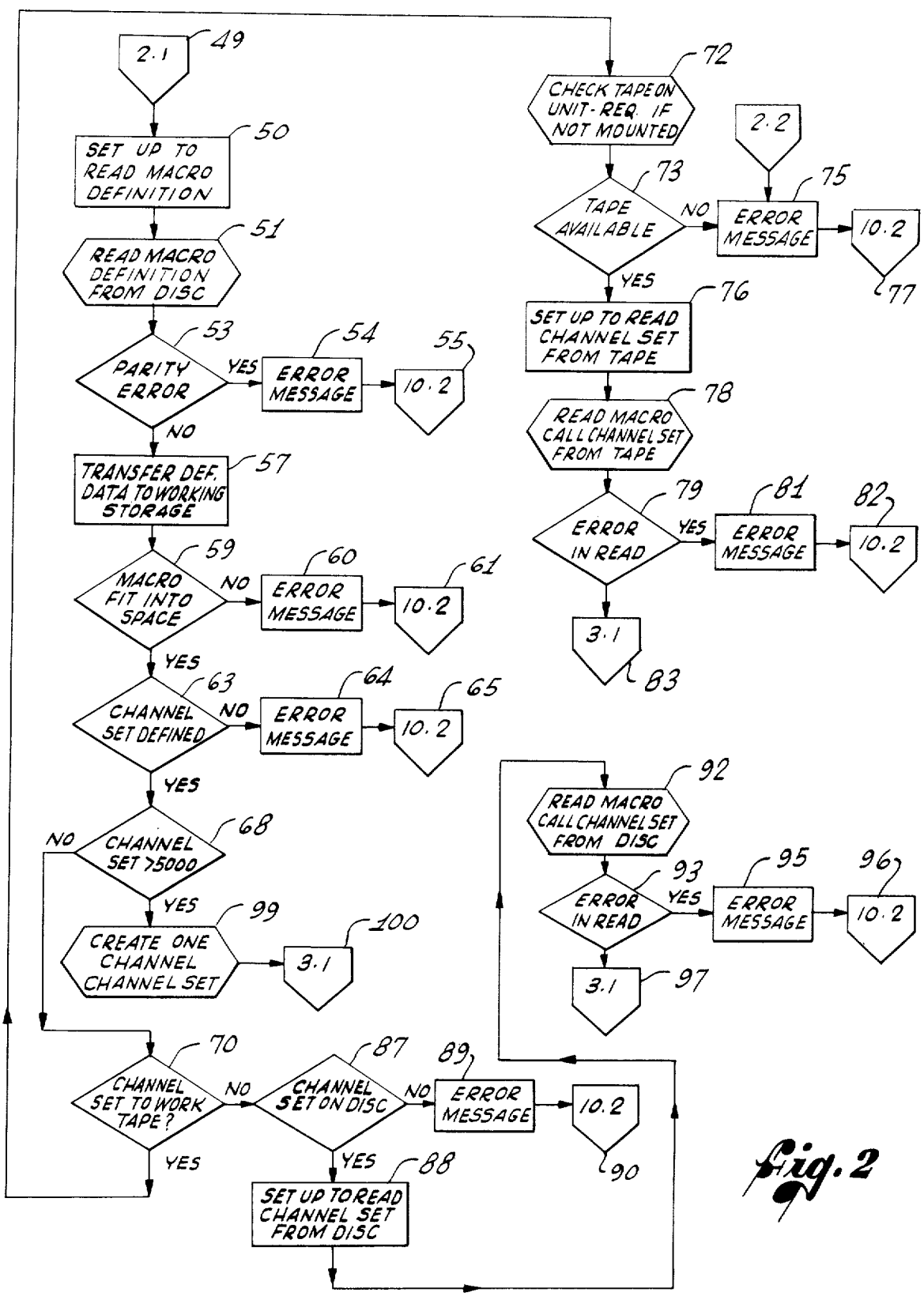
FIG. 2 is a high level flow chart of a portion of the software method according to this invention, including such steps as transferring necessary program definitions into core buffers, error routines and a determination of the type of animation data move to be performed.

Returning to the steps of FIG. 2, tape determination step 70 may find that the Macro Call channel set is not on the work tape. In that event, control is transferred to step 87 which determines whether the channel set identified in the Macro Call entry is on disc. If not, the channel set does not exist and the appropriate error message is transmitted to the Teletype by step 89 and the program exited via connector 90.

Figure 3:
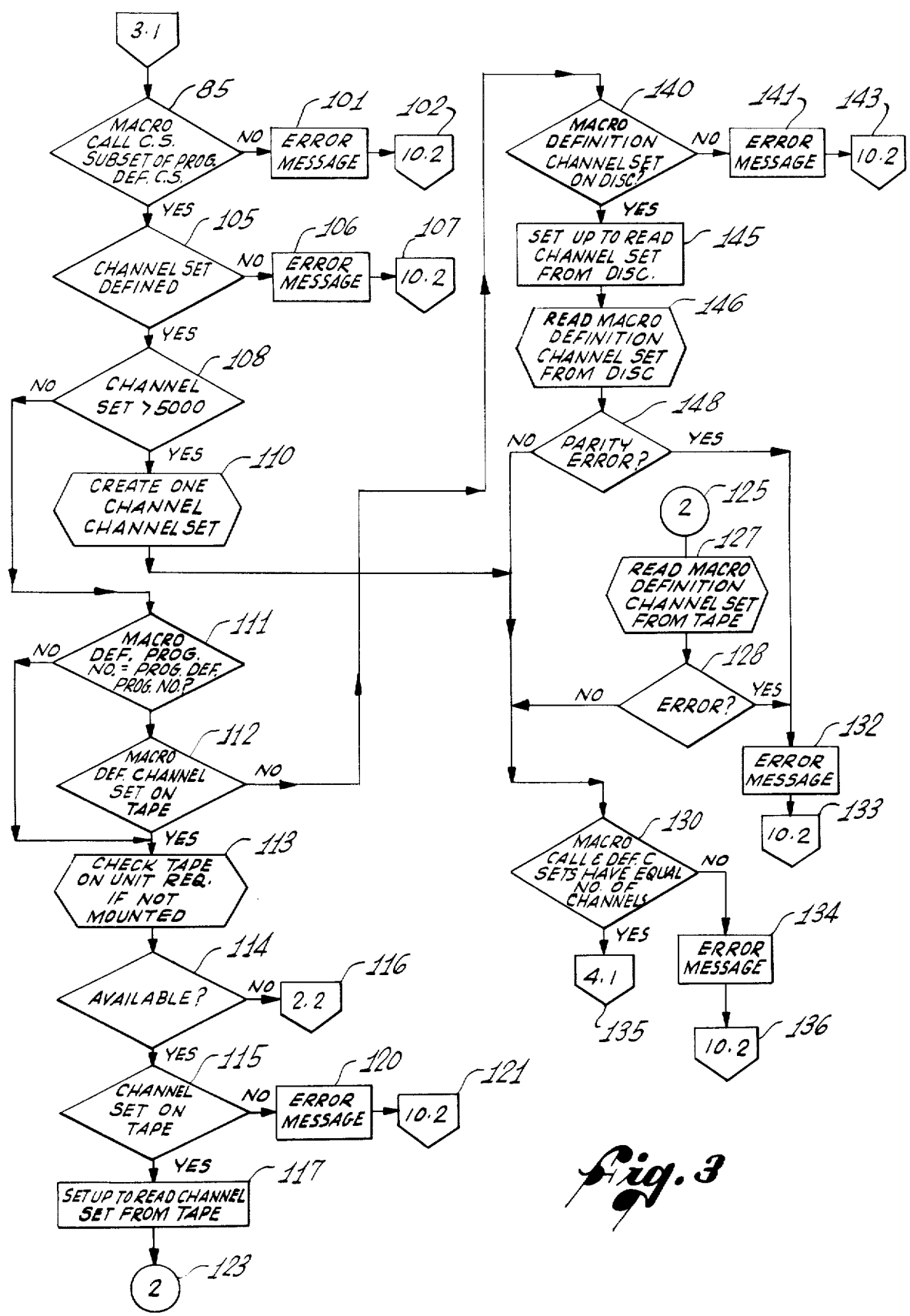
FIG. 3 is a high level flow chart of a portion of the software method according to this invention, including such steps as program definition checks, error routines and transfers of data definitions to be moved to temporary storage.

If the channel set is found on disc, step 88 controls the necessary set ups for a disc read. The Macro Call channel set is then read from disc after which steps 93, 95 and 96 make the usual read — error determination. Thereafter, the initial step 85 of FIG. 3 is entered.

There is an alternate procedure to the above which allows an animator to quickly generate a single-channel channel set. If, for example, a prior show contained a channel set which included date for five channels, one of the channels was Channel 7, mouth action, the animator can specify the single Channel 7 by entering Channel Set Number 5007 during the Macro Definition. Similarly, the Macro Call Channel Set Number would contain the usual channel number prefixed by 5000. The advantage here is that macro data for a single channel is made quickly available.

Step 68, then, determines whether the channel set in the Macro Definition pointed to by the Macro Number was greater than 5000. If so, control is transferred to step 99 which sets up the one-channel channel set as specified. Thereafter, control is transferred to the initial step 85 of FIG. 3.

At this point, no animation data has been read or moved. The program does, however, now have in core the channel sets defining the macro data to be moved and the location to where the data is to be moved.

Referring to FIG. 3, initial step 85 controls a determination of whether the channel set defined in the Macro Call entry is a subset of the current program definition channel set. This step merely checks the present sign-on entries to assure that the sign-on identified all channels to be involved in receiving animation data, whether by macro or by direct entry from the animator's console. If step 85 finds that the Macro Call channels were not included in the present program definition, the usual error message exit is made via steps 101, 102.

If step 85 finds the proper subset relationship, control is transferred to step 105 which determines whether the channel set referred to by number in the Macro Call entries had been previously defined. If not, the usual error message exit is made via steps 106, 107.

Step 108 determines whether the Channel Set Number entered with the Macro Call entries was greater than 5000. If so, as before, the channel set is to consist of a single channel. The single-channel channel set is created by step 110.

If the Macro Call Channel Set Number is less than 5000, control is transferred to step 111 which determines whether the Macro Definition Program Number is equal to the Program Number of the Program Definition. The significance of this determination is that it indicates the location of the macro data. If the numbers are found to be equal, the macro data is in the data stored for the show currently being animated; if the numbers are not the same, the macro is located in an old, previously generated, show and the proper tape must be loaded.

If the numbers are not equal, control is transferred to steps 113 and 114 which determine if the tape containing the needed macro data is on the transport and available. If not, the appropriate error message is transmitted via connector 116.

When the tape is found to be available, step 115 determines whether the needed channel set is on the tape.

If not, the usual error routine exit is made via steps 120 121.

Step 117 performs the usual tape set up and control is transferred to tape read step 127 via connectors 123, 125. Step 127 reads the Macro Definition channel set from the tape. If step 128 finds an error in the read, an appropriate error message is transmitted via steps 132, 133.

When no error is found, step 130 determines whether the Macro Call and Macro Definition channel sets have the same number of channels. It is, of course, necessary that each set contain the same number of channels. There must be locations to store all of the transferred macro data in the new channel set. If the same number of channels is not found, an error routine exists and an error exit is made via steps 134 and 136.

Returning to step 112, if it is found that the Macro Definition channel set is not on the tape, even though the current program is being worked, then the channel set must be found on disc or an error condition exists. Step 140 tests this conclusion and an error message exit is made via steps 141, 143 if the channel set is not found on disc.

If the macro data is found on disc, step 145 sets up the disc for a read routine called by step 146. Thereafter, the above-described tests of steps 148 and 130 are performed.

After the various transfers of FIG. 3, assuming no error condition is found, control is transferred to the tests of FIG. 4, steps 150 to 155. The FIG. 4 steps will not be discussed in detail as it is believed their legends make their functions self-explanatory. The point of the various tests is to determine whether the animator signed on with the needed data; if so, the data is on disc, if not, the data is on tape.

If the tests determine that the data is on disc, control is transferred to step 160 via connectors 157, 158. Step 160 performs the usual set up procedure. Thereafter, step 161 determines whether the macro data is to be moved forward or backward. This step is significant in the event an animator is, for example, shifting animation data a few frames forward or backward in the same show. If so, the macro must be read and re-written in a direction that will not destroy itself. Following the determination, steps 162, 163 set up the proper pointers to move either the first or last frames first.

Step 165 sets up the buffer for the first animation macro input. Control is then transferred to steps 170, 171 of FIG. 7 to begin the disc read routine. In the event a read — error is found, the appropriate error message is sent and program exited. If no error is sensed, control is transferred to the steps of FIG. 8.

Returning to FIG. 4, if it is found that the needed macro data exists on tape rather than disc, control is transferred to the steps of FIG. 6. Steps 180 and 181 determine if the tape which contains the needed data is on the tape unit. If not, an appropriate request message is transmitted by step 183 and the program is exited. If the tape is available, control is transferred to steps 187 and 189 which set up the proper pointers to transfer the macro data from the tape. Thereafter, control is transferred to the steps of FIG. 8.

Following the FIG. 6 and FIG. 7 steps, the first macro data is read from the channel set locations defined in the Macro Definition channel set number. The primary steps remaining cause the data to be inserted in the channel set defined in the Macro Call entries.

Figure 8:
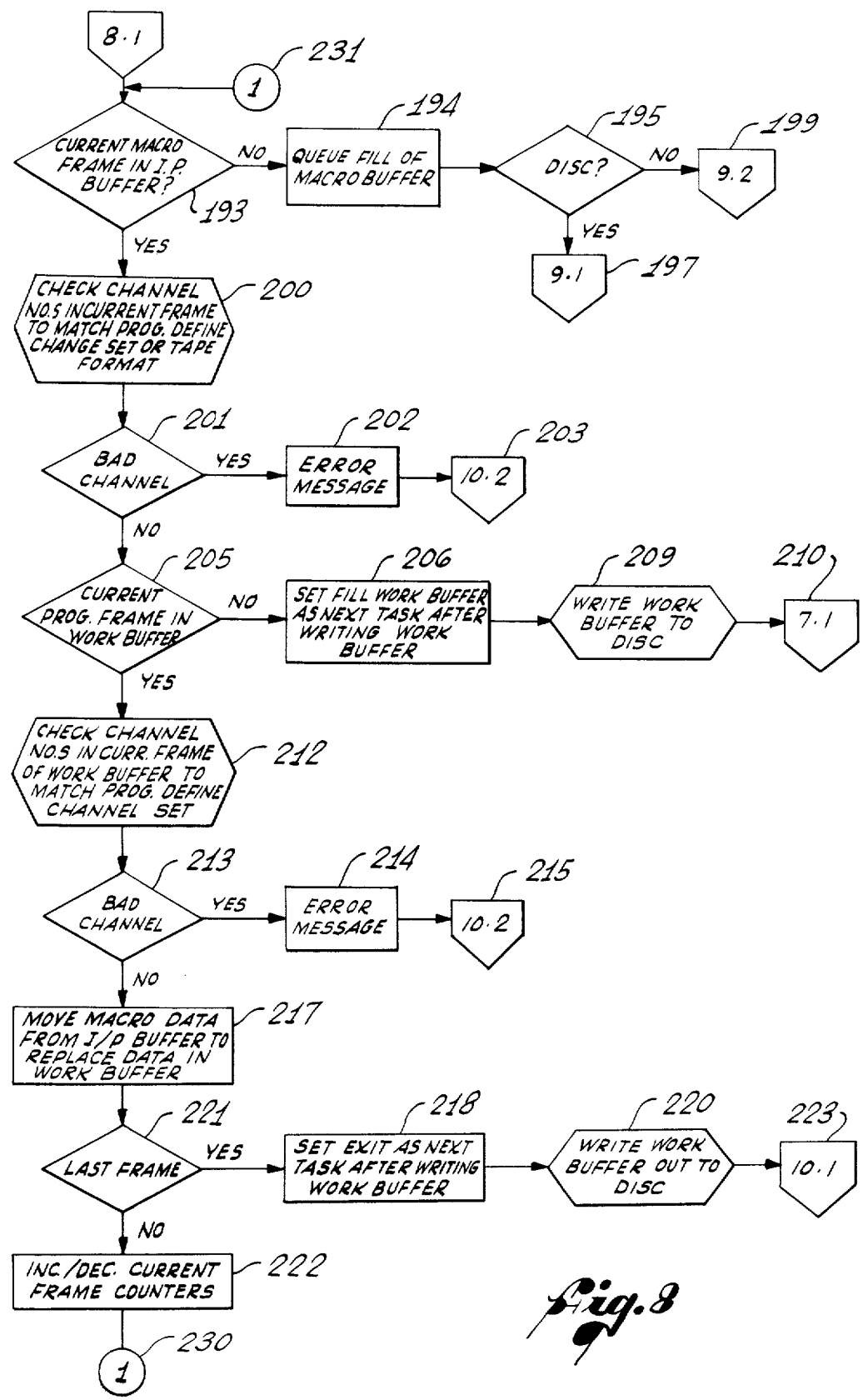
FIG. 8 is a high level flow chart of a portion of the software method according to this invention, including steps of moving the selected animation data from a prior location to a new location.

Referring to FIG. 8, step 193 determines whether the prior read steps placed a macro frame in the input buffer. The answer to this would ordinarily be in the affirmative. It does happen in some instances, as, for example, in the case of an intervening interrupt, that the macro data has not yet reached core by the time of step 193. In that event, step 194 sets up a queue routine. Step 195 determines whether macro data is being awaited from a disc or a tape. If a disc, transfer is made to the steps of FIG. 9; if a tape, transfer is made to the steps of FIG. 10. A looping procedure then continues until step 193 of FIG. 8 finds macro data in the core input buffer.

Steps 200 to 203 concern a validity check made on the data after transfer into the input buffer. The usual validity checks are made. In the event an error is detected, the usual error message exit occurs.

Step 205 determines whether the second buffer in core, termed a work buffer has been filled. The work buffer is, as is apparent from the source listing herein, a second buffer area in core to which data transfers are made. If the buffer is found to not be full, steps 206 and 209 set up a queuq queue and transfer control to the steps of FIG. 7 where, as previously explained, a disc read routine is called. After the disc read, a return is made to step 193 of FIG. 8.

After the work buffer is determined filled by step 205, steps 212 to 215 perform the same data validity checks as steps 200 to 203. Again, standard checks on the accuracy of the transmitted data units are made.

At this point, then, the input buffer in core contains a frame of macro data. The work bufffer contains the frame of current program data that is to be replaced. Step 217 then controls the macro frame in the input buffer to replace the current program frame in the work buffer. It is at this point that the macro data insertion is controlled.

After the transfer of the macro frame, step 221 determines if the last frame of macro data has been transferred. If not, the steps of FIG. 8 are re-entered via connectors 230, 231. The looping through the steps of FIGS. 8, 9 and 10 continues until the macro has been loaded into the buffers. When the last frame is reached, step 220 writes the contents of the work buffer out to disc, completing the replacement of current data with the macro.

Returning to step 195 of FIG. 8, it is recalled that a determination is made at that point whether data is being awaited from a disc unit or a tape unit. If a disc, control is transferred to the steps of FIG. 9 via connectors 197 and 233.

Figures 9, 10:
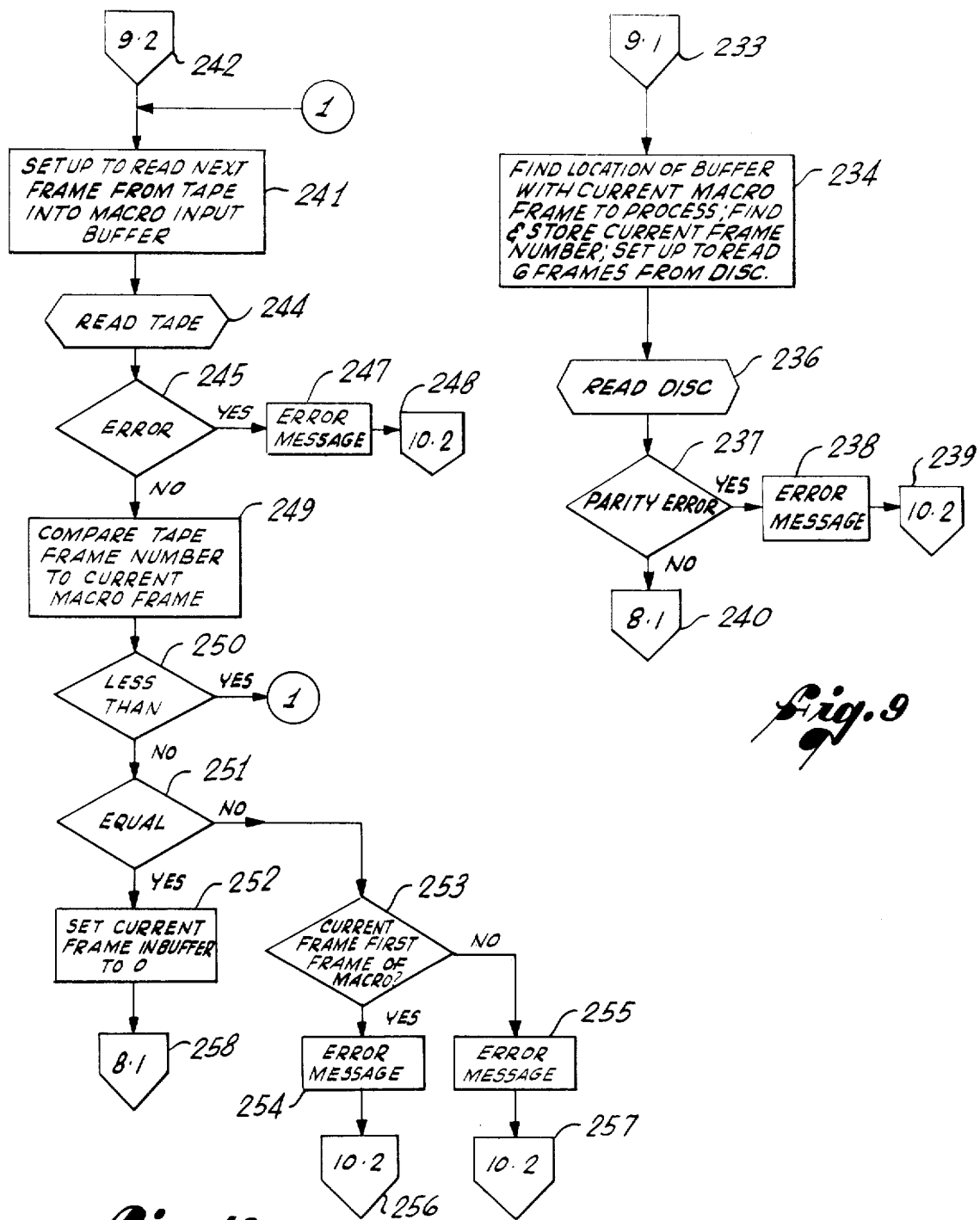
FIG. 9 is a high level flow chart of the software method according to this invention, including steps of moving the selected animation data from a prior location on a storage disc unit.
FIG. 10 is a high level flow chart of the software method according to this invention, including steps of moving the selected animation data from a prior location on a storage tape unit.

Referring to FIG. 9, step 234 performs the necessary set up to read six frames of macro data from disc. Step 236 calls the disc read routine after which steps 237 to 239 make the usual error message exit if a parity error is detected. Then, a return is made to the macro transfer steps of FIG. 8.

In the event step 195 determines that the macro data is to be transferred from a tape unit, control is transferred to step 241 of FIG. 10 via connectors 199 and 242. Step 241 sets up the tape to read one frame of macro data from the tape into the input buffer. A tape read routine is called by step 244 after which the usual data validity check and error message exit is made by steps 245, 247 and 248.

Step 249 determines whether the proper number of frames has been read into the input buffer. If not, a looping process is initiated via step 250 to step 241 until the proper number of frames has been read.

If steps 250 and 251 determine that the frame number comparison is that the frame number read is greater than the current macro frame, an error condition exists and the appropriate error message is sent via steps 253 to 257.

When step 251 finds that the proper number of macro frames has been loaded into the input buffer, a return is made to the steps of FIG. 8 via connector 258.

In this way, the looping continues until the entire segment of macro data, from tape or disc, has been moved into the input buffer, from the input buffer to the work buffer and from the work buffer to disc where it replaces the current frames of data or where it is assembled into a composite show.

Figure 11:
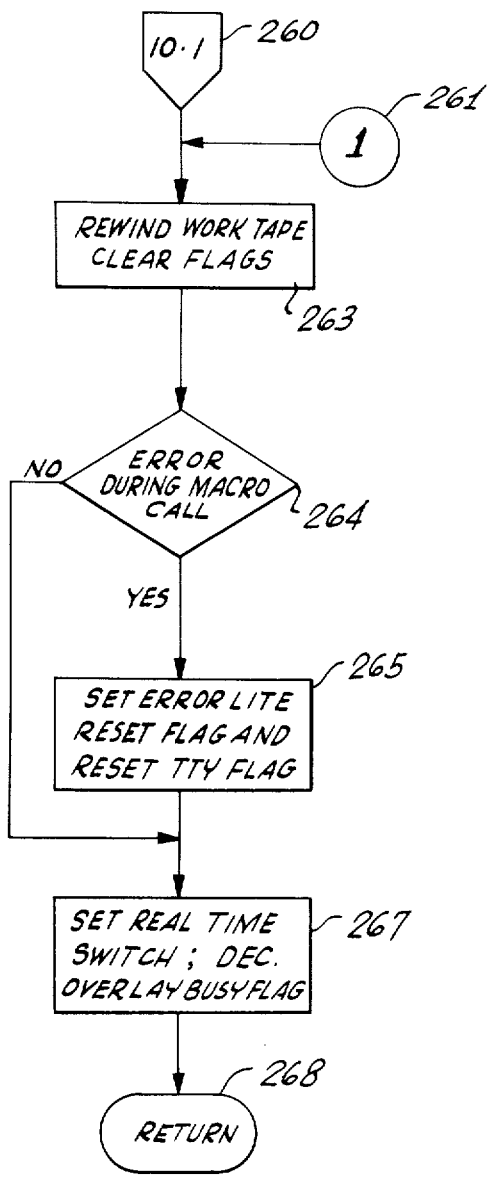
FIG. 11 is a high level flow chart of the software method according to this invention, including steps controlling resetting of the storage units after transfer of the animation data.

Referring to FIG. 11, the final steps of the Macro Call program are shown. Step 263 controls the tape device containing the work tape to rewind the tape. Steps 264 and 265 set the appropriate error pointers in the event of an error during the program. Step 267 sets the real time switch to process subsequent commands and the Macro Call program is exited via connector 268.

Figure 12:
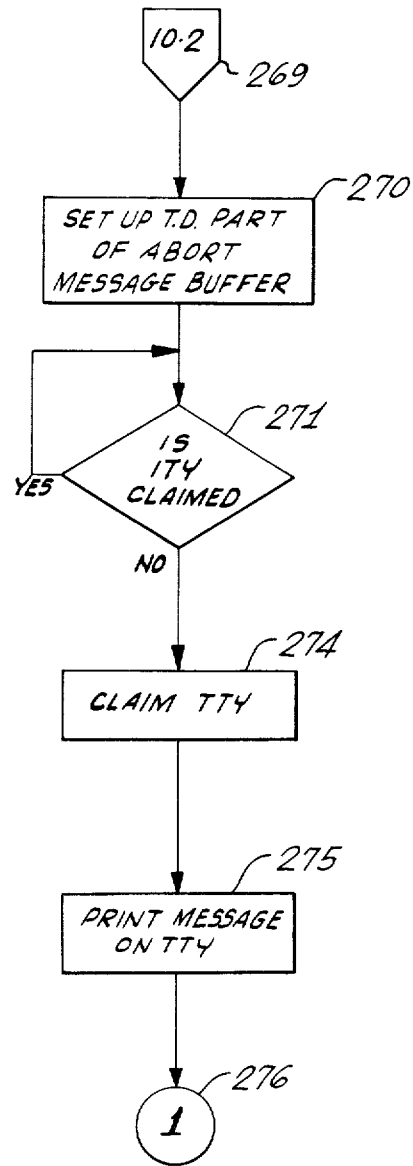
FIG. 12 is a high level flow chart of the software method according to this invention, including steps controlling the error routine following detection of any of the several possible errors throughout the program.

The various error message exits of this program all transfer control to the steps of FIG. 12. Step 270 sets up the appropriate message. Step 271 controls a wait until the Teletype is available and steps 274 and 275 claim the Teletype and control the appropriate message to be presented on the Teletype. Thereafter, the steps of FIG. 11 are entered via connectors 276 and 260.

As would be understood by any person skilled in the programming arts, details of the method of this invention not stated above may be easily obtained by reference to the source listing which follows. The computer utilized by applicants in this invention is a Model DDP-516, manufactured by Honeywell, Inc. Accordingly, the programs written for the practice of this invention are in a language suitable for that computer.

Other programmable general purpose computers of similar capability may be substituted for the DDP-516. Also, other languages may be used for the programs without departing from the invention herein.

The source listings which follow are in a basic assembly language, termed DAP-16 by Honeywell, Inc. order to use the Macro Call program, it is only necessary that the following codes be assembled.

The Macro Call program and necessary routines used thereby are as follows.

```
*                  MACRO CALL    4/19/71

*                  WFD 970622-64 EXA MODE
*
        EXD
*
    1602 EQU    '675        PERIPHERAL CLAIM FLAG
    MCFL EQU    '370        MACRO CALL PROG BUSY FLAG
    1667 EQU    '545        PDEF CH SET ADDR
    1604 EQU    '540        CONS WK BUF ADDR
    MCRN EQU    '741        NO. MACROS DEFINED
    1008 EQU    '441        PROG DEF START FRAME
    CKMA EQU    '776        16 BIT MAGNITUDE COMPARE
    1011 EQU    '444        PROG DEF END FRAME
    RDTS EQU    '622        DISC 0 READ T/S
    RDNW EQU    '621        DISC 0 READ NO. WDS
    RDER EQU    '623        DISC 0 READ ERR RETURN
    RDNT EQU    '624        DISC 0 READ NEXT TASK
    RDEP EQU    '632        DISC 0 READ ENTRY POINT
    RDBA EQU    '625        READ BUFFER ADDRESS
    QXT  EQU    '270        Q TASK AND RET TO EXEC
    1600 EQU    '673        NO. TAPE RES CH SETS
    IDRA EQU    '725        ID REEL OF PROG THIS SHOW MOUNTED
    1642 EQU    '712        NO. TAPE RES OVLY
    1643 EQU    '713        SKP RECORD CTR
    1644 EQU    '714        SKP RECORD ENTRY
    1647 EQU    '715        NEXT TASK AFTER REC SKP
    1217 EQU    '655        NEXT TASK AFTER REWIND
    1211 EQU    '647        TAPE READ ENTRY
    1215 EQU    '653        TAPE I/P BUF ADDR
    1212 EQU    '650        TASK IF TAPE PARITY ERR
    1213 EQU    '651        TASK IF DOUBLE EOF
    1214 EQU    '652        N.T. AFTER TAPE READ
    1216 EQU    '654        TAPE REWIND ENTRY
    1601 EQU    '674        NO. DISC RES CH SETS
    ARSA EQU    '716        T/S FOR DISK READ (AIO)
    ARUA EQU    '373        VIRT UNIT FOR D.R. (AIO)
    ISSU EQU    '701        SHOW START VIRT UNIT
    1654 EQU    '717        D.R. I/P BUF ADDR
    1655 EQU    '720        D.R. NO. WDS
    1656 EQU    '721        D.R. PAR+DMC ERR RET
    1657 EQU    '722        D.R. NEXT TASK
    1658 EQU    '723        D.R. ENTRY
    TSP1 EQU    '605
    TSP2 EQU    '606
```

* MACRO CALL—Continued

```
TSP3  EQU   '607
TSP4  EQU   '610
TSC1  EQU   '611
TSC2  EQU   '612
I312  EQU   '667      XMTR CLAIM FLAG = SHOW NO
I676  EQU   '553      PROG I/P BUF ADDR
I674  EQU   '551      PROG WK BUF ADDR
*
ERFA  EQU   '562      ERROR FLAG FOR INDICATION
CI1A  EQU   '402
SW5A  EQU   '570
TTCF  EQU   '301
PORF  EQU   '627
TTOL  EQU   '131      TYPE OUT MESSAGE
AWSA  EQU   '703
AWUA  EQU   '372
I606  EQU   '677
I607  EQU   '700
I615  EQU   '705
I616  EQU   '706
I668  EQU   '546
I669  EQU   '547
ICSS  EQU   '555
ICSU  EQU   '550
IBPU  EQU   '527
IPDC  EQU   '751
I333  EQU   '535
TOIL  EQU   '132
CCTS  EQU   '162
I104  EQU   '633
MDTS  EQU   '630      MACRO DEF TRK, SECTOR
*
*
      ORG   '17000
      SETB  BA17
*
MCEP  DAC   MC01
      DAC   MC02
      DAC   MC03
      DAC   MC04
*
* ENTRY TO MACRO CALL -- CONS 0,1,2,3
*
MC01  PZE                NEXT TASK QUEUED
      DAC   **           ENTRY
      LDX   =0           CONS INDEX
      JST   MC10         EXECUTE SUBROUTINE
      JMP*  MC01+1       RETURN TO EXEC
*
MC02  PZE
      DAC   **
      LDX   =1
      JST   MC10
      JMP*  MC02+1
*
MC03  PZE
      DAC   **
      LDX   =2
      JST   MC10
      JMP*  MC03+1
*
MC04  PZE
      DAC   **
      LDX   =3
      JST   MC10
      JMP*  MC04+1
*
* COMMON ENTRY FOR ALL CONSOLES
*
MC10  DAC   **
      LDA   0            CONS INDEX
      LGR   1            CI/2 = SHOW INDEX
      IMA   0            SET SHOW
      IAB                SAVE CONS, DONT CLOBBER MCCX YET
```

MACRO CALL—Continued

```
    LDA*  I602,1     PERIPHERALS CLAIMED
    SZF              BY OTHER CONS THIS SHOW
    JMP   MC15       YES, REQ
    LDA   MCFL       ANY CONS USING THIS PROG ?
    SZE
    JMP   MC15       YES, REQ
    IRS*  I602,1     NO, CLAIM PERIPHERALS
    IRS   MCFL       AND CLAIM THIS PROGRAM
    STX   MCSX       SAVE SHOW INDEX
    LDA*  I312,1
    STA   PDPN       PROGRAM DEFINITION PROGRAM NUMBER
    IAB
    STA   0
    STX   MCCX       SAVE CONS INDEX

LDA*  I667,1     PDEF CH SET ADDR
    STA   PDCA
    LDA*  IPDC,1
    STA   PDCS       PROGRAM DEFINITION CHANNEL SET
    LDA*  I008,1
    STA   PDSF       PROG DEF START FRAME
    LDA*  I011,1
    STA   PDEF       PD END FRAME
    LDA*  I668,1     NO. WDS IN BUFFER OF PROG DEF
    STA   MBNW       MACRO BUFFER NO. WORDS FOR DISK READ/WRITE
    LDA*  I604,1     CONS WK BUF ADDR
    STA   RDBA       READ-BUF ADDR FOR MDEF READ
    STA   LREF       POINTER FOR MCCL PARAM
    JST   GETL       MACRO NO. FROM LREF
    STA   MCNO       SAVE
    JST   MINI       INITIALIZE MESSAGE BUFFER TO BLANKS
    JST   PRAN
    DAC   MCNO
    DAC   EMMC       MACRO ! -
    LDA   MCNO
    CAS   =5000      MAKE
    NOP              FORCED-TAPE-CALL
    SUB   =5000      MCNO NORMAL
    SNZ
    JMP   MC20       MACRO 0 IS UNDEFINED
    CAS   MCRN       .GT. LAST MACRO DEF ?
    JMP   MC20       YES, UNDEF
    NOP              NO, OK
    STA   RDTS       TEMP
    JST   GETL       GET NEXT WORD = MCCS
    STA   MCCS       MACRO CALL CH SET
    JST   GETL       GET START FOOT
    LGL   4
    ADD*  LREF       START FRAME
    STA   MCSF
    IAB
    LDA*  I008,1     PDEF START FRAME
    JST*  CKMA       COMPARE --.LT. START ?
    NOP
    JMP   *+2        NO
    JMP   MC22       YES, ERROR
    IRS   LREF
    JST   GETL       GET END FOOT
    LGL   4
    ADD*  LREF       END FRAME
    STA   MCEF
    IAB
    LDA*  I011,1     PDEF END FRAME
    JST*  CKMA       .GT. PDEF END ?
    JMP   MC24       YES, ERROR
    NOP              NO
*   SET UP TO READ MACRO DEFINITION
    LDA   RDTS       NORMAL MCNO
    SUB   =1
    LRL   2
    ADD   MDTS       MDEF TK, SECT (39,0)
    AOA              START IN SECTOR 1
    STA   RDTS       SAVE FOR D.R.
    CRA
```

```
                MACRO CALL—Continued
        LLL     2               POINT TO
        LGL     2               ONE OF 4 READ IN SECTOR
        ADD     RDBA
        STA     LREF            SET POINTER TO MDEF
        LDA     =16
        STA     RDNW            NO. WDS
        LDA     ME4             PE RETURN
        STA     RDER
        LDA     MC30            NEXT TASK AFTER READ
        STA     RDNT
        LDA     RDEP            READ ENTRY POINT
        JMP     QXT
*
MC15    IAB                     RE-Q THIS TASK
        STA     0
        LDA     MCEP,1          ENTRY
        JMP     QXT
*
MC20    JST     PRCA
        DAC     EM1             UNDEFINED
        LDA     =1
        JMP     QABT
*
MC22    JST     MINI            RESET LINE
        JST     PRAN
        DAC     LST2            PARAM LIST
        DAC     EM2             FORMAT   MCSF\< PDSF <-
        LDA     =2
        JMP     QABT
LST2    DAC     MCSF
        DAC     PDSF
*
MC24    JST     MINI            INITIALIZE MSG BUF
        JST     PRAN
        DAC     LST3            LIST= MCEF,PDEF
        DAC     EM3             FORMAT=  MCEF\> PDEF \+
        LDA     =3
        JMP     QABT
LST3    DAC     MCEF
        DAC     PDEF
*
* HERE AFTER MACRO DEFINITION READ
MC30    DAC     *+1
        PZE
        DAC     **
        LDA     RDBA            SET BUFFER FOR
        STA     MCCA            MACRO CALL CH SET
        ADD     =126            FOLLOWED BY
        STA     MDCA            MACRO DEF CH SET
        JST     GETL            (POINTER PRESET TO MDEF)
        STA     MDPN            MACRO DEF PROG NO.
        JST     GETL
        STA     MDCS            MACRO DEF CHNL SET
        JST     GETL
        STA     MDSF            MACRO DEF START FRAME
        JST     GETL
        STA     MDEF            MACRO DEF END FRAME
        SUB     MDSF
        ADD     MCSF            DEFINED MACRO FIT
        CAS     MCEF            EXACTLY INTO CALL SPACE ?
        JMP     *+2             NO
        JMP     MC35
        STA     WKMF            STORE CORR MCEF FOR PRINT
        JST     PRAN
        DAC     LST5            LIST= WKME
        DAC     EM5             FORMAT= : TRY MCEF \+
        LDA     =5              ERR ID
        JMP     QABT
LST5    DAC     WKME
*
*
MC35    LDX     MCSX            SHOW
        LDA     MCCS            MACRO CALL CH SET
        JST     CSCS            CREATE 1-CH CS IF CSNO.GT.5K
```

*         MACRO CALL—Continued

```
        JMP     MC42            UNDEF RETURN
        DAC     MCCA            WHERE TO STORE CS
        DAC     MC50+1          NEXT TASK AFTER CREATING CS
* NORMAL CS NO.
        CAS*    I600,1          IS IT ON WK TAPE ?
        JMP     MC40            NO
        NOP                     YES
        LDA     MCCA            MACRO CALL CH SET LOC
        STA*    I215,1          TP I/P BUF ADDR
* REQUEST PROG WK TAPE, REEL ONE FOR CHANNEL SET PROCURE
        LDA     PDPN            PROG DEF PROG NO.
        JST     QTRQ
        DEC     1               REFL
        DAC     MC38            NEXT TASK WHEN TAPE ON AND ID READ
        DAC     ME6+1           NEXT TASK IF TAPE REQ ABORT BY OPER
*
MC38    PZE
        DAC     **
        LDX     MCSX            SHOW
        LDA     MCCS            YES, COMP RECORDS TO SKIP
        ADD*    I642,1          TP RES OVL
        SUB     =1              ID RECORD ALREADY PAST
        STA*    I643,1          REC TO SKIP
        LDA*    I211,1          TP READ ENTRY
        STA*    I647,1          SKP REC N.T.
        LDA     ME7
        STA*    I212,1          PAR ERR RET
        LDA     ME8
        STA*    I213,1          DOUBLE EOF RETURN
        LDA     MC50
        STA*    I214,1          TP RD N.T.
        LDA*    I644,1          SKIP REC ENTRY
        JMP     QXT
*
MC40    SUB*    I600,1          MCCS NOT ON TP
        CAS*    I601,1          ON DISK ?
        JMP     MC42            NO, MCCS UNDEFINED
        NOP                     YES, SET UP DISC READ
        SUB     =1
        ALS     3               8 SECTORS PER CH SET
        STA*    ARSA,1          T/S
        LDA*    ISSU,1
        STA*    ARUA,1          UNIT
        LDA     MCCA
        STA*    I654,1          D.R. BUF ADDR
        LDA     =126
        STA*    I655,1          NO. WDS
        LDA     ME9
        STA*    I656,1          PAR ERR RET
        LDA     MC50
        STA*    I657,1          D.R. N.T.
        LDA*    I658,1          D.R. ENTRY
        JMP     QXT
*
MC42    JST     MINI
        JST     PRAN
        DAC     MCCS
        DAC     EM20            FORMAT= MCCS ! UNDEF+
        LDA     =20             MACRO ERROR ID NO.
        JMP     QABT
* HERE AFTER MC CH SET READ FROM TAPE OR DISK
MC50    DAC     *+1
        PZE
        DAC     **
* CHECK THAT MCCS IS A SUBSET OF PDCS
        LDA     MCCA            MCCS ADDR
        STA     TSP1
        LDA*    TSP1            MCCS NO. OF CHNLS
        TCA
        STA     TSC1
*
MC55    LDA     PDCA            PDCS ADDR
        STA     TSP2
        LDA*    TSP2            PDCS NO. CHANLS
```

* MACRO CALL—Continued

```
      TCA
      STA    TSC2
      IRS    TSP1          TO NEXT MC CH NO.
      LDA*   TSP1
*
MC60  IRS    TSP2          TO NEXT PD CH NO.
      CAS*   TSP2          MATCH ?
      JMP    *+2           NO
      JMP    MC65          YES, CHECK NEXT MC CHNL
      IRS    TSC2          NO, TRY NEXT PD CH
      JMP    MC60
* NO MORE PD CHANNELS - HENCE MC CHNL NOT IN PDCS
      STA    WKME          1ST BAD CHNL
      JST    MINI          RESET MSG LINE
      JST    PRAN
      DAC    LT10          LIST= WKME,MCCS,PDCS
      DAC    EM10          FORMAT= CH $ OF MCCS $ NOT IN PDCS $.
      LDA    =10
      JMP    QABT
LT10  DAC    WKME
      DAC    MCCS
      DAC    PDCS
*
*
MC65  IRS    TSC1          NEXT MC CHNL TO CHECK
      JMP    MC55
* NO MORE MC CHNLS, HENCE ALL ARE IN PDCS AND ARE O.K.
*
      LDX    MCSX          SHOW
      LDA    MDCS          MACRO DEF CS NO.
      JST    CSCS          CREATE 1-CH CS IF CSNO.GT.5K
      JMP    MC82          UNDEF
      DAC    MDCA          WHERE TO STORE MDCS IF CREATED
      DAC    MC90+1        NEXT TASK AFTER CS CREATED
* NORMAL CS NO. CK WHERE TO READ CS
      LDA    MDPN          MACRO DEF PROG NO.
      ERA    PDPN          PD PROGRAM NUMBER
      SZE
      JMP    MC70          MDCS NOT DEFINED IN PD PROG.
*
      LDA    MDCS          MACRO DEF CH SET
      CAS*   I600,1        ON WK TP ?
      JMP    MC85          NO, CK DISC
      NOP                  YES, ACCESS TAPE
*
MC70  LDA    MDCA          MD CH SET ADDR
      STA*   I215,1        SET TP I/P BUF
      LDA    MDPN          MACRO DEF PROG NO.
      JST    QTRQ          Q TAPE REQ
      DEC    1             REEL 1
      DAC    MC80          NEXT TASK AFTER ID REC IN.
      DAC    ME6+1         NEXT TASK IF ABORT
*
MC80  PZE
      DAC    **
      LDX    =3            FOR NTRC
      LDA    MDCS          MACRO DEF CH SET NO.
      CAS*   MDCA,1        NO. CH SETS ON TAPE
      JMP    MC82          MDCS UNDEF, Q MSG AND ABORT
      NOP                  MDCS IS ON TAPE, COMP WHERE
      LDX    =2            FOR NTRO
      ADD*   MDCA,1        OVLYS ON THIS TP
      SUB    =1
      LDX    MCSX          RESTORE SHOW
      STA*   I643,1        REC TO SKIP
      LDA*   I211,1        TP READ ENTRY
      STA*   I647,1        N.T. AFTER REC SKP
      LDA    ME11
      STA*   I212,1        PAR ERR RET
      LDA    ME12
      STA*   I213,1        DOUBLE EOF RET
      LDA    MC90
      STA*   I214,1        N.T. AFTER TP RD
      LDA*   I644,1        RECORD SKIP ENTRY
      JMP    QXT
```

* MACRO CALL—Continued
*
```
MC82  JST   PRAN
      DAC   MDCS       LIST
      DAC   EM13       FORMAT =   MDCS \ UNDEF*
      LDA   =13
      JMP   QABT
*
MC85  SUB*  1600,1     MDCS NOT ON TP
      CAS*  1601,1     ON DISK ?
      JMP   MC82       NO, UNDEF
      NOP              YES, SET UP READ
      SUB   =1
      ALS   3          8 SECT/CH SET
      STA*  ARSA,1     T/S
      LDA*  ISSU,1
      STA*  ARUA,1     VIRT UNIT
      LDA   MDCA       LOC TO PUT MDCS
      STA*  1654,1     D.R. BUF ADDR
      LDA   =126
      STA*  1655,1     NO. WDS
      LDA   ME14
      STA*  1656,1     PAR ERR RET
      LDA   MC90
      STA*  1657,1     D.R. N.T.
      LDA*  1658,1     D.R. ENTRY
      JMP   QXT
* HERE AFTER READING MACRO DEFINITION CHANNEL SET
MC90  DAC   *+1
      PZE
      DAC   **
      LDA*  MDCA       MDCS NO. OF CHNLS
      ERA*  MCCA       SAME AS MCCS ?
      SNZ
      JMP   MC95       YES, CONTINUE
      JST   PRAN       NO, ERROR
      DAC   LT15       LIST= MDCS,*MDCA,MCCS,*MCCA
      DAC   EM15       FORMAT= MDCS $ HAS $ CHNLS AND MCCS $ HAS $*
      LDA   =15
      JMP   QABT
LT15  DAC   MDCS
      DAC*  MDCA
      DAC   MCCS
      DAC*  MCCA
*
* CHANNEL SETS MATCH IN NO. OF CHANNELS, CK IF MACRO ON DISK
MC95  LDA   MCNO       FORCED
      CAS   =5000      TAPE CALL
      JMP   MT00       IF 5000
      JMP   MT00       ADDED TO MCNO
      LDX   MCSX       SET SHOW
      LDA   MDPN       MACRO DEF PROG NO. EQUAL
      ERA   PDPN       PROG DEF PROG NO"
      SZE
      JMP   MT00       NO, GET MACRO FROM TAPE
      LDA*  MDCA       YES, CHECK IF MDCS IS
      TCA              SUBSET OF PDCS
      STA   TSC1       MDCS NO. CHNLS
      LDA   MDCA
      STA   TSP1       POINT TO MDCS
*
MCA0  LDA   PDCA       PDCS ADDR
      STA   TSP2
      LDA*  TSP2       PDCN NO. CHNLS
      TCA
      STA   TSC2
      IRS   TSP1       TO NEXT MD CH NO.
      LDA*  TSP1
*
MCA5  IRS   TSP2       TO NEXT PD CH NO.
      CAS*  TSP2       MATCH ?
      JMP   *+2        NO
      JMP   MCB0       YES, CK NEXT MD CHNL
      IRS   TSC2       NO, TRY NEXT PD CHNL
      JMP   MCA5
```

```
*           MACRO CALL—Continued

*  NO MORE PDCS CHNLS - HENCE MD CHNL NOT IN PDCS
*  AND MACRO MUST BE ON TAPE
       JMP     MT00            GET MACRO FROM TAPE
*
MCB0   IRS     TSC1            NEXT MD CH TO CK
       JMP     MCA0
*  NO MARE CHNLS, HENCE ALL ARE IN POCS AND MACRO MAY BE ON DISK
       LDX     MCCX            SET CONS
       LDA*    I008,1          PROG DEF START FRAME
       IAB
       LDA     MDSF            MACRO DEF START FRAME
       JST*    CKMA            MDSF.LT.PDSF ?
       JMP     MT00            YES, GET MACRO FROM TAPE
       NOP                     NO, CK END
       LDA     MDEF            MACRO DEF END FRAME
       IAB
       LDA*    I011,1          PROG DEF END FRAME
       JST*    CKMA            MDEF.GT.PDEF ?
       JMP     MT00            YES, GET MACRO FROM TAPE
       NOP                     NO, MACRO IS AVAIL ON DISK
       JMP     MCC0            GO SET UP FOR DISK SOURCE
*
MCSX   BSS     1               SHOW INDEX
MCCX   BSS     1               CONSOLE INDEX
PDCA   BSS     1               PROG DEF CH SET ADDR
PDPN   BSS     1
PDCS   BSS     1
PDSF   BSS     1
PDEF   BSS     1
WKME   BSS     1
*
MCNO   BSS     1
MCCS   BSS     1
MCSF   BSS     1
MCEF   BSS     1
*
MCCA   BSS     1
MDCA   BSS     1
*
MDPN   BSS     1
MDCS   BSS     1
MDSF   BSS     1
MDEF   BSS     1
MEFL   BSZ     1
*
*
ME6    DAC     *+1
       PZE
       DAC     **
       LDA     =6
       JMP     QABT
*
ME4    DAC     *+1
       PZE
       DAC     **
       JST     PRCA
       DAC     EM4
       LDA     =4
       JMP     QABT
*
ME7    DAC     *+1
ME8    EQU     ME7
ME9    EQU     ME7
       PZE
       DAC     **
       JST     PRAN
       DAC     MCCS
       DAC     EM7
       LDA     =7
       JMP     QABT
*
ME11   DAC     *+1
ME12   EQU     ME11
ME14   EQU     ME11
       PZE
```

*             MACRO CALL – Continued
       DAC    **
       JST    PRAN
       DAC    MDCS
       DAC    EM11
       LDA    =11
       JMP    QABT
*
ME22   DAC    *+1
       PZE
       DAC    **
       LDA    =22
       STA    MENO
       JST    PRCA
       BCI    1,M*
       LDA    IBCU
       STA    TSP1
       LDA    IBCS
       JMP    E23A
*
ME23   DAC    *+1
       PZE
       DAC    **
       LDA    =23
       STA    MENO
       JST    PRCA
       BCI    1,P*
       LDA    WBCU
       STA    TSP1
       LDA    WBCS
E23A   LRL    9
       STA    TSP2
       CRA
       LLL    8
       STA    TSP3
       JST    PRAN
       DAC    TSP1
       DAC    EM22
       JMP    TP25+1         WRAP UP
*
*  CLEAR MESSAGE BUFFER AND SET POINTER TO START
MINI   DAC    **
       LDA    EMBA           ERR MSG BUF ADDR
       STA    BREF           BUF REF
       STX    MIX            SAVE
       LDX    =-30
       LDA    =A
MIN2   STA    EMBH+30,1      CLEAR BUFFER TO BLANKS
       IRS    0
       JMP    MIN2
       LDX    MIX
       JMP*   MINI           RETURN
MIX    BSS    1
*
       FIN
BA17   EQU    *
       EJCT
       ORG    '20000
       SETB   BA20
*
MENO   BSZ    1              ERROR I.D.
MCSW   BSZ    1              STATUS WORD
*
*
*  MACRO IS CONTAINED IN PROG DEFINED ON DISK.
*           SET UP BUFFERS AND MERGE POINTERS
*
MCC0   LDA*   I676,1         PROG I/P BUF ADDR
       STA    MIBA           MACRO INPUT BUF ADDR
       LDA*   I674,1         PROG WK BUF ADDR
       STA    MWBA           MACRO WK BUF ADDR
*
       LDA    MDCA           MACRO DEF CH SET
       STA    TSP1
       LDA*   TSP1           MDCS NO. CH MACRO CALL – Continued

```
        TCA
        STA     TSC1
        LDA     MCCA         MACRO CALL CH SET
        STA     TSP2
        LDA     MCCP         WK BUF STORE POINTERS
        STA     TSP4
*
MCC5    IRS     TSP1         NEXT MD CH
        IRS     TSP2         NEXT MC CH
        IRS     TSP4         NEXT MC POINTER
        LDA     PDCA         PROG DEF CH SET
        STA     TSP3
        LDA*    TSP3         PDCS NO. CH
        TCA
        STA     TSC2
MCD0    IRS     TSP3
        LDA*    TSP3         PD CH
        CAS*    TSP1         MD CH
        JMP     *+2
        JMP     MCE2         EQUAL, POINT TO I/P BUF
MCD5    CAS*    TSP2         MC CH
        JMP     *+2
        JMP     MCE4         EQUAL, POINT TO WK BUF
MCE0    IRS     TSC2         COUNT TRU ALL PD CHNLS
        JMP     MCD0
        IRS     TSC1         COUNT TRU ALL MD/MC CH PAIRS
        JMP     MCC5
        JMP     MCE5         POINTERS FINISHED
*
MCE2    LDA     TSP3         SET POINTER TO GET
        SUB     PDCA         MD DATA FROM I/P BUF
        SUB     =1
        ADD     MIBA
        IMA*    TSP1         REPLACE MD CH NO. WITH POINTER
        JMP     MCD5
*
MCE4    LDA     TSP3         SET POINTER TO STORE
        SUB     PDCA         MD DATA INTO WK BUF
        SUB     =1
        ADD     MWBA
        STA*    TSP4         STORE POINTER
        JMP     MCE0
*
*               POINTERS FINISHED, INITIALIZE AND Q MAIN LOOP
MCE5    LDA     MCSF
        IAB                  DETERMINE PROCESS DIRECTION
        LDA     MDSF
        JST*    CKMA
        JMP     MCE7         FORWARD MOVE, BACKWARDS PROCESS
        NOP                  SIDEWAY MOVE, FWD PROCESS
        LDA     =1           BACKWARD MOVE, FWD PROCESS
        STA     PDIR
        LDA     MCSF         CALL START FRAME IS
        STA     MPCF         FIRST FRAME TO PROCESS
        LDA     MDSF         MACRO DEFINITION START FRAME IS
        STA     MICF         FIRST FRAME TO USE
        LDA     MCEF         MC END FRAME
        STA     MPEF         LAST FRAME TO PROCESS
        JMP     MCE8
*
MCE7    LDA     =-1          SET BACKWARDS PROCESSING
        STA     PDIR
        LDA     MCEF         CALL END FRAME IS
        STA     MPCF         FIRST FRAME TO PROCESS
        LDA     MDEF         MACRO DEFINITION END FRAME IS
        STA     MICF         FIRST FRAME TO USE
        LDA     MCSF         MC FIRST FRAME IS
        STA     MPEF         LAST FRAME TO PROCESS
*
MCE8    LDA     =6           HIGH FRAME FOR
        STA     IBHF         DISK I/P BUF
        STA     IPCF         TO FORCE I/P BUF FILL
        LDA     DSIP         DISK I/P FOR
        STA     FLIR         FILL I/P BUF TASK (N.T. IS MMVE)
```

```
*            MACRO CALL—Continued
      LDA    FLWR           FILL WK BUF
      JMP    OXT            OUF WK BUF FILL
*
*
*     MAIN DATA MOVING LOOP -- MACRO MOVE
*
MMVE  DAC    *+1
      PZE
      DAC    **
*     CHECK CURRENT MACRO INPUT FRAME IS IN I/P BUFFER
      LDA    IPCF
      CAS    =-1
      CAS    IBHF           1 FOR MT, 6 FOR DISK
      JMP    MM10           NO, FILL I/P AND RE-Q
      JMP    MM10           DITTO
      MPY*   PDCA
      IAB
      STA    IBX
      JST    CKIR           I/P BUF INDEX TO MACRO FRAME
                            CHECK CHANNELS IN CURRENT FRAME OF I/P BUF
*     CHECK CURRENT FRAME TO PROCESS IS IN WK BUFFER
      LDA    WBCF
      CAS    =-1
      CAS    =6
      JMP    MM15           NO, WRITE WK BUFFER
      JMP    MM15           AND FILL WITH NEW DATA, AND RE-Q
      MPY*   PDCA           CHNLS/FRAME
      IAB
      STA    WBX            WK BUF INDEX TO PROG FRAME
      JST    CKWR           CHECK CHANNELS IN CURRENT FRAME OF WK BUF
*     MACRO AND PROGRAM FRAMES BOTH IN CORE -- MERGE
      LDA*   MCCA           NO. CHNLS IN MACRO CALLED
      TCA
      STA    TSC1
      LDA    MCCA
      STA    TSP3           MC CH SET ADDR
      LDA    MCCP           PROG STORAGE POINTERS ADDR
      SSM                   SET INDIRECT BIT
      STA    TSP2           POINT TO POINTERS TO WK BUF
      LDA    MDCA           MACRO DATA REF
      SSM
      STA    TSP1           POINT TO POINTERS TO I/P BUF
*
MM05  IRS    TSP1           NEXT MACRO CHANNEL
      IRS    TSP2           PLACE TO PUT IT
      IRS    TSP3           MC CH
      LDX    IBX            FRAME IN I/P BUF
      LDA*   TSP1,1         MACRO DATA
      SNZ
      JMP    MM06           MOVE NULL CHANNEL ALWAYS
      ICR                   DROP CHANNEL NO.
      ADD*   TSP3           ADD MC CHANNEL NO.
      ICA                   PUT IN ORDER
MM06  LDX    WBX            FRAME IN WK BUF
      STA*   TSP2,1         STORE MODIFIED PROG
      IRS    TSC1           NEXT
      JMP    MM05
*     MERGE FINISHED FOR THIS FRAME, CK IF LAST FRAME PROCESSED
      LDA    MPCF           FRAME JUST MERGED
      CAS    MPEF           LAST TO PROCESS
      JMP    *+2            NO
      JMP    MM20           YES, WRITE WK BUF AND EXIT
*     NOT FINISHED, CHANGE TO NEXT FRAME TO PROCESS
      ADD    PDIR           +1 IF FWD, -1 IF BCKWD
      STA    MPCF
      LDA    MICF           MACRO FRAME
      ADD    PDIR
      STA    MICF
      LDA    IBCF           I/P BUF FRAME
      ADD    PDIR
      STA    IBCF
      LDA    WBCF
      ADD    PDIR
      STA    WBCF
      LDA    MMVE           RE-Q THIS TASK
      JMP    OXT
```

```
*              MACRO CALL—Continued

* HERE TO FILL INPUT BUFFER (MMVE IS NEXT TASK)
MM10 LDA    FLIB            MAG TAPE OR DISK I/P OF
     JMP    QXT             MACRO DATA INTO I/P BUF
* HERE TO WRITE WORK BUFFER AND REFILL IT
MM15 LDA    FLWR            FILL WK BUF
     STA    WWNT            N.T. AFTER WRITE WK BUF
     LDA    WRWB            WRITE WORK BUF
     JMP    QXT
* HERE WHEN LAST FRAME OF MACRO MOVED, WRITE WK BUF AND EXIT
MM20 LDA    EXIT
     STA    WWNT            N.T. AFTER WRITE WK BUF
     LDA    WRWB            WRITE WK BUF
     JMP    QXT
*
* THIS TASK FILLS INPUT BUFFER FROM DISK (CALLED WHEN FLIB=DSIP)
*
DSIP DAC    *+1
     PZE
     DAC    **
     LDA    MICF            MACRO INPUT CURRENT FRAME
     JST    CUTS            COMPUTE UNIT, TRK, SECTOR
     LDX    MCSX            SET SHOW
     STA*   ARUA,1
     STA    IBCU            INPUT BUFFER CURRENT UNIT
     IAB
     STA*   ARSA,1
     STA    IBCS            INPUT BUFFER CURRENT SECTOR
     LDA    FRIB            FRAME IN BUFFER
     STA    IBCF            I/P BUF CURRENT FRAME
     LDA    MIBA            MACRO INPUT BUFFER ADDRESS
     STA*   I654,1          D.R. I/P BUF
     LDA    MBNW            MACRO BUFFER NO. WORDS
     STA*   I655,1          D.R. NO. WDS
     LDA    ME22
     STA*   I656,1          D.R. ERROR NEXT TASK
     LDA    MMVE            MACRO MOVE IS
     STA*   I657,1          D.R. N.T.
     LDA*   I658,1          D.R. ENTRY
     JMP    QXT
*
IBCU BSS    1
IBCS BSS    1
*
*
*
* THIS TASK WRITES THE WORKING BUFFER BACK OUT TO DISK
*
WRWB DAC    *+1
     PZE
     DAC    **
     LDX    MCSX            SHOW
     LDA    WBCS            T/S WHERE WK BUF CAME FROM
     STA*   AWSA,1
     LDA    WBCU            UNIT
     STA*   ANUA,1
     LDA    MWBA
     STA*   I606,1          DISK O/P BUF ADDR
     LDA    MBNW
     STA*   I607,1          NO. WDS
     LDA    WWNT
     STA*   I615,1          NEXT TASK AFTER DISK WRITE
     LDA*   I616,1          D.R. ENTRY
     JMP    QXT
*
WBCS BSS    1
WBCU BSS    1
WWNT BSS    1
WBCF BSS    1
*
*
* THIS TASK FILLS THE WORK BUFFER WITH DATA CONTAINING FRAME
*
FLWR DAC    *+1
     PZE
```

```
*               MACRO CALL—Continued
        DAC     **
        LDX     MCSX            SHOW
        LDA     MPCF            MACRO PROCESS CURRENT FRAME
        JST     CUTS
        STA*    ARUA,1          VIRT UNIT TO READ
        STA     WBCU            WK BUF CURRENT UNIT
        IAB
        STA*    ARSA,1          T/S TO READ
        STA     WBCS            WK BUF CURRENT T/S
        LDA     FRIB            FRAME IN BUFFER
        STA     WBCF            WK BUFFER CURRENT FRAME
        LDA     MWBA            WK BF ADDR
        STA*    I654,1          D.R. BUF ADDR
        LDA     MBNW
        STA*    I655,1          NO. WDS
        LDA     ME23
        STA*    I656,1          N.T. IF PAR OR DMC ERR
        LDA     MMVE            N.T. AFTER FILL WK BUF
        STA*    I657,1          N.T. AFTER READ
        LDA*    I658,1          D.R. ENTRY
        JMP     QXT
*
*  CLEAR TT CLAIM FLAG AFTER ERR MESSAGE
OACF    PZE
        DAC     **
        CRA
        STA     TTCF
        LDA     EXIT
        JMP     QXT
*
*  THIS TASK CLEARS CLAIM FLAGS RELEASING PERIPHERALS, PROG
*
EXIT    DAC     *+1
        PZE
        DAC     **
        LDX     MCSX            SHOW
        LDA     IEX1            ID PEEL RECALL TASK
        STA*    I217,1          NEXT TASK AFTER REWIND WORK TAPE
        LDA*    I216,1          REWIND ENTRY POINT
        JMP     QXT             QUEUE IT
IEX1    DAC     EX1             ID PEEL RECALL TASK
*
EX05    PZE
        DAC     **
        LDX     MCSX            SHOW INDEX
        CRA
        STA*    I602,1
        LDX     MCCX            CMCS
        STA     MCFL
        IMA     MPEL            RESET FLAG
        STA*    ERFA,1          SET PER LAMP IF ERROR
        LDA     CI1A
        STA*    SW5A,1          SET COMMAND PROG SWITCH
        LDA     PCRF
        SUB     =1              DECREMENT
        STA     PCRF            BUSY FLAG
        JMP*    EX05+1          RETURN
*
*
MIRA    BSS     1
MWBA    BSS     1
MBNW    BSS     1
PDIR    BSS     1
MPEF    BSS     1
MPCF    BSS     1
IBHF    BSS     1
FLIR    BSS     1
IBCF    BSS     1
WBX     BSS     1
IBX     BSS     1
MICF    BSS     1
*
*
*
```

```
*              MACRO CALL—Continued
* COMPUTE VIRTUAL UNIT, TRK/SECTOR AND FRAME IN BFR FROM FRAME
*
CUTS DAC    **
     STX    XSAV
     STA    FFIR
     LDX    MCCX         CCXS
     SUB*   100R,1       PROG BFR START FRAME
     MPY    =1
     ADA    =1
     DIV    =6
     STA    NB           NR. BUFFERS
     LAB
     STA    FRIB         FRAME IN BUFFER
     TCA
     ADD    FFIR         CALL FRAME
     STA    FFIR         FIRST FRAME IN BUFFER
     LDA    =1A344       S/R
     SUB*   1CSS,1       CCAS START SECT
     MPY    =1
     DIV*   1A69,1       S/BF = BF IN LD UNIT
     TCA
     ADD    NR           NR. BUFFERS
     SPL
     JMP    CU2          ENOUGH IN LD UNIT?
                         YES, COMPUTE FROM LD
     MPY    =1           NO, BFR STARTS FROM NEXT UNIT
     DIV*   1A69,1       S/U
     ADA
     ADD*   1CSU,1       CCAS START UNIT
     STA    NB           TEMP
     LAB
     MPY*   1669,1       S/B = T/S IN BREG
     LDA    NR           VIRT UNIT TO A REG
CU1  LDX    XSAV         RESTORE
     JMP*   CUTS         RETURN
*
CU2  LDA    NR           BFS
     MPY*   1669,1       S/B = SECTORS
     LAB
     ADD*   1CSS,1       CCAS START SECT
     LAB
     LDA*   1CSU,1       CCAS START VIRT UNIT
     JMP    CU1          RETURN
*
XSAV BSS    1
NR   BSS    1
*
FFIR BSS    1            FIRST FRAME IN BUFFER
FRIB BSS    1            FRAME WITHIN BUFFER (0 - 5)
*
* ROUTINE TO STORE ONE CHARACTER IN BUFFER AT BREF
*              LEFT CHARACTER IF BREF SIGN IS 0
*              RIGHT CHARACTER IF BREF SIGN IS 1
*
SC1B DAC    **
     STA    ASAV
     CAL                 RIGHT CHARACTER IN A
     STA    ACH
     LDA    BREF
     SSP
     STA    *BREF        USED TO STORE
     LDA    BREF
     ALR    1            INCREMENT BREF BY ONE CHARACTER
     ADA
     ARS    1
     INA    BREF
     SPL
     JMP    SC17         LEFT CHARACTER DONE?
     LDA*   BREF         NO, PUT IN RIGHT CHAR
     LCR                 YES, PUT IN LEFT
     ADE    ACH
     LGA
SC12 STA*   BREF         STORE WORD WITH ONE CHARACTER
     LDA    ASAV         RESTORE A
     JMP*   SC1B         RETURN
```

```
                        —Continued

SC13    LDA*    WREF
        CAR
        ADD     ACH
        JMP     SC12
*
ASAV    BSS     1
ACH     BSS     1
WREF    BSS     1
HREF    BSS     1
*
NCTP    DAC     *CUF
MTPA    DAC     MTPA
*
*
CKIR    DAC     **
        ADD     MIFA
        STA     TSP4
        LDA     IRHF
        ERA     =6              DISK INPUT ?
        SZE
        JMP     CKIT            NO, CK TAPE BUF
        JST     CKDR            YES CK
        JMP*    CKIR            ALL OK, RETURN
CK12    JST     PROA            BAD CHANNEL, MSG AND ABORT
        SCI     1,M*
        LDA     =25
CHR2    STA     MENO
        JST     PRAM
        DAC     TSP1
        DAC     RM25
        JMP     TP25+1          GO WRAP UP
*  HERE TO CHECK TAPE INPUT CHANNELS
CKIT    LDA     =6
        STA     TSP1
        LDA     =-250
        STA     TSC1
CKT2    LDA*    TSP4            CH, DATA
        SNZ
        JMP     CKT3            CH MUST HAVE 0 DATA
        ICL                     CH ONLY
        STA     TSP2            FOR PRINT
        ERA     TSP1            COMPARE S.B.
        SZE
        JMP     CK12            NO GOOD, PRINT
CKT3    IRS     TSP1            NEXT CH S.B.
        IRS     TSP4            NEXT CH IN BUF
        IRS     TSC1            COUNT
        JMP     CKT2            OK
        JMP*    CKIR            ALL OK, RETURN
*
CKDR    DAC     **
        LDA     PECA            ADDR OF PD CH SET
        STA     TSP3
        LDA*    TSP3
        TCA
        STA     TSC1
        IRS     TSP3
CKD2    LDA*    TSP4
        SNZ
        JMP     CKD3            CHECK IF ALL 0
        ICL
        STA     TSP2            FOR PRINT IF ERR
        ERA*    TSP3
        SNZ
        JMP     CKD3
        LDA*    TSP3            CH NEEDED
        STA     TSP1            FOR PRINT
        IRS     CKIR            TO BUF SET
        JMP*    CKDR            OR SET
*
CKD3    IRS     TSP3            NEXT CH CH
        IRS     TSP4            NEXT DATA WD
        IRS     TSC1            COUNT
```

MACRO CALL—Continued

```
        JMP     CKD2
        JMP*    CKDR            ( TCH
*
CK4D    DAC     **
        ADD     MWRA
        STA     TSP4
        JST     CKLP
        JMP*    CKNR            OK, RET
        JST     PRCA            ERR
        RCI     1,R*
        LDA     =26
        JMP     CMER
*
*
* MACRO IS ON TAPE IF TAPE CAN BE SUPPLIED. REQUEST TAPE
*
MTRQ    LDA     MTRA
        LDX     MCSX
        STA*    1215,1          TAPE BUF ADDR
        LDA     MOPN
        JST     QTRQ
        DEC     1               REEL 1
        DAC     MT05            NEXT TASK WHEN I.D. IS IN
        DAC     ME6+1           NEXT TASK IF TP OPER ABT
*
MT05    PZE
        DAC     **
* COMPUTE RECORDS TO SKIP TO FIRST FRAME RECORD
        LDX     =2              FOR NTRQ
        LDA*    MTRA,1
        LDX     =3              FOR NTRC
        ADD*    MTRA,1
        LDX     MCSX            SET SHOW
        STA*    1643,1          REC TO SKIP
        LDA     MT10
        STA*    1647,1          N.T. AFTER REC SKIP
        LDA*    1644,1          REC SKIP ENTRY
        JMP     QXT
* TAPE POSITIONED AT FIRST DATA RECORD, SET UP POINTERS ETC.
MT10    DAC     *+1
        PZE
        DAC     **
        LDX     MCCX            SET CONS
        LDA*    1674,1          PROG WK BUF ADDR
        STA     MWRA            MACRO WK BUF ADDR
        LDA     MTRA
        ADD     =2
        STA     MIRA            MACRO INPUT BUFFER ADDR
*
        LDA     MCCA            RC CH SET ADR
        STA     TSP1
        LDA*    TSP1            DCCS NO. CH
        TCA
        STA     TSC1            TC CH CTR
        LDA     MLCA            MRCS ADDR
        STA     TSP2
        LDA     MCCA            RC STORE POINTERS ADDR
        STA     TSP3
*
MT15    ISZ     TSP1            NEXT RC CHNL
        IRS     TSP2            NEXT RC CHNL
        IRS     TSP3            NEXT RC POINTER
*
        LDA*    TSP2
        SUB     =*
        ANA     MIRA            LETTER TO TAPE
        STA*    TSP2            INPUT BUFFER
*
        LDA     PLCA            PROG ADDR
        STA     TSP4
        LDA*    TSP4
        TCA
        STA     TSC2
        LDA*    TSP1            RC CHNL
```

MACRO TABLE — Continued

```
MT20    IRS     TSP4
        CAS*    TSP4            PD CHNL
        JMP     *+2
        JMP     MT25            EQUAL, SET POINTER
        IRS     TSC2
        JMP     MT20            NEXT PD CHAN
        HLT                     SHOULD NEVER HAPPEN HERE
MT25    LDA     TSP4            PD CHNL
        SUB     PDCA
        SUB     =1              POSITION IN FRAME
        ADD     MWRA
        STA*    TSP3            SET STORE POINTER
        IRS     TSC1
        JMP     MT15            NEXT MC AND MD CHNL
* POINTERS FINISHED, INITIALIZE AND JP MAIN LOOP
        LDA     =1              PROCESS DIRECTION IS
        STA     PDIR            ALWAYS FORWARD FOR MAG TAPE SOURCE
        LDA     MCSF            CALL START FRAME IS
        STA     MPCF            FIRST FRAME TO PROCESS
        LDA     MDSF            MACRO DEF START FRAME IS
        STA     MICF            FIRST FRAME TO USE
        LDA     MCEF            MC END FRAME
        STA     MPEF            LAST FRAME TO PROCESS
        LDA     =1              HIGH FRAME IN BUFFER
        STA     IBHF            FOR MAG TAPE I/P
        STA     IBCF            TO FORCE I/P BUF FILL
        LDA     TPIP            MAG TAPE I/P FOR
        STA     FLIB            FILL I/P BUF TASK (N.T. IS MMVA)
        LDA     FLMB            FILL WK BUF (N.T. IS MMVA)
        JMP     OXT
*
        FIN
RA20    EQU     *
        EJCT
        ORG     *2190*
        SETW    RA21
*
* THIS TASK FILLS INPUT BUFFER FROM TAPE (CALLED WHEN FLIB = THIS)
*
TPIP    DAC     *+1
        PZE
        DAC     **
        LDX     MCSX            SRCE
        LDA     MTBA
        STA*    I215,1          TP BUF ADDR
        LDA     ME17
        STA*    I212,1          PD RET
        LDA     ME18
        STA*    I213,1          RECF RETURN
        LDA     TP05
        STA*    I214,1          TP RT N.T.
        LDA*    I211,1          TP RT ENTRY
        JMP     OXT
*
TP05    DAC     *+1
        PZE
        DAC     **
        LDA*    MTBA            FRAME NO
        IAR
        LDA     MICF            FRAME DESIRED
        JST*    CKMA
        JMP     TP15            TP FR.GT. DESIRED, ABORT
        JMP     TP10            TP FR = DESIRED Q MOVE
        LDA     TPIP            TP FR.LT. DESIRED, RE-Q
        JMP     OXT
TP10    CRA
        STA     IBCF            CURRENT FRAME IS IN BUFFER
        LDA     MMVE
        JMP     OXT
* FRAME .GT. DESIRED ARE WE LOOKING FOR 1ST MACRO FRAME ?
TP15    LDA     MICF            CURRENT MACRO INPUT FRAME
        ERA     MDSF            EQUAL MDSF ?
        SZE
        JMP     TP20            NO, HENCE GAP, WRAP UP GOOD DATA AND ABORT
```

MACRO CALL—Continued

```
        JST     PRAN            YES, MACRO NOT ON TAPE
        DAC     LT19            LIST = MDSF,*MTRA
        DAC     EM19            FORMAT= MDSF\ < TAPE SF\*
        LDA     =19
        JMP     QABT
LT19  DAC     MDSF
        DAC*    MTRA
*
TP20  JST     PRCA
        DAC     FM21            GAP*
        LDA     =21
* HERE TO LIST LAST DATA MOVED AND WRITE IT ON DISK AND ABORT
TP25  STA     MENO
        LDA     MICF
        SUB     PDIR
        STA     TSP2
        LDA     MPCF
        SUB     PDIR
        STA     TSP4
        LDX     =1              FOR EFS IF PDIR IS -
        IRS     PDIR
        LDX     =0              FOR SFS
        LDA     MDSF,1          START FRAME OR END FRAME
        STA     TSP1
        LDA     MCSF,1          SF OR EF
        STA     TSP3
* DO NOT LIST FRAMES XFRD IF CURRENT FRAME IS START FRAME OF PROCESS
        LDA     MPCF
        SNZ             *,
        JMP     TP26            NO DATA XFRD, PRINT ONLY ERROR MSG
        JST     PRAN
        DAC     LT2X            LIST = TSP1-TSP4 FOR FIRST*LAST WF AND PF
        DAC     FM2X            FORMAT = "CP/LF" ( WF\-\XFRD TO PF\=\)*
* DON'T WRITE WK BUF IF LAST FRAME ALREADY WRITTEN IN LAST BF
        LDA     WBCF
        SUB     PDIR
        CAS     =-1
        CAS     =0
        JMP     TP26            LAST FRAME WAS IN LAST BUFFER
        JMP     TP26            DON'T WRITE THIS BUFFER
        LDA     TP30            N.T. AFTER DATA WRITE
        STA     WWAT
        LDA     WRWB            WRITE WK BUFFER
        JMP     QXT
LT2X  DAC     TSP1
        DAC     TSP2
        DAC     TSP3
        DAC     TSP4
*
TP26  LDA     TP30
        JMP     QXT
*
TP30  DAC     *+1
        PZE
        DAC     **
        JMP     QABT+1          MENO IS SET, DO MESSAGE AND ABORT
* HERE IF TAPE READ PARITY ERROR
ME17  DAC     *+1
        PZE
        DAC     **
        JST     PRCA
        DAC     EM17            TPE*
        LDA     =17
        JMP     TP25
*
* HERE IF DOUBLE END OF FILE READING TAPE
ME19  DAC     *+1
        PZE
        DAC     **
        JST     PRCA
        DCI     3,2EOF*
        LDA     =19
        JMP     TP25
```

```
*              MACRO CALL  4/19/71—Continued
*
*   HERE TO Q ABORT MESSAGES AND EXIT
QABT  STA    MENO          MACRO ERROR ID NO.
      IRS    MEFL
      LDA    I333          LOC OF CONS NO. TABLE
      ADD    MCCX          INDEX BY CONS
      STA    LTQA          STORE AS LIST POINTER
      LDA    BREF
      SPL
      ADD    ='100001
      SUB    EMBA
      ADD    =5
      STA    QAML          MSG LENGTH
      LDA    EMHA
      STA    BREF
      JST    PRAN
      DAC    LTQA
      DAC    EMHB
QAB2  LDA    QAWT          WAIT
      JMP    QXT
*
QABP  DAC    *+1
      PZE
      DAC    **
      JST*   TTOL
EMHA  DAC    EMBH
QAML  ***
      DAC    QACF          NEXT TASK IS CLEAR TT FLAG AFTER MSG
      JMP    QXT+1         RETURN TO EXEC
LTQA  DAC    **            PHYS CONS NO.
      DAC    MENO          ERROR ID NO.
*
EMBA  DAC    EMFF
*
QAWT  DAC    *+1
      PZE
      DAC    **
      LDA    =1            SETS IF RESET,
      IMA    TTCF          NO EFFECT IF SET
      SZE
      JMP    QAB2          RE-Q WAIT
      LDA    QABP          Q PRINT
      JMP    QXT
*
*
*
QTRQ  DAC    **
      STA    QTRP          REQUESTED PROG NO.
      LDX    QTRQ
      LDA    0,1
      STA    QTRR          REQUESTED REEL NO.
      LDA    1,1
      STA    QTNT          NEXT TASK
      LDA    2,1
      STA    QTAT          N.T. IF OPER ABORT
      LDX    MCSX          SHOW
      LDA*   I215,1
      STA    QTBA          TAPE BUFFER ADDR (PRESET)
      LDA*   I104,1        TAPE UNIT NUMBER
      STA    QTTU
QT04  LDA    QT05
      JMP    QXT
*
QT05  DAC    *+1
      PZE
      DAC    **
      LDX    MCSX          SHOW
      LDA*   I211,1        TAPE READ ENTRY
      STA*   I217,1        REW NEXT TASK
      LDA    QT35
      STA*   I212,1        PE RETURN
      STA*   I213,1        ZERO RETURN
      LDA    QT10
      STA*   I214,1        TAPE READ N.T.
```

```
*              MACRO CALL   4/19/71-Continued
       LDA*    I216,1          REWIND ENTRY
       JMP     QXT
*
QT10 DAC       *+1
       PZE
       DAC     **
       LDA*    QTBA            SHOW NO.
       MPY     =10
       IAB
       LDX     QTBA            REF FOR TAPE BUFFER
       ADD     1,1             +SUB SHOW = PROG NO.
       STA     QTTP            TAPE PROG. NO.
       LDA     '30             LAST INPUT WORD + 1
       SUB     QTBA            FIRST WORD = NO. WDS I/P
       SUB     ='100003
       CAS     =1
       LDA     4,1             NEW TYPE ID RECORD WITH REEL NO
       JMP     QT12            4 WORDS MEANS REEL 1
       CRA                     .LT. 4 MUST BE 2 = OLD MULTIREEL
*                              STORE 0 FOR OLD 2ND, 3RD, ETC.
QT12 STA       QTTR            TAPE REEL NO.
* SET PROPER IDRA INDICATION
       CAS     =1
       CRA
       NOP
       LDX     MCSX            SHOW
       STA*    IDRA,1
       LDA     QTTP            TAPE PROG
       ERA     PDPN            PROG DEF PROG
       SNZ
       JMP     QT14            EQUAL, INDIC OK.
       CRA                     NOT EQUAL
       STA*    IDRA,1          CLEAR IT
* CHECK IF REQUESTED TAPE IS ON
QT14 LDA       QTTP            TAPE PROG
       ERA     QTRP            REQUESTED PROG
       SZE
       JMP     QT20            NO, REQUEST TAPE
       LDA     QTRR            YES, CK REEL
       CAS     =1              REEL OK IF REQUEST = ZERO
       LDA     QTTR            OR IF REQ.GT.1 AND TAPE
       SNZ                     REEL IS ZERO (UNDEF NOT -1)
       JMP     QT15            REEL OK
       LDA     QTTR            OTHERWISE CK EQUAL
       ERA     QTRR
       SZE
       JMP     QT20            NO GOOD, REQUEST TAPE
QT15 LDA       QTNT            REEL OK, O N.T.
       JMP     QXT
*
QT20 JST       MINI
       JST     PRAN
       DAC     QTLT
       DAC     QTFO
       LDA     QT25            2 TYPE TASK
       JMP     QXT
QTLT DAC       QTRP
       DAC     QTRR
       DAC     QTTU
* TYPE TAPE REQUEST
QT25 DAC       *+1
       PZE
       DAC     **
       LDA     TTCF
       SNZ
       JMP     QT26
       LDA     QT25            RE-Q
       JMP     QXT
QT26 IRS       TTCF
       JST*    TTCL
       DAC     EMRF
       DEC     15
QT27 DAC       QT28            NEXT TASK
       JMP*    QT25+2
```

\*           MACRO CALL   4/19/71—Continued
\*
QT28 PZE
     DAC    \*\*
     JST    MINI
     JST    PRAN
     DAC    MCNO
     DAC    EMMC           MACRO S *
     JST*   TOIL
     DAC    QTGA           GO OR AB!
     DEC    5
     DAC    CCTS
     DEC    1
     DAC    QT30           N.T.
     JMP*   QT28+1
\*
QT30 PZE
     DAC    \*\*
     LDA    CCTS
     CAS    =AGO           GO ?
     JMP    \*+2            NO
     JMP    QT32           YES, CK IF RIGHT TAPE NOW
     CAS    =AAB           NO, ABORT ?
     JMP    \*+2            NO,
     JMP    QT31           YES, Q ABORT TASK
     LDA    QT27           NEIGHER, RE-Q
     JMP    QXT
QT31 CRA
     STA    TTCF
     LDA    QTAT
     JMP    QXT
QT32 CRA                   CLEAR TTCF
     STA    TTCF           TO BE FREE FOR NEX MSG IF ANY
     JMP    QT04           GO CK TAPE ID
\* HERE IF PARITY OR ABNORMAL TAPE RETURN OR 2EOF
QT35 DAC    \*+1
     PZE
     DAC    \*\*
     LDA    TTCF
     SNZ
     JMP    QT36
     LDA    QT35
     JMP    QXT            RE-Q
\*
QT36 IRS    TTCF
     JST*   TTOL
     DAC    QTM2
     DEC    3
     DAC    QT37           CLEAR TTCF, THEN ASK FOR TAPE AGAIN
     JMP*   QT35+2
\*
QT37 PZE
     DAC    \*\*
     CRA
     STA    TTCF
     JMP    QT20           SET UP REQ MESG AND Q PRINT
\*
QTRP BSS    1
QTRR BSS    1
QTNT BSS    1
QTAT BSS    1
QTHA BSS    1
\*
QTTP BSS    1
QTTF BSS    1
QTTU BSS    1
\*
\*  THIS SUBROUTINE CONVERTS A TO A SIGN IF MINUS FOLLOWED BY
\*         THE DECIMAL VALUE WITHOUT LEADING ZEROES OR BLANKS
\*         THE ASCII CHARACTERS ARE STORED SEQUENTIALLY BY SCIB
PRCN DAC    \*\*
     STA    PNA
     STA    PNN
     STX    PNX
     SNZ MACRO CALL 4/19/71 —Continued

```
        JMP     PN07            PRINT SINGLE ZERO
        SMI
        JMP     PN02            SKIP SIGN IF PLUS
        TCA
        STA     PNN
        LDA     =A--
        JST     SCIB            STORE MINUS
PN02    IAB
        STA     PNB
        CRA
        STA     PNLZ
        LDX     =-5
        LDA     PNN
        MPY     =1
        ANA     =1              IN CASE OF -32768
PN03    DIV     =10000
        ADD     =A00            FOR ASCII
        CAS     =A00            ZERO ?
        JMP     PN04            NO, PRINT AND SET ZERO PRINT
        LDA     PNLZ            YES, CK IF PRINT
        SNZ
        JMP     PN05            NO
PN04    JST     SCIB            YES, PRINT
        LDA     =A00
        STA     PNLZ            SET ZERO PRINT
PN05    IAB
        MPY     =10
        IRS     0
        JMP     PN03
        LDA     PNB
        IAB
PN06    LDA     PNA
        LDX     PNX
        JMP*    PRCN
PN07    LDA     =A00            PRINT
        JST     SCIB            SINGLE ZERO
        JMP     PN06            EXIT
*
PNN     BSS     1
PNA     BSS     1
PNB     BSS     1
PNX     BSS     1
PNLZ    BSS     1
*
*
GETC    DAC     **
        LDA     CREF            CHAR POINTER - FOR RIGHT CHAR
        CSA                     SIGN TO C, 0 TO SIGN
        STA     WCRF            REF WD WITH CHAR
        LDA*    WCRF            WORD
        SSC                     SKIP IF RIGHT CHAR
        ICA                     PUT LEFT AT RIGHT
        CAL                     CLEAR
        ADD     ='120000        PUT BLANK IN LEFT CHAR
        IMA     CREF
        ALR     1               INCREMENT
        AOA                     TO
        ARR     1               NEXT
        IMA     CREF            CHARACTER
        JMP*    GETC
*
CREF    BSS     1
WCRF    BSS     1
*
GETL    DAC     **
        LDA*    LREF
        IRS     LREF
        JMP*    GETL
*
LREF    BSS     1
*
* PRINT ASCII DATA (AND NUMERIC IF ANY CONTINUING PREVIOUS LIST)
PRCA    DAC     **
```

\* MACRO CALL 4/19/71 —Continued

```
       LDA    PRCA         FORMAT REFERENCE
       STA    PRAN         SET IT FOR PRAN
       JMP    PRA1         SKIPS LIST REF SET IN PRAN
*  PRINT ASCII AND NUMERIC DATA
PRAN   DAC    **
       LDA*   PRAN         LIST REFERENCE
       STA    LIRF
       IRS    PRAN
PRA1   LDA*   PRAN         FORMAT REFERENCE
       SPL                 IS POINTER IF PLUS, FORMAT ITSELF IF MINUS
       LDA    PRAN         FORMAT BCI IS AT CALL +2 IF MINUS
       STA    CREF         FORMAT REFERENCE POINTER (CHARACTER REF)
*
*  SPECIAL CONTROL CHARACTERS NOT PASSED ON AS BCI:
*    + CAUSES EXIT
*    $ CAUSES PRINT IN DECIMAL OF LOCATION POINTED TO BY LIST MEMBER
*    \ CAUSES PRINT OF SAME THING IN FOOT.FRAME FORMAT (SPACE BEF+AFTR)
*    ! CAUSES DECIMAL PRINT OF LIST MEMBER ITSELF
*         (DECIAML PRINT PRINTS NO LEADING CHARACTERS)
*
PRAL   JST    GETC
       CAS    =A +         EXIT
       JMP    *+2          NO
       JMP    PRAX         YES, EXIT
       CAS    =A $         PRINT DECIMAL BY LIST
       JMP    *+2          NO
       JMP    PRDL         YES, GO PRINT
       CAS    =A !         PRINT DECIMAL OUT OF LIST
       JMP    *+2          NO
       JMP    PREP         YES, GO PRINT
       CAS    =A \         PRINT FOOT.FRAME BY LIST
       JMP    *+2          NO
       JMP    PRBS         YES, PRINT SPACE, FOOT.FRAME, SPACE
       JST    SCIB         NO, MUST BE BCI INFO TO PASS ON AS IS
       JMP    PRAL         GET NEXT CHARACTER IN FORMAT
*
PRAX   LDA*   PRAN         WAS FORMAT AT CALL +2 ?
       IRS    PRAN         TO CALL +3 FOR NORMAL RETURN
       SMI
       JMP*   PRAN         NO, FORMAT WAS POINTED TO. NORMAL RETURN
       LDA    CREF         YES, MAKE RETURN TO WORD AFTER FORMAT
       SPL
       ADD    ='100001
       STA    PRAN
       JMP*   PRAN
*
PRDL   LDA*   LIRF         LIST MEMBER
       STA    PRAW         WK
       LDA*   PRAW         NUMBER POINTED TO BY LIST MEMBER
PRD2   JST    PRCN         PRINT
       IRS    LIRF         ADVANCE LIST POINTER
       JMP    PRAL         NEXT FORMAT CHARACTER
*
PREP   LDA*   LIRF         LIST MEMBER ITSELF TO BE PRINTED
       JMP    PRD2         GO PRINT
*
PRBS   LDA    =A
       JST    SCIB         PRINT ONE SPACE
       LDA*   LIRF         LIST MEMBER
       STA    PRAW
       LDA*   PRAW         NUMBER REFERENCED BY LIST MEMBER
       LRL    4            FOOT PART
       JST    PRCN         PRINT
       LDA    =A .         POINT BETWEEN FOOT AND FRAME
       JST    SCIB         PRINT POINT
       CRA
       LLL    4            FRAME PART
       JST    PRCN         PRINT FRAME
       LDA    =A
       JST    SCIB         ONE SPACE
       IRS    LIRF
       JMP    PRAL
*
LIRF   BSS    1            LIST REFERENCE
```

\* MACRO CALL  4/19/71 —Continued

```
PRAW BSS    1              TEMP
*
*
*     CREATE SINGLE-CHANNEL CH SET IF NO. GT. 5K.
CSCS DAC    **
     CAS    =5000
     JMP    CSC2
     JMP*   CSCS           UNDEF
     IRS    CSCS           NORMAL
     IRS    CSCS           RETURN
     IRS    CSCS
     JMP*   CSCS
*
CSC2 SUB    =5000
     CAS    =5
     CAS    =256
     JMP*   CSCS           ILLEGAL
     JMP*   CSCS           CHANNEL UNDEF
     IRS    CSCS           TO CS ADDR
     LDX*   CSCS           LOC OF CS ADDR
     LDX*   0              CS ADDR = WHERE TO STORE CS
     STA    1,1            CH NO
     LDA    =1             NO OF CHANNELS
     STA    0,1
     IRS    CSCS
     LDA*   CSCS           NEXT TASK
     JMP    QXT            QIT
*    ID REEL RECALL TASK
*
EX1  PZE
     DAC    **
     LDX    MCSX           SHOW
     LDA*   IDRA,1         ID REEL MOUNTED?
     SZE
     JMP    EX5            YES, GO EXIT
     LDA    MTBA           NO, REQUEST IT BACK
     STA*   I215,1         BUFFER
     LDA    PDPN           PRG DEF PROG NO.
     JST    QTRQ           REQUEST IT
     DEC    1              REEL
EX2  DAC    EX05           EXIT
     DAC    EX05           EXIT
EX5  LDA    EX2
     JMP    QXT
*
     FIN
BA21 EQU    *
*
     EJCT
     ORG    '36000
MCWP BSS    126
MTBF BSS    252
*
     ORG    '55710
*
EM1  BCI    3,UNDEF+
EM2  BCI    7,MCSF\< PDSF\+
EM3  BCI    7,MCEF\> PDEF\+
EM4  BCI    3,MD PE+
EM5  BCI    6,: TRY MCEF\+
EM7  BCI    7,MCCS ! BAD RD+
EM10 BCI    12,CH # MCCS T NOT IN PROS+
EM11 BCI    7,MDCS ! BAD RD+
EM13 BCI    7,MDCS ! UNDEF+
EM15 BCI    13,MDCS # = # CH, MCCS T = T+
EM17 BCI    2,TPE+
EM19 BCI    8,MDSF\< TAPE SF\+
EM20 BCI    7,MCCS ! UNDEF+
EM21 BCI    2,GAP+
EM22 BCI    8,DPE VL! T! S! +
EM25 BCI    4,CH!=! +
EM2X OCT    106612         CR/LF
     BCI    11,( MF\-\XFR\ TO PF\-\)+
```

```
*          MACRO CALL   4/15/71 —Continued
EMMC BCI   5,MACRO ! *
QTFO BCI   12,PUT PROG $ REEL $ ON UI*
EMHD BCI   5,C$ MCE$:*
*
     DEC   1
     PZE
QTM2 BCI   3,BAD I*
     DEC   1
     PZE
QTGA BCI   5,GO OR AB:
*
     DEC   1
     PZE
EMBH BCI   5,
EMBF BCI   15,
     BCI   10,
*
*
     END
```

*EXECUTIVE PACKAGE.

```
*
CSUP EQU   '57000          CONT SUPERVISOR ADDRESS
PFGG EQU   '57016          PWR FAIL FLAG LOC IN CONT SUP
     ORG   '100
TYPP DAC   TYYP            INTERRUPT TYPEOUT VECTOR
ADTK DAC   ADDT            QUE UP VECTOR
HSP  DAC   HSPP            HIGH SPEED PUNCH VECTOR
HSR  DAC   HSRR            HS READER INITIATION VEC
     PZE                   SPARE
     PZE                   SPARE
INBF DAC   TTIB            ASR INPUT BUFFER BEGINNING ADDRESS
MTRD DAC   MTR             MAG TAPE READ VECTOR
MTBW DAC   MTW             MAG TAPE BIN WRITE VEC
     PZE                   SPARE
DW0  DAC   DWW0            DISC WRITE VEC. CON 0.
DW1  DAC   DWW1            DISC WRITE VEC. CON 1.
DW2  DAC   DWW2            DISC WRITE VEC.CON 2
DW3  DAC   DWW3            DISC CONT 3 WRITE VEC
DR0  DAC   DRR0            DISC READ VEC. CON 0.
DR1  DAC   DRR1            DISC READ VEC. CON 1.
DR2  DAC   DRR2            DISC CONT 2 READ VEC
DR3  DAC   DRR3            DISC CONT 3 READ VEC
ASCI DAC   ACII            ASR ASCII INPUT VEC
IDEC DAC   IDC             ASR DECIMAL INPUT VEC
ASR  DAC   ASRR            ASR DEC INPUT INT VEC
ASI  DAC   ACI             ASR ASCII INPT INT VEC
     PZE                   SPARE
SIPP DAC   SIP             LOGGING VECTOR
LOG  DAC   LOGG            OUTPUT AND LOG VEC
OUTL DAC   OTL             OUTPUT INPUT AND LOG VEC
OINL DAC   OIL             BIN TO DEC VEC
BND  DAC   BNDC            LOGGING DEVICE.0-3TAPE.4 PNCH.
LOGD OCT   4
PDEC DAC   PDC             ON LINE TYPE DECIMAL VECTOR
MON  PZE                   BINARY MONTH
DAY  PZE                   BINARY DAY
YEAR PZE                   BINARY YEAR
HOUR PZE                   BINARY HOUR
MIN  PZE                   BINARY MINUTE
SEC  PZE                   BINARY SECOND
MT1  DEC   7               MONITOR RTU 1
     DEC   0               MONITOR RTU 2
MDMC DEC   6               MONITOR SCANNER DMC CNL
     DEC   0               2ND MONITOR DMC CHNL
ST1  DEC   10              SHOW XMTR 1
```

```
        DEC     12                      SHOW 2 XMTR
        DEC     0                       SHOW RTU 3
        DEC     8                       SHOW XMTR 4 OR CONSOLE XMTR
        DEC     9                       PROG CONS SCNSR 1
        DEC     11                      PROG CONSOLE SCANNER 2
        DEC     0                       CONSOLE SCANNER 3
LAST    DAC     IDLE
        ORG     '176
        PZE
*
*Q EXIT. QUEUE A TASK AND GO TO THE EXEC LOOP.
*
        ORG     '267
EXX     DAC     EXEC
QXT     JST*    ADTK
        JMP*    EXX
        ORG     '300
MASK    PZE                             STANDARD INTERRUPT MASK
BUSY    PZE                             ASR BUSY FLAG
TTIF    PZE                             PROCESS ASR INPUT FLAG
ICTR    PZE                             ASR INPUT WRD CNTR
OLAY    PZE                             SET WHEN OVERLAY AREA IN USE
RAF     PZE                             SET WEN ANIMATION IN OVERLAY AREA
ON      PZE                             MONITOR ALREADY ON FLAG
SON     PZE                             SET WHEN SHOW HAS BEEN STARTED
NDX     PZE                             INDEX STR FOR TIME SHARE CONTROL
RA      PZE                             SET WHEN ANOTHER ANIM REQ NOT AVAILABLE
TTOF    PZE                             ASR BUSY TYPING FLAG
BINP    PZE                             ASR BUSY INPUTTING FLAG
HRPI    PZE                             HS RDR INPUT PROCESS FLAG
PINK    PZE                             PRIORITY INTERRUPT MASK
PBSY    PZE                             PUNCH BUSY FLAG
QAT     PZE                             Q THIS AFTER TYPE
POCT    PZE                             HS PUNCH OUTPUT COUNTER
RBFA    PZE                             HS READER INPT STR VEC
RBSY    PZE                             HS READER BUSY FLAG
RPIF    PZE                             PROCESS READER INPUT FLAG
RCTR    PZE                             READER WRD CNTR -
MTSY    PZE                             MAG TAPE CONTROLLER BUSY FLAG
ML      PZE                             MONTH LENGTH
DBY0    PZE                             DISC CONT 0 BUSY FLAG
DBY1    PZE                             DISC CONT 1 BUSY FLAG
DBY2    PZE                             DISC CONT 2 BUSY FLAG
DBY3    PZE                             DISC CONT 3 BUSY FLAG
ABFA    PZE                             ASR DECIN BUF STR VEC
ACTR    PZE                             ASR DEC IN WRD CNTR
SIP8    PZE                             ASR I/O VECTOR
LOGF    PZE                             BUSY LOGGING FLAG
MT0A    PZE                             MAG TAPE 0 ASSIGN FLAG
MT1A    PZE                             MAG TAPE 1 ASSIGN FLAG
MT2A    PZE                             MAG TAPE 2 ASSIGN FLAG
MT3A    PZE                             MAG TAPE 3 ASSIGN FLAG
D0A     PZE                             DISC 0 ASSIGN FLAG
D1A     PZE                             DIAC 1 ASSIGN FLAG
D2A     PZE                             DISC 2 ASSIGN FLAG
D3A     PZE                             DISC 3 ASSIGN FLAG
SCTR    PZE                             SECONDS CNTR
MCTR    PZE                             MINUTES CNTR
HCTR    PZE                             HOURS CNTR
DCTR    PZE                             DAY CNTR
MCNT    PZE                             MONTH CNTR
*
*LOGGING ROUTINE.WED 970622.
*
        ORG     '51000
LOGG    PZE
        SS1                             SET SW1 TO LOG
        JMP     LG25
        LDA     LOGD                    GOG DEVICE NUM
        CAS     =4
        JMP*    LOGG                    ILLEGAL LOG DEVICE
        JMP     LG9                     PAPER TAPE
        JST*    LG30                    CK UNIT ON LINE
```

-Continued

```
        JMP     LG25
        LDA     LOGD        UNIT NUM
        JST*    LG31        EOT CK
        JMP     LG25
        IRS     LOGF        SET BUSY LOGGING FLAG
        LDA*    LOGG        MAG TAPE
        STA     LG5         STR MSG ADR
        IRS     LOGG
        LDA*    LOGG        NUM OF WRDS
        IRS     LOGG
        STA     LG6
        LDA     LG2-1
        JST*    ADTK
        JMP*    LOGG
        DAC     LG2
LG2     PZE
        PZE
        LDA     MTSY        MAG TAPE CONT BUSY
        SZE
        JMP     LG7
        LDA     LOGD        UNIT NUM
        JST*    MTBW
LG5     PZE                 MSG ADR
LG6     PZE                 MSG SIZE
        LDA     LG8         Q LOG TAPE BUSY
        JMP     QXT
LG7     LDA     LG2-1
        JMP     QXT
LG8     DAC     MLB
LG9     IRS     LOGF        SET BUSY LOGGING FLAG
        LDA*    LOGG        MSG ADR   LOG ON PAPER TAPE
        STA     LG12
        IRS     LOGG
        LDA*    LOGG
        IRS     LOGG
        STA     LG14
        LDA     LG10-1
        JST*    ADTK
        JMP*    LOGG
        DAC     LG10
LG10    PZE
        PZE
        LDA     PBSY
        SZE
        JMP     LG16
        JST*    HSP         CALL INT PNCH PROG
LG12    PZE
LG14    PZE                 NUM O F  WRDS
        LDA     PNW
        JMP     QXT
LG16    LDA     LG10-1
        JMP     QXT
LG25    IRS     LOGG
        IRS     LOGG
        JMP*    LOGG
LG30    DAC     IOL
LG31    DAC     EOT
PNW     DAC     PNCW

*
*PUNCH WAIT ROUTINE.
*
PNCW    PZE
        PZE
        LDA     PBSY
        SZE
        JMP     PN5
        CRA
        STA     LOGF        CLR BUSY LOGGING FLAG
        JMP*    PNCW+1      EXIT
PN5     LDA     PNW         RE-Q
        JMP     QXT
*
*CHECK MAG TPAE BUSY LOGGING.
```

```
*
MLB     PZE
        PZE
        LDA     LOGD            LOGGING UNIT NUMBER
        ADD     ='70010
        STA     ML5
ML5     SKS     '10             SKP IF LOG UNIT READY
        JMP     ML7             RE-Q
        CRA
        STA     LOGF            CLR BUSY LOGGING FLAG
        STA     MTSY
        JMP*    MLB+1
ML7     LDA     LGB             RE-Q LOG BUSY CHECK
        JMP     QXT
*
*PROCESS ALL REQUESTS.
*
        DAC     PR
PR      PZE
        PZE
        LDA     OLAY            OVERLAY FLAG
        SNZ
        JMP     PRC
        LDA     RAC             RA CODE
        CAS*    INBF
        JMP     *+2
        JMP     PRB             REQUEST FOR ANIMATION
PRA     CRA
        STA     BUSY
        JMP*    PR+1
PRB     LDA     RA
        SZE
        JMP     PRA
        LDA     P1-1
        JMP     QXT
PRC     LDA     NDX
        STA     U
        IRS     OLAY            SET OVERLAY AREA IN USE FLAG
        LDA     =-10
        STA     PARC
        LDA     END+19,1
        SUB     STRT+19,1
        AOA
        STA     LNTH
        LDA     STRT+19,1
        STA     BGN
        LDA     TSEC+19,1
        STA     STRK
        LDA     P-1
        JMP     QXT
*
*READ PROGRAM FROM DISC.
*
        DAC     P
P       PZE
        PZE
        LDA     DBYO
        SZE
        JMP     PAA             RE-Q
        LDA     STRK
        JST*    DRO
BGN     PZE                     QHERE PROGRAM BEGINS
LNTH    PZE                     LENGTH OF PROGRAM
        LDA     P7-1            Q CK SUM CK
        STA     QAR
        LDA     P-1             REQ IF PARITY ERR
        STA     DAR
        LDA     P2-1            DISC READY CK
        JMP     QXT
STRK    PZE
QAR     PZE                     Q THIS AFTER DISC READ
DAR     PZE                     Q THIS FI DISC PARITY
PAA     LDA     P-1             RE -Q
        JMP     QXT
```

```
RAC     BCI     1,RA
*
*EXECUTE SELECTED PROGRAM.
*
        DAC     P1
P1      PZE
        PZE
        LDX     NDX
        LDA     EXC+19,1
        JMP     QXT
*
*CHECK DISC BUSY.
*
        DAC     P2
P2      PZE
        PZE
        SKS     '121                    SKP IF DISC CONT READY
        JMP     P2B
        LDA     P3-1                    Q DISC PARITY CK
P2A     JMP     QXT
P2B     LDA     P2-1                    RE-Q
        JMP     QXT
*
*CHECK FOR DISC PARITY.
*
        DAC     P3
P3      PZE
        PZE
        SKS     '621                    SKP PAR ERR NOT DETECTED
        JMP     P3C
        LDA     =-10
        STA     PARC                    SET DISC PARTIY CNTR
        CRA
        STA     DBY0                    CLR DISC BUSY FLAG
        LDA     QAR
        JMP     QXT
P3C     CRA
        STA     DBY0
        IRS     PARC
        JMP     P3E
        LDA     P4-1                    Q TYPE DISC PARITY
P3D     JMP     QXT
P3E     LDA     DAR
        JMP     QXT
*
*TYPE DISC PAIRITY.
*
        DAC     P4
P4      PZE
        PZE
        JST*    OUTL
        DAC     MS5                     PA  DIAC PARITY
        DEC     7
        LDA     P5-1
        STA     QAT
        LDA     P6-1                    Q WAIT FOR TYPE OUT
        JMP     QXT
*
*ABORT AFTER 10 DISC PARITIES.
*
        DAC     P5
P5      PZE
        PZE
        CRA
        STA     BUSY
        STA     OLAY
        JMP*    P5+1
PARC    PZE                             DISC PARITY CNTR
*
*WAIT FOR TYPE OUT.
*
        DAC     P6
P6      PZE
        PZE
```

```
       LDA    TTOF
       SZE
       JMP    P6B
       LDA    QAT
P6A    JMP    QXT
P6B    LDA    P6-1
       JMP    QXT
*
*CALCULATE CK SUM AND COMPARE.
*
       DAC    P7
P7     PZE
       PZE
       LDX    NDX
       LDA    END+19,1        END ADR
       SUB    STRT+19,1       STRT ADR
       TCA
       STA    CNTR            SET WRD CNTR
       CRA
       STA    SUM             INIT SUM
       LDA    STRT+19,1
       STA    AVEC            SET ACCESS VEC
CK5    LDA*   AVEC
       ADD    SUM
       STA    SUM
       IRS    AVEC
       IRS    CNTR
       JMP    CK5
       LDA    END+19,1
       STA    CK7
       LDA*   CK7
       CAS    SUM
       JMP    *+2
       JMP    *+3
       LDA    P8-1            Q TYPE CK SUM
       JMP    QXT
       LDA    P1-1            Q EXECUTION
       JMP    QXT
CK7    PZE
*
*TYPE DISC CK SUM,Q DISC READ AGAIN.
*
       DAC    P8
P8     PZE
       PZE
       JST*   OUTL
       DAC    MS10            DISC CK SUM
       DEC    7
       DAC    P               Q READ AGAIN
       JMP*   P8+1
SUM    PZE
CNTR   PZE
AVEC   PZE
*
*STARTING ADDRESSES OF PROGRAMS.
*
STRT   OCT    600             SHOW CONT DISC LOAD
       OCT                    ENABLE MONITOR -NOT USED-
       OCT                    DISABLE MONITOR -NOT USED-
       OCT                    SPARE
       OCT    700             FILL SHOW DISC
       OCT    700             MONITOR STATUS
       OCT    3000            SETUP
       OCT    354             ANIMATION
       OCT    5000            CHANNEL ASSIGNMENT
       OCT                    PUNCH OFF -NOT USED-
       OCT    1000            END SHOW
       OCT    600             SHOW START
       OCT                    SPARE
       OCT                    SPARES
       OCT
       OCT
       OCT
       OCT
*
*ENDING ADDRESSES OF PROGRAMS.
*
```

```
END   OCT   5777            DISC LOAD SC
      OCT                   ENB MONITOR  -NOT USED-
      OCT                   DISABLE MONITOR -NOT USED-
      OCT                   SPARE
      OCT   2277            FILL SHOW DISC
      OCT   2177            MONITOR STATUS
      OCT   3777            SETUP
      OCT   16777           ANIMATION
      OCT   6777            CHNL ASSIGN
      OCT                   PUNCH OFF-NOT USED-
      OCT   1777            END SHOW
      OCT   7577            SHOW START
      OCT                   SPARE
      OCT                   SPARES
      OCT
      OCT
      OCT
      OCT
*
*EXECUTION ADDRESSES OF PROGRAMS.
*
EXC   OCT   1000            SC DISC LOAD
      OCT                   ENB MONITOR
      OCT                   DISABLE MONITOR
      OCT                   SPARE
      OCT   1001            FILL SHOW DISC
      OCT   1001            MONITOR STATUS
      OCT   3001            SETUP
      OCT   1000            ANIMATION
      OCT   5001            CHNL ASSIGNMENT
      OCT                   PUNCH OFF-NOT USED-
      OCT   1001            END SHOW
      OCT   1001            SHOW START
      OCT                   SPARE
      OCT                   SPARES
      OCT
      OCT
      OCT
      OCT
*
*FORMATTED TRK/SECTOR.
*
TSEC  OCT   5510            SHOW CONT DISC LOAD
      OCT                   ENB MONITOR
      OCT                   DISABLE MONITR/R
      OCT                   SPARE
      OCT   17034           FILL SHOW DISC
      OCT   16540           MONITOR STATUS
      OCT   16500           SETUP
      OCT   17454           ANIMATION
      OCT   16400           CHNL ASSIGN
      OCT                   PUNCH OFF-NOT USED-
      OCT   16614           END SHOW
      OCT   17114           SHOW START
      OCT                   SPARE
      OCT                   SPARES
      OCT
      OCT
      OCT
      OCT
*
*OUTPUT AND LOG.
*
OTL   PZE
      LDA*  OTL             MSG ADR
      STA   OL3
      STA   OL10            SAVE MSG ADR
      SUB   =2
      STA   020A
      IRS   OTL
      LDA*  OTL             NUM OF WORDS
      STA   OL3+1
      SPL
```

```
        TCA
        ADD     =2
        STA     020A+1          SET NUM OF WRDS FOR LOG
        IRS     OTL             INCR FOR NEXT TASK ADR
        LDA*    OTL             NEXT TASK ADR
        STA     OL11
        IRS     OTL             INCR FOR RETURN
        LDA     OL3
        SPL
        JMP     OL5
        JST*    TYPP
OL3     PZE                     MSG ADR
        PZE                     NUM OF WRDS
        LDA     020-1           Q LOG CALL
        JST*    ADTK
        LDA     OL10            MSG ADR
        SUB     =1
        STA     OL10            MSG ADRS-1
        LDA     OL3+1           NUM OF WORDS
        STA*    OL10            SET NUM OF WRDS IN LOG BUF
        JMP*    OTL
OL5     SSP
        STA     OL3
        JMP     OL3-1
OL10    PZE                     MSG ADR
OL11    PZE                     NEXT TASK ADR
*
*Q LOGGING CALL.
*
        DAC     020
020     PZE
        PZE
        LDA     LOGF
        SZE
        JMP     020F            RE-Q
        JST*    LOG
020A    PZE                     LOG BUF BEG ADR
        PZE                     NUM OF LOG BUF WRDS
        LDA     030-1           Q WAIT FOR TYPE
020C    JMP     QXT
020F    LDA     020-1           RE-Q
        JMP     QXT
*
*WAIT FOR TYPE OUT.
*
        DAC     030
030     PZE
        PZE
        LDA     TTOF
        SZE
        JMP     030F            RE-Q
        LDA     OL11            NEXT TASK ADR
        SNZ
        JMP*    030+1
        JMP     QXT
030F    LDA     030-1           RE-Q
        JMP     QXT
*
*OUTPUT.INPUT.LOG.
*
OIL     PZE
        LDA*    OIL             OBUF ADR
        STA     LD5
        IRS     OIL
        LDA*    OIL             OBUF WRDS
        STA     LD5+1
        IRS     OIL
        LDA*    OIL             INBF ADR
        STA     L2A+1
        IRS     OIL
        SSP
        STA     LD20
        LDA*    OIL             INBF WRDS
```

```
        STA    L2A+2
        IRS    OIL
        LDA*   OIL
        IRS    OIL             INCR FOR RETURN
        STA    LD8             STR NEXT TASK ADR
        LDA    LD20            INBF ADR
        SUB    =2
        STA    LD9
        LDA    L2A+1
        SMI
        JMP    LD10
        SSP
        STA    L2A+1
        LDA    LD7             DECIMAL CALL
        STA    L2A
        CRA
        STA*   LD9             SET DECIMAL BUF CODE
        IRS    LD9             SET VEC FOR NUM OF WRDS
        JST*   OUTL
LD5     PZE                    OBUF ADR
        PZE                    OBUF WRDS
        DAC    L2              NEXT TASK ADR
        JMP*   OIL             EXIT
LD6     JST*   ASCI            CALL ASCII INPT
LD7     JST*   IDEC            CALL DECIMAL INPUT
LD8     PZE                    Q THIS AFTER INPUT COMPLETE
LD9     PZE
LD10    LDA    LD6             ASCII CALL
        STA    L2A
        LDA    =1
        STA*   LD9             SET ASCII BUFFER CODE
        IRS    LD9             SET VEC FOR NUM OF WRDS
        JMP    LD5-1
LD20    PZE

*
*CALL PROPER INPUT AND LOG.
*
L2      PZE
        PZE
L2A     JST*   ASCI            CALL DECIMAL OR ASCII INPUT
        PZE                    ADR OF INBF
        PZE                    NUM OF IN WRDS
        LDA    L3-1            Q WAIT FOR INPUT
        JMP    QXT
*
*WAIT FOR INPUT.Q NEXT TASK.
*
        DAC    L3
L3      PZE
        PZE
        LDA    TTIF
        SNZ
        JMP    L3F             RE-Q
        LDA    TTIF            NUM OF WRDS INPUT
        STA*   LD9
        ADD    =2
        STA    L4C+1           SET LOG BUF LENGTH
        CRA
        STA    TTIF
        LDA    L2A+1           INBF ADR
        SUB    =2              LOG BUF BEG ADR
        STA    L4C             SET LOG BUF BEG ADR
        LDA    L4-1            Q LOG INPT
L3B     JMP    QXT
L3F     LDA    L3-1            RE-Q
        JMP    QXT
*
*LOG INPUT.
*
        DAC    L4
L4      PZE
        PZE
        LDA    LOGF
```

```
        SZE
        JMP     L4F             RE-Q
        JST*    LOG
L4C     PZE                     LOG BUF ADR
        PZE                     NUM OF LOG BUF IN WRDS
        LDA     L5-1            Q WAIT FOR LOGGING
L4D     JMP     QXT
L4F     LDA     L4-1            RE-Q
        JMP     QXT
*
*WAIT FOR LOGGING.
*
        DAC     L5
L5      PZE
        PZE
        LDA     LOGF
        SZE
        JMP     L5F             RE-Q
        LDA     LD8             NEXT TASK ADR
        SZE
L5D     JMP     QXT

L5F     LDA     L5-1
        JMP     QXT
*
*LITERALS.
*
        FIN
        ORG     '52000
*
*INITIALIZATION FOR TIME SHARE PROGRAMS.WED 970622.
*
        EXA
        JMP     *+1
        JST     SUP
        HLT
        JMP     *-2
SUP     PZE
        EXA
        JMP     *+1
        OCP     '322            SET INTERLACED FOR CONT 1
        OCP     '323            INTERLACE
        OCP     '324            INTERLACE
        OCP     '325            INTERLACE
        LDX     =-49
        CRA
        STA     SLT             CLR OLD Q ADR
        STA*    SU50,1
        IRS     0
        JMP     *-2
        LDA     SIPP
        STA     '63
        LDA     IDLA
        STA     LAST            INIT LAST
        STA*    NEX
        ENB
        LDA*    PFLG            PWR FAIL FLAG
        SNZ
        JMP     SU10            NOT PWR FLAIL
        CRA
        STA*    PFLG            CLR PWR FAIL FLAG
        LDA     SUA             SETUP CALL LETTERS
        STA*    INBF
        JST     CPR             CALL SETUP
        JMP     EXEC
SU10    LDA     SLT-1           Q SELECT TASK
        JMP     QXT
SU50    DAC     MASK+49
NEX     DAC     NEXT
SUA     BCI     1,SU
PFLG    DAC     PFGG            PWR FAIL FLAG ADR
*
*TIME SHARE EXECUTIVE ROUTINES.WED 970622.
*
```

```
EXEC  INH
      LDA   NEXT
      AOA
      STA   NTRY
      LDA*  NEXT
      SZE
      JMP   *+4
      LDA   IDLA
      STA   IDLE
      STA   LAST
      STA   NEXT
      ENB
      JST*  NTRY
      JMP   EXEC
NEXT  DAC   IDLE
NTRY  PZE
*
*IDLE LOOP
*
IDLA  DAC   IDLE
IDLE  PZE
      PZE
      JMP*  IDLE+1
*
*ROUTINE TO ADD A TASK TO QUEUE
*ENTER WITH ADDRESS OF TASK IN A REGISTER.
*FIRST LOCATION OF TASKMUST BE RESERVED FOR STORAGE OF ADDRESS OF
*NEXT TASK.  SECOND LOCATION OF TASK MUST BE ENTRY POINT.
*
ADDT  PZE
      INH
      STA*  LAST
      STA   LAST
      CRA
      STA*  LAST
      ENB
      JMP*  ADDT
*
*
*TYPE SELECT TASK.
*
      DAC   SLT
SLT   PZE
      PZE
      JST*  OUTL              TYPE AND LOG LESECT TASK
      DAC   MS1               SELECT TASK
      DEC   8
      DAC   TCRL              Q THIS TASK
      JMP*  SLT+1
*
*CALL ASCII INPUT FOR TIMESHARE CONTROL.
*
TCRL  PZE
      PZE
      JST*  ASCI
      DAC   ITIB
      DEC   2
      CRA
      STA   BUSY
      LDA   CT20
      JMP   QXT               Q INPT PROCESSING
*
* TIME SHARE CONTROL.  WED 970622.
*
CTRL  PZE
      PZE                     ENTRY
      LDA   BUSY
      SNZ
      JMP   CT3
      LDA   PCHK
      JMP   QXT
CT3   LDA   ITIF
      SNZ
      JMP   CT5               RE-QUEUE
      JST   PROC              PROCESS INPUT
```

```
           JMP*   CTRL+1
    CT5    LDA    CT20           TASK ADDRESS
           JMP    QXT
    CT20   DAC    CTRL           TASK ADDRESS
    BCHK   DAC    BCK
    *
    *CHECK ASR BUSY.
    *
    BCK    PZE
           PZE
           LDA    BUSY
           SZE
           JMP    BC5
           IRS    BUSY
           LDA    SLT-1          Q SELECT TASK
    BC3    JMP    QXT            Q SELECT TASK
    BC5    LDA    BCHK
           JMP    QXT            Q BUSY CHECK
    *
    * PROCESS TIME SHARE ASR INPUT. WED 970622
    *
    PROC   PZE
           JST*   LOG
           DAC    ITB
           DEC    3
           CRA
           STA    TTIF           CLR INPUT PROCESS FLAG
           JST    CPR
           JMP*   PROC
    *
    * COMPARE TIME SHARE INPUT CONTROL CHARACTERS.
    *
    CPR    PZE
           LDX    =-19
    CR1    LDA    CTBL+19,1
           CAS*   INBF
           JMP    *+2
           JMP    CR5
           IRS    0
           JMP    CR1
           LDA    SLT-1          Q SELECT TASK
    CR3    JST*   ADTK
           JMP*   CPR
    CR5    IRS    BUSY
           LDA    BCHK
           JST*   ADTK           Q CK BUSY
           STX    NDX
           LDA    ADRS+19,1
           JMP    CR3
    *
    * COMPARE TABLE FOR TIME-SHARE TASKS. WED 970622.
    *
    CTBL   BCI    3,DLEMDM       DISC LOAD,EBABLE MONITOR,DISABLE MONITOR
           BCI    3,SPFDMS       SPARE,FILL SHOW DISC. MONITOR STATUS.
           BCI    3,SURACA       SETUP,REQUEST ANIMATION,CHNL ASSIGN
           BCI    3,POESSS       PUNCH OFF,END SHOW,START SHOW.
           BCI    3,SPCSSP       SPARE,CONT SUPERVOSOR,SPARE
           BCI    3,SPSPSP       SPARES
    *
    * TASK ADDRESSES FOR CONTROL SUBJEING.
    *
    ADRS   DAC    PR             DISC LOAD
           OCT    44000          ENABLE MONITOR
           OCT    46742          DISABLE MONITOR
           OCT                   SPARE
           DAC    PR             FILL SHOW DISC
           DAC    PR             MONITOR STATUS OUTPUT
           DAC    PR             ON LINE SETUP
           DAC    PR             ANIMATION
           DAC    PR             DMC CHNL ASSIGN
           DAC    OFP            PUNCH OFF
           DAC    PR             END SHOW
           DAC    PR             SHOW START
           OCT                   SPARE
```

```
        DAC     CS              CONTORL SUPERVISOR CALL
        OCT                     SPARES
        OCT
        OCT
        OCT
TTB     OCT     1
        DEC     1
TTIB    BSS     2               ASR INBF FOR TIMESHARE CONTROL
*
* STANDARD INTERRUPT PROGRAM.
*
SIP     PZE
        STA     SIP9
        CRA
        ACA
        STA     SP12            SAVE C BIT
        SKS     '402            SKP IF HS PUNCH NOT INTERRUPTING
        JMP     SP20            PUNCH INTERRUPT
SIP1    SKS     '401            KSP HS RDR NOT INT
        JMP     SP30
SIP2    SKS     '20             SKP RTC NOT INT
        JST*    TIM
SIP3    SKS     '404            SKP IF ASR NOT INTERRUPTING
        JMP     SIP5
SIP4    LDA     SP12
        ARS     1               RESTORE C
        LDA     SIP9            RESTORE A
        ENB
        JMP*    SIP
SIP5    JST*    SIP8
        JMP     SIP4            EXIT
SP20    JST*    SP10            CALL PUNCH INT PROCESSOR
        JMP     SIP1            CK FOR OTHER INTS
SP30    JST*    SP11            CALL HS READER PROCESSOR
        JMP     SIP2            CK FOR OTHER INTS
SIP9    PZE                     ASTR
SP10    PZE                     PUNCH INT VECTOR
SP11    PZE                     HS READER INT VEC STR
SP12    PZE
TIM     DAC     TIME
*
*HIGH SPEED PAPER TAPE READER INPUT PROGRAM.WED 970622.
*BUFFER ADDRESS FOLLOWS JST.
*BUFFER SIZE FOLLOWS BUFFER ADDRESS.
*
HSRR    PZE
        IRS     BUSY            SET READER BUSY FLAG
        LDA     HRIP
        STA     SP11            SET RDR INTERRUPT VECTOR
        LDA*    HSRR            READER BUFFER BEGIN ADR
        IRS     HSRR
        STA     RBFA            SETUP READER BUFFER STR VEC
        CRA
        STA     XN3
        LDA*    HSRR            NUMBER OF WORDS
        STA     HR40            SAVE NUM OF WORDS
        TCA
        STA     RCTR            SET READER WRD CTR
        IRS     HSRR            INCR FOR RET
        INH
        LDA     MASK
        ANA     ='177577
        ADD     ='200           SET READER MASK BIT
        STA     MASK
        OTA     '20
        ENB
        OCP     1               START PAPER TAPE MOVING
        JMP*    HSRR
HR40    PZE                     NUM OF WORDS STR
HRIP    DAC     HRI             HS READER INT VECTOR
*
*HIGH SPEED READER INTERRUPT PROGRAM.WED 970622.
*INPUTS DECIMAL NUMBERS .CONVERTS TO BINARY.STORES IN SELECTED AREA.
```

-Continued

*COMMA SIGNALS END OF DECIMAL NUM.ALL NON DECIMAL CHARACTERS IGNORED.
*
```
HRI    PZE
       IAB
       STA    HR31                SAVE B
       INA    '1001               INPUT A CHAR
       JMP    *-1
       STA    XN4                 SAVE CHAR
       CAS    ='223               IS CHAR AN X-OFF
       JMP    *+2
       JMP    H13
       CAS    ='254               IS CHAR A COMMA
       JMP    H15
       JMP    *+2
       JMP    H15
       LDA    XN3                 ASSEMBLED OCTAL NUMBER
       STA*   RBFA                STR OCTAL NUMBER
       CRA
       STA    XN3
       IRS    RBFA                INCR STORAGE VEC
       IRS    RCTR                INCR READ WRD CTR
       JMP    H14
H13    OCP    '101                STOP PAPERTAPE MOVEMENT
       LDA    HR40                NUMBER OF WORDS
       ADD    RCTR
       STA    HRPI
       CRA
       STA    RBSY
H14    LDA    HR31
       IAB
       JMP*   HRI                 EXIT
H15    JST    VN                  CK FOR VALID NUM.CONV BIN
       STA    XN4                 ASSEMBLE OCTAL NUM FROM DEC INPUT
       LDA    XN3
       MPY    =10
       IAB
       ADD    XN4
       STA    XN3
       JMP    H14                 EXIT
XN3    PZE
XN4    PZE
HR31   PZE
```
*
*CHECK FOR VALID DECIMAL NUMBER.CONV TO BINARY.
*
```
VN     PZE
       CAS    ='260
       JMP    *+3
       JMP    *+5
       JMP*   HRI                 IGNORE CHAR
       CAS    ='271
       JMP*   HRI                 IGNOR CHAR
       JMP    *+1
       SUB    ='260               CONV TO BIN CHAR
       JMP*   VN
```
*
* HIGH SPEED PAPER TAPE PUNCH OUTPUT PROGRAM.
*
```
HSPP   PZE
       IRS    PBSY                SET PUNCH BUSY FLAG
       OCP    2                   TURN ON PUCH
       LDA*   HSPP                BEG ADR OF PUNCH BUFFER
       STA    PCHA                SAVE PUNCH CHAR ADR
       CRA
       STA    LH
       IRS    HSPP
       LDA*   HSPP                WRD CNT
       IRS    HSPP
       TCA
HS3    STA    POCT                SET PUNCH OUTPUT CNTR
       LDA    POO                 PUNCH INTOUT PROG ADDR
       STA    SP10                SET PNCH PROG ADR IN STD INT PROG
HS4    LDA    ='201
       JST    OUTP                OUTPUT CHAR TO PUNCH
```

```
        INH
        LDA     MASK
        ANA     ='177677          CLR PUNCH MASK
        ADD     ='100             PUNCH INT MASK
        STA     MASK
        OTA     '20
        ENB
        JMP*    HSPP
POO     DAC     HSPO
LH      PZE                       LOWER HALF FLAG FOR PUNCH
*
* HIGH SPEED PUNCH INTERRUPT OUTPUT PROGRAM.
*
HSPO    PZE
        LDA*    PCHA              2 PUNCH CHAR
        STA     H015              SAVE OUTPUT WORD
        LDA     LH                LOWER HALF FLAG
        SZE
        JMP     H05
        IRS     LH
        LDA     H015
        ICA                       INTERCH A
H03     JST     OUTP              OUTPUT CHAR TO PUNCH
H04     JMP*    HSPO              EXIT
H05     CRA
        STA     LH                CLR LOWER HALF FLAG
        IRS     PCHA
        LDA     H015              OUTPUT WORD
        JST     OUTP              OUTPUT CHAR TO PUNCH
        IRS     POCT              INCH PUNCH OUTPUT WRD CTR
        JMP     H04
        LDA     H09               X-OFF PNCH INT VEC
        STA     SP10
        JMP     H04
PCHA    PZE                       PUNCH CHAR ADR
*
*OUTPUT CHAR TO HS PUNCH
*
OUTP    PZE
        OTA     2
        JMP     *+1
        JMP*    OUTP
*
* LAST PUNCH INTERRUPT PROGRAM.
*
H06     PZE
        LDA     MASK
        ANA     ='177677          URN PNCH IBT OFF
        STA     MASK
        OTA     '20
        CRA
        STA     PBSY              CLR PUNCH BUSY FLAG
        JMP*    H06
H07     DAC     H06               LAST PUNCH INT VEC
*
*X-OFF PUNCH INTERRUPT ROUTINE.
*
H08     PZE
        LDA     ='223
        OTA     2
        JMP     *+1
        LDA     H07               LAST PNCH INT VEC
        STA     SP10              SET LAST PNCH INT VEC
        JMP*    H08
H09     DAC     H08
H015    PZE                       2 CHAR STR
*
*INTERRUPT TYPE ROUTINE.
*
TYYP    PZE
        STA     TP30
        IRS     TTOF              SET ASR BUSY OUT FLAG
        IRS     BUSY              SET ASR BUSY FLAG
```

```
        LDA*    TYYP                MSG ADR
        STA     OCHA
        IRS     TYYP
        LDA     MASK
        ANA     ='177737
        ADD     ='40                SET ASR INT MASK BIT
        STA     MASK
        LDA*    TYYP                WRD CNT
        IRS     TYYP                INCR FOR RETURN
        SMI
        JMP     TP10                DO CRLF
TP3     STA     OCTR                SET OUTPUT WRD CNTR
        LDA     TOO
        STA     SIP8                SET ASR INT VEC FOR OUTPUT
TP4     JST     TIO                 OUTPUT A CHAR
TP6     INH
        LDA     MASK
        OTA     '20
        LDA     TP30
        ENB
        JMP*    TYYP
TP10    TCA
        STA     OCTR
        JST     CR
        JMP     TP6
TP30    PZE
TOO     DAC     TIO
*
*CARRIAGE RETURN.
*
CR      PZE
        LDA     ='215
        JST     OUTC
        LDA     LFF
        STA     SIP8
        JMP*    CR
LFF     DAC     LF
*
*LINE FEED.
*
LF      PZE
        LDA     ='212
        JST     OUTC
        LDA     TOO
        STA     SIP8
        JMP*    LF
*
*OUTPUT ASR CHARACTER.
*
OUTC    PZE
        OCP     '104                ENABLE ASR OUTPUT MODE
        OTA     4
        JMP     *+1
        JMP*    OUTC
*
*TELETYPE OUTPUT INTERRUPT PROGRAM.
*
TIO     PZE
        LDA*    OCHA                OUTPUT UPPER HALF
        STA     TO8                 SAVE OUTPUT WRD
        LDA     LHF                 LOWER HALF FLAG
        SZE
        JMP     TO5                 OUTPUT LOWER HALF
        IRS     LHF                 SET LOWER HALF FLG
        LDA     TO8
        ICA                         INTERCH A
TO3     JST     OUTC                OUTPUT A CHAR
TO4     JMP*    TIO                 EXIT
TO5     CRA
        STA     LHF                 CLR LOWER HALF FLAG
        IRS     OCHA                INCR ACCESS VECTOR
        LDA     TO8                 OUTPUT WORD
        JST     OUTC                OUTPUT A CHAR
        IRS     OCTR                INCR OUTPUT WRD CNTR
```

―Continued

```
         JMP    T04                MORE TO OUTPUT
T05B  LDA    107
         STA    SIP8               SET ASR INT VEC TO INIT INPUT
         JMP    T04
T05A  PZE
         CRA
         STA    TTOF
         OCP    4
         JMP*   T05A
T07   DAC    T05A
108   PZE                          2 CHAR STR
LHF   PZE                          LOWER HALF FLAG
*
OCHA  PZE                          ADR OF NEXT WRD FOR OUTPUT
OCTR  PZE                          ASR OUTPUT WRD CNTR
*
*TURN PUNCH OFF.
*
OFP   PZE
         PZE
         OCP    '102               PUNCH OFF
         CRA
         STA    BUSY
         JMP*   OFP+1              EXIT
*
*CALL CONTROL SUPERVISOSR
*
CS    PZE
         PZE
         INH
         CRA
         OTA    '120
         OTA    '20
         JMP*   *+1
         DAC    CSUP               CONTROL SUP ADR
         DEC    1
         PZE
MS10  BCI    7,DISC 0 CK SUM
         BCI    2,
*
*LITERALS.
*
         FIN
         ORG    '53000
*CHECK FOR END OF TAPE.
*
EOT   PZE
         STA    ET20
         ADD    SKS3
         STA    ET2
ET2   SKS    '510               SKP EOT NOT DET
         JMP    ET4
         IRS    EOT
         JMP*   EOT                NORMAL EXIT
ET4   LDA    ET20
         ADD    ='120260
         STA    MSZY
         LDA    ER1
         SZE
         JMP*   EOT                MESSAGE ALREADY Q-ED
         LDA    ET6-1
         JST*   ADTK
         IRS    ER1
         JMP*   EOT
ET20  PZE
SKS3  SKS    '510               SKP EOT NOT DET
ER1   PZE
*
*TYPE END OF TAPE MESSAGE
*
         DAC    ET6
ET6   PZE
         PZE
         LDA    BUSY
```

```
        SZE
        JMP     ET9
        CRA
        STA     ER1
        JST*    TYPP
        DAC     MSZZ
        DEC     9
        JMP     TN6             Q WAIT FOR TYPE
ET9     LDA     ET6-1           RE-Q
        JMP     QXT
*
* CHECK TAPE UNIT ON LINE.
*UNIT NUMBER IN A ON ENTRY.
*
TOL     PZE
        STA     TL5             UIT NUM
        LDA     SKS9
        ADD     TL5
        STA     TL2
TL2     SKS     '110            SKP IF TAPE UNIT ON LINE
        JMP     TL3
        LDA     TL5             UNIT NUM
        IRS     TOL
        JMP*    TOL
TL3     LDA     TL5
        ADD     ='120260
        STA     MS3+5
        LDA     ER2
        SZE
        JMP*    TOL             MESSAGE ALREADY Q-ED
        LDA     TOLL
        JST*    ADTK            Q-UP NOT ON LINE MSG
        IRS     ER2
        JMP*    TOL
TL5     PZE
SKS9    SKS     '110            SKP IF TAPE UNIT ON LINE
ER2     PZE
*
*Q UP NOT ON LINE MESSAGE.
*
TOLL    DAC     TNOL
TNOL    PZE
        PZE
        LDA     BUSY            ASR BUSY FLAG
        SZE
        JMP     TN7             RE-Q
        CRA
        STA     ER2
        JST*    TYPP
        DAC     MS3             TAPE UNIT X NOT ON LINE
        DEC     13
TN6     LDA     TT9-1
        STA     QAT
        LDA     TN9
        JMP     QXT
TN7     LDA     TOLL
        JMP     QXT
TN9     DAC     P6
        DAC     TT9
TT9     PZE
        PZE
        CRA
        STA     BUSY
        JMP*    TT9+1
        DEC     1
        PZE
MS3     BCI     7,TAPE UNIT
        BCI     6,NOT ON LINE
        DEC     1
        PZE
MSZZ    BCI     6,END OF TAPE
        BCI     2,UNIT
MSZY    BCI     1,
*
```

```
* DISC READ. CONTROLLER 0.
* STRT TRK/SEC IN A ON ENTRY.
*
DRR0  PZE
      IRS   DBY0                SET DISC BUSY
      STA   DR0A
      LDA*  DRR0                ADR OF BUF
      IRS   DRR0
      SSM                       SET DMC FOR READ
      STA   '20
      ADD*  DRR0                ADD WRD CNT
      IRS   DRR0
      SUB   =1
      STA   '21                 SET END
      LDA   DR0A                TRK/SEC
      OCP   '321                SET NON-INTERLACE
      OTA   '21                 GIVE STRT TRK/SEC
      JMP   *+1
      JMP*  DRR0                EXIT
DR0A  PZE
*
* DISC READ. CONTROLLER 1.
* STRT TRK/SEC IN A ON ENTRY.
*
DRR1  PZE
      IRS   DBY1
      STA   DR1A                STR STRT TRK/SEC
      LDA*  DRR1                ADR OF BUF
      IRS   DRR1
      SSM
      STA   '22
      ADD*  DRR1                ADD WRD CNT
      IRS   DRR1
      SUB   =1
      STA   '23
      LDA   DR1A
      OCP   '322
      OTA   '22
      JMP   *+1
      JMP*  DRR1
DR1A  PZE
*
* DISC READ. CONTROLLER 2.
* STRT TRK/SEC IN A ON ENTRY.
*
DRR2  PZE
      IRS   DBY2
      STA   DR2A
      LDA*  DRR2
      IRS   DRR2
      SSM
      STA   '24
      ADD*  DRR2
      IRS   DRR2
      SUB   =1
      STA   '25
      LDA   DR2A
      OCP   '323
      OTA   '23
      JMP   *+1
      JMP*  DRR2
DR2A  PZE
*
* DISC READ. CONTROLLER 3.
* STRT TRK/SEC IN A ON ENTRY
*
DRR3  PZE
      IRS   DBY3
      STA   DR3A
      LDA*  DRR3
      IRS   DRR3
      SSM
      STA   '26
      ADD*  DRR3
```

—Continued
```
        IRS     DRR3
        SUB     =1
        STA     '27
        LDA     DRSA
        OCP     '324
        OTA     '24
        JMP     *+1
        JMP*    DRR3
DRSA    PZE
*
*DISC CONTROLLER 0 WRITE.
* STRT TRK/SEC IN A ON ENTRY.
*
DWW0    PZE
        IRS     DBY0                  SET DISC BUSY
        STA     DW0A
        LDA*    DWW0
        IRS     DWW0
        STA     '20
        ADD*    DWW0
        IRS     DWW0
        SUB     =1
        STA     '21
        LDA     DW0A
        OCP     '321                  SET NOT INTERLACED
        OCP     '521                  GIVE WRITE COMMAND
        OTA     '21
        JMP     *+1
        JMP*    DWW0                  EXIT
DW0A    PZE
*
* DISC WRITE. CONTROLLER 1.
* STRT TRK/SEC IN A ON ENTRY.
*
DWW1    PZE
        IRS     DBY1                  SET CONT 1 BUSY
        STA     DW1A
        LDA*    DWW1
        IRS     DWW1
        STA     '22
        ADD*    DWW1
        IRS     DWW1
        SUB     =1
        STA     '23
        LDA     DW1A
        OCP     '322                  SET NON-INTERLACED
        OCP     '522                  GIVE WRITE COMMAND
        OTA     '22
        JMP     *+1
        JMP*    DWW1
DW1A    PZE
*
* DISC WRITE. CONTROLLER 2.
* STRT TRK/SEC IN A ON ENTRY
*
DWW2    PZE
        IRS     DBY2
        STA     DW2A
        LDA*    DWW2
        IRS     DWW2
        STA     '24
        ADD*    DWW2
        IRS     DWW2
        SUB     =1
        STA     '25
        LDA     DW2A
        OCP     '323
        OCP     '523                  GIVE WRITE COMMAND
        OTA     '23
        JMP     *+1
        JMP*    DWW2
DW2A    PZE
*
* DISC WRITE. CONTROLLER 3
```

```
* STRT TRK/SEC IN A ON ENTRY.
*
DWW3 PZE
     IRS    DBY3
     STA    DW3A
     LDA*   DWW3
     IRS    DWW3
     STA    '26
     ADD*   DWW3
     IRS    DWW3
     SUB    =1
     STA    '27
     LDA    DW3A
     OCP    '324
     OCP    '524             GIVE WRITE COMMAND
     OTA    '24
     JMP    *+1
     JMP*   DWW3
DW3A PZE
*
* ASR DECIMAL INPUT PROGRAM.
*
IDC  PZE
     IRS    BUSY             SET ASR BUSY
     IRS    BINP
     LDA    ASR
     STA    SIP8
     LDA*   IDC              BUF BEG ADR
     IRS    IDC
     STA    ABFA             SET UP ASR DECIN STR ADR
     CRA
     STA    YN3
     LDA*   IDC              NUM OF WORDS
     STA    AS40             SAVE NUM OF WRDS
     TCA
     STA    ACTR             SET WRD CNTR
     IRS    IDC
     OCP    4                ENABLE INPUT
     LDA    MASK
     OTA    '20
     ENB
     JMP*   IDC
*
* ASR DECIMAL INPUT INTERRUPT PROGRAM.
*
ASRR PZE
     IAB
     STA    AS31
     INA    '1004            INPUT ASR CHAR
     JMP    *-1
     STA    YN4              SAVE CHAR
     CAS    ='223            IS CHAR X-OFF
     JMP    *+2
     JMP    AS3
     CAS    ='254            IS CHAR COMMA
     JMP    AS5
     JMP    *+2
     JMP    AS5
     LDA    YN3              ASSEMBLED OCTAL NUM
     STA*   ABFA             STR OCTAL NUM
     CRA
     STA    YN3
     IRS    ABFA             INCR STORAGE VEC
     IRS    ACTR             INCR WRD CNTR
     JMP    AS4
AS3  OCP                     TURN OF READER
     LDA    AS40             BUF SIZE
     ADD    ACTR             COMPUTE NUM OF WRDS
     STA    TTIF             STR NUM OF WRDS IN PROCESS FLAG
     CRA
     STA    BINP
AS4  LDA    AS31
     IAB
     JMP*   ASRR             EXIT
```

```
AS5    JST    AN              CK VAL NUM. CONV BIN
       STA    YN4
       LDA    YN3
       MPY    =10
       LGR    1               A LSB TO C
       IAB
       SRC
       SSM                    TAKE CARE OF 65K WRD
       ADD    YN4
       STA    YN3             STR ASSEMBLED OCT NUM
       JMP    AS4             EXIT
AS31   PZE
AS40   PZE
YN3    PZE
YN4    PZE
AC20   PZE
AC25   PZE
AC30   PZE
AC40   PZE
*
*CK VALID NUM.
*
AN     PZE
       CAS    ='260
       JMP    *+3
       JMP    *+5
       JMP    AS4
       CAS    ='271
       JMP    AS4
       JMP    *+1
       SUB    ='260
       JMP*   AN
*
* ASR ASCII INPUT PROGRAM.
*
ACII   PZE
       IRS    BUSY
       IRS    BINP
       LDA    ASI
       STA    SIPB
       LDA*   ACII            BUF ADR
       STA    ABFA            SET UP STORAGE VECTOR
       IRS    ACII
       LDA*   ACII            BUF SIZE
       STA    AC40            SAVE SIZE
       TCA
       STA    ACTR            SET WRD CNTR
       IRS    ACII
       CRA
       STA    AC20            CLR UPPER HALF FLAG
       OCP    4
       LDA    MASK
       OTA    '20
       ENB
       JMP*   ACII
*
* ASR ASCII INPUT INT PROGRAM.
*
ACI    PZE
       STA    AC30            SAVE A
       INA    '1004           INPUT CHAR
       JMP    *-1
       STA    AC25
       CAS    ='254           IS CHAR COMMA
       JMP    *+2
       JMP    AC6             COMMA
       LDA    AC20            UH FLAG
       SZE
       JMP    AC6             THIS IS LOWER HALF CHAR
       IRS    AC20
       LDA    AC25
       ALR    8
       STA*   ABFA
```

```
AC4   LDA    AC30
      JMP*   AC1              EXIT
AC6   LDA*   ABFA             UPPER CHAR
      ADD    AC25             ADD LOWER CHAR
      STA*   ABFA             STR 2 CHAR
      IRS    ABFA
      CRA
      STA    AC20             CLR UPPER CHAR FLAG
      IRS    ACTR
      JMP    AC4
AC8   LDA    AC20             UPPER HALF FLAG
      SNZ
      JMP    AC10
      LDA*   ABFA
      ADD    ='240            ADD SPACE
      STA*   ABFA
      IRS    ABFA
AC10  LDA    AC40             BUF SIZE
      ADD    ACTR             COMPUTE USED WRDS
      ADD    =1
      STA    TTIF             SET PROCESS INPUT FLAG
      JMP    AC4
*
*BINARY TO DECIMAL CONVERSION.
*SIGNED BINARY NUMBER IN A ON ENTRY.
*SIGNED BCD CHARACTERS IN AB ON EXIT.
*
BNDC  PZE
      STA    BND6             SAVE BIN NUM
      STX    BND7             SAVE X
      LDX    =-5
      LDA    BND6             SIGNED BIN NUM
      SPL
      JMP    BND4             NEGATIVE
BND3  IAB
      CRA
      DIV    =10
      IAB                     CHAR TO A
      STA    BND9+5,1         STR CHAR
      IRS    0                FINISHED
      JMP    *-5              NO
      LDA    BND9
      STA    BND8
      LDA    BND9+1
      LGL    4                POSITION 2ND CHAR
      ADD    BND8
      STA    BND8
      LDA    BND9+2
      LGL    8                POSITION 3RD CHAR
      ADD    BND8
      STA    BND8
      LDA    BND9+3
      LGL    12               POSITION 4TH CHAR
      ADD    BND8
      IAB
      LDA    BND6
      SPL
      JMP    BND5
      LDX    BND7             RESTORE NDX
      LDA    BND9+4
      JMP*   BNDC
BND4  LDA    BND6
      TCA
      JMP    BND3
BND5  LDA    BND7
      STA    0
      LDA    BND9+4
      SSM
      JMP*   BNDC
BND6  PZE
BND7  PZE
BND8  PZE
BND9  BSS    5
*
```

*CONVERT BCD TO BINARY.
*FOUR DIGIT BCD IN A ON ENTRY.
*BINARY IN A ON EXIT
*
```
DOC   PZE
      STA    D05
      CRA
      STA    D03
      LDA    0
      STA    D06                   SAVE INDEX
      LDA    =-4
      STA    0
D02   LDA    D05
      ALR    4
      STA    D05
      ANA    ='17
      STA    D04
      LDA    D03
      MPY    =10
      IAB
      ADD    D04
      STA    D03
      IRS    0
      JMP    D02
      LDA    D06
      STA    0
      LDA    D03
      JMP*   DOC
D03   PZE
D04   PZE
D05   PZE
D06   PZE
M1    OCT    1
      DEC    8
MS1   OCT    106612
      BCI    6,SELECT TASK
      OCT    106612
      DEC    1
      PZE
MS5   BCI    9,DISC 0 PARITY
*
*LITERALS.
*
      FIN
      ORG    '54000
*
*TYPE DECIMAL ON LINE.
*
PDC   PZE
      LDA*   PDC                   DEC BUFFER ADDRESS
      IRS    PDC
      STA    AV1                   SET ACCESS VECTOR
      LDA*   PDC
      TCA
      STA    WCTR                  SET WORD CNTR
      IRS    PDC
      LDA*   PDC                   NEXT TASK ADR
      IRS    PDC                   INCR FOR RETURN
      STA    PD1E                  SET NEXT TASK FOR EXEC
      JST    FILL                  FILL ASCII BUFFER WITH SPACES
      LDA    ABBF
      STA    SV1
      LDA*   AV1                   FIRST WORD
      JST*   BND                   CONV TO DEC
      JST    ASCC                  CONV TO ASCII AND STORE
      IRS    AV1
      JST*   OUTL
      DAC    ABUF                  OUTPUT
      DEC    -3
      DAC    PD1
      JMP*   PDC
```
*
*TYPE 1 LINE OF NUMBERS.
*

```
PD1     PZE
        PZE
        LDA     ABBF
        STA     SV1
        JST     FILL            SPACES TO BUFFER
        LDA     =-5
        STA     COLC            SET COLUMN CNTR
PD1A    LDA*    AV1
        IRS     AV1
        JST*    BND
        JST     ASCC
        IRS     WCTR            INCR WRD CNTR
        JMP     *+2
        JMP     PD1C
        IRS     COLC            INCR COLUMN CNTR
        JMP     PD1A
        JST*    OUTL
        DAC     ABUF            TYPE A LINE OF 5 NUMS
        DEC     20
        DAC     PD1             Q NEXT TASK
        JMP*    PD1+1           EXIT
PD1C    LDA     COLC
        ADD     =6
        LGL     2               MPY BY 4
        STA     PD1D
        JST*    OUTL
        DAC     ABUF
PD1D    DEC
PD1E    DEC     0               NEXT TASK ADR
        JMP*    PD1+1
*
*CONVERT BCD TO ASCII AND STORE IN BUFFER
*
ASCC    PZE
        LGL     4
        LLL     4
        ADD     ='130260        CONVERT 1ST 2 DIG TO ASC
        STA*    SV1
        IRS     SV1
        CRA
        LLL     4
        LGL     4
        LLL     4
        ADD     ='130260        CONV 2ND 2 DIG TO ASC
        STA*    SV1
        IRS     SV1
        CRA
        LLL     12
        ADD     ='130240
        STA*    SV1
        IRS     SV1
        IRS     SV1
        JMP*    ASCC
*
*FILL ASCII OUTPUT BUFFER WITH SPACES.
*
FILL    PZE
        LDX     =-20
        LDA     ='120240
        STA*    FL5,1
        IRS     0
        JMP     *-2
        JMP*    FILL
FL5     DAC     ABUF+20
COLC    PZE                     COLUMN COUNTER
AV1     PZE                     ACCESS VECTOR
WCTR    PZE                     WORD CNTR
ACCY    PZE
SV1     PZE                     STORAGE VEC
        DEC     1
        PZE
ABUF    BSS     20              ASCII BUF FOR DEC OUTPUT
ABBF    DAC     ABUF
*
```

```
* TIME PROGRAM.
*
TIME  PZE
      OCP   '20
      LDA   =-60
      STA   '61
      IRS   SEC          INCR SECONDS
      IRS   SCTR         INCR SECONDS CNTR
      JMP*  TIME
      CRA
      STA   SEC          CLR SECONDS
      LDA   =-60
      STA   SCTR
      IRS   MIN
      IRS   MCTR         INCR MINUTE CNTR
      JMP*  TIME
      CRA
      STA   MIN          CLR MINUTES
      LDA   =-60
      STA   MCTR         BET MINUTE CNTR
      IRS   HOUR
      IRS   HCTR
      JMP*  TIME
      CRA
      STA   HOUR         CLR HOURS
      LDA   =-24
      STA   HCTR
      IRS   DAY          INCR DAY
      IRS   DCTR         INCR DAY CNTR
      JMP*  TIME
      LDA   =1
      STA   DAY
      LDA   ML
      TCA
      STA   DCTR         RESET DAY CNTR TO MONTH LENGTH
      IRS   MON          INCR MONTH
      IRS   MCNT         INCR MONTH CNT
      JMP*  TIME
      LDA   =-12
      STA   MCNT
      IRS   YEAR
      LDA   =1
      STA   MON
      JMP*  TIME
*
* MAGNETIC TAPE READ PROGRAM.
* UNIT NUMBER IN A.
* BUFFER ADDRESS FOLLOWS JST.
* WRD CNT FOLLOWS BUF ADDRESS.
*
MTR   PZE
      IRS   MTSY         SET MAG TAPE BUSY
      STA   MT5          STR UNIT NUM
      LDA   OCP8         READ BIN OCP
      ADD   MT5          ADD UNIT NUM
      STA   M13
      LDA*  MTR          BUF ADR
      SSM
      STA   '30          SET DMC STRT ADR
      IRS   MTR
      LDA*  MTR
      SUB   =1
      ADD   '30
      STA   '31          SET DMC END ADR
MT3   OCP   '110         READ BINARY RECORD
      IRS   MTR
      JMP*  MTR          EXIT
OCP8  OCP   '110         READ BINARY OCP
MT5   PZE
* MAG TAPE WRITE PROGRAM.
* UNIT NUM IN A.
* BUFFER ADDRESS FOLLOWS JST.
* WRD CNT FOLLOWS BUFFER ADDRESS.
*
```

```
MTW     PZE
        IRS     MTSY            SET MAG TAPE BUSY
        STA     MT5
        LDA     OCP9            WRITE BINARY OCP
        ADD     MT5             ADD UNIT NUM
        STA     MW3
        LDA*    MTW             BUF ADR
        STA     '30             SET DMC STRT ADR
        IRS     MTW
        LDA*    MTW             WRD CNT
        SUB     =1
        ADD     '30
        STA     '31             SET DMC END ADR
MW3     OCP     '510            WRITE BINARY OCP
        IRS     MTW
        JMP*    MTW             EXIT
OCP9    OCP     '510            WRITE BIN OCP
*
*LITERALS.
*
        FIN
        ORG     '55000
*
*       ANIMATION SOFTWARE ASR MESSAGES
*
        DEC     1
        PZE
AM01    BCI     3,NAME
        DEC     1
        PZE
AM02    BCI     5,PROG NO.
        DEC     1
        PZE
AM03    BCI     5,XMTR NO.
        DEC     1
        PZE
AM04    BCI     9,2 CONS ON THIS SHW
        DEC     1
        PZE
AM05    BCI     9,XMTR CLAIMED
        DEC     1
        PZE
AM06    BCI     9,NO DMC ASSIGN
        DEC     1
        PZE
AM07    BCI     5,RCVR NO.
        DEC     1
        PZE
AM08    BCI     7,WORK TAPE NO.
        DEC     1
        PZE
AM09    BCI     9,RCVR CLAIMED
        DEC     1
        PZE
AM10    BCI     9,SCRATCH TAPE NO.
        DEC     1
        PZE
AM11    BCI     9,TAPE CLAIMED
        DEC     1
        PZE
AM12    BCI     6,NO DMC FOR C
        BCI     4,ONS XMTR
        DEC     1
        PZE
AM13    BCI     5,DISC NO.
        DEC     1
        PZE
AM14    BCI     7,NEW WORK TAPE
        DEC     1
        PZE
AM15    BCI     9,DISC CLAIMED
        DEC     1
        PZE
```

-Continued

```
AM16 BCI    9,DISC NOT ON LINE
     DEC    1
     PZE
AM17 BCI    9,PAR ERR TAPE
     DEC    1
     PZE
AM18 BCI    9,EOT TAPE
     DEC    1
     PZE
AM19 BCI    9,EOF TAPE
     DEC    1
     PZE
AM20 BCI    9,WRONG TAPE UNIT X
     DEC    1
     PZE
AM21 BCI    6,LIST OVLYS*
     DEC    1
     PZE
AM22 BCI    8,LIST CHNL SETS*
     DEC    1
     PZE
AM23 BCI    9,PAR ERR DISC
     DEC    1
     PZE
AM24 BCI    6,LIST MACROS*
     DEC    1
     PZE
AM25 BCI    6,NO.CHNL FT
     DEC    1
     PZE
AM26 BCI    9,EXCEEDS DISC
     DEC    1
     PZE
AM27 BCI    6,LOAD MACROS*
     DEC    1
     PZE
AM28 BCI    7,DEFINE MACROS*
     DEC    1
     PZE
AM29 BCI    7,DEFINE OVLYS*
     DEC    1
     PZE
AM30 BCI    9,DEFINE CHNL SETS*
     DEC    1
     PZE
AM31 BCI    5,CONS NO.
     DEC    1
     PZE
AM32 BCI    9,SIGN ON ABORTED
     DEC    1
     PZE
MS33 BCI    9,SYS DISC CKSUM
     DEC    1
     PZE
AM34 BCI    9,ID REEL NOT MOUNTED
*
     DEC    1
     PZE
AM35 BCI    9,NEXT REEL UNIT X
     DEC    1
     PZE
AM36 BCI    9,MOUNT ID REEL-UNIT
     BCI    1, X
     DEC    1
     PZE
AM37 BCI    9,TAPE X NOT ON LINE
     END
*SIGN-ON.
```

```
*
ADTK  EQU   '101
TTOL  EQU   '131
TOIL  EQU   '132
DMCT  EQU   '144
TAFL  EQU   '337
DAFL  EQU   '343
SDCF  EQU   '327
OVFL  EQU   '304
RAFL  EQU   '305
PMSK  EQU   '315
TTCF  EQU   '301
TCCF  EQU   '325
CCTS  EQU   '162
ISTS  EQU   '164
QXT   EQU   '270
AM01  EQU   '55002
AM02  EQU   '55007
AM03  EQU   '55016
AM04  EQU   '55025
AM05  EQU   '55040
AM06  EQU   '55053
AM07  EQU   '55066
AM08  EQU   '55075
AM09  EQU   '55106
AM10  EQU   '55121
AM11  EQU   '55134
AM12  EQU   '55147
AM13  EQU   '55163
AM14  EQU   '55172
AM15  EQU   '55203
AM16  EQU   '55216
AM17  EQU   '55231
AM18  EQU   '55244
AM19  EQU   '55257
AM20  EQU   '55272
AM21  EQU   '55305
AM22  EQU   '55315
AM23  EQU   '55327
AM24  EQU   '55342
AM25  EQU   '55352
AM26  EQU   '55362
AM27  EQU   '55375
AM28  EQU   '55405
AM29  EQU   '55416
AM30  EQU   '55427
AM31  EQU   '55442
AM32  EQU   '55451
AM33  EQU   '55464
AM34  EQU   '55477
AM35  EQU   '55512
AM36  EQU   '55525
AM37  EQU   '55541
      ORG   '354
COC1  PZE         BEG ADR VEC FOR CONS XMTR DMC
COC2  PZE         END ADR VEC FOR CONS XMTR DMC
SCOC  PZE
SRPT  PZE
CWHF  PZE
COBF  PZE
CWBP  PZE
ASFL  PZE
ICT1  PZE         123 PPS INTERRUPT COUNTS
ICT2  PZE
SLTA  BSS   1
SNDX  PZE         SHOW INDEX
MCFL  PZE         MACRO CALL FLG.1 CONS AT A TIME
DCFL  PZE         DISC CLAIM BY CONTROLLER
      PZE
      PZE         SPARE
TEMP  BSS   2
CNOA  BSS   1
IQUA  BSS   1
DM4A  BSS   1
```

```
DSPA  BSS  1
CI1A  BSS  1
RTEP  BSS  1
IM3A  BSS  1
VOPA  BSS  1
CPOA  BSS  1
ITOA  BSS  1
JOOA  BSS  1
IL2A  BSS  1
SD1A  BSS  1
SA1A  BSS  1
CKOA  BSS  1
CM4A  BSS  1
CL2A  BSS  1
SDCA  BSS  1
SMCA  BSS  1
SKFA  BSS  1
ACA   BSS  1
SIPA  BSS  1
'OLO  BSS  1
M4A   BSS  1
IFRA  BSS  1
IPRA  BSS  1
000   BSS  2          P          PROGRAM DEFINITION FLAG
001   BSS  1
002   BSS  1
003   BSS  1
004   BSS  1
005   BSS  1
006   BSS  1
007   BSS  1
008   BSS  1
009   BSS  1
010   BSS  1
011   BSS  1
012   BSS  1
013   BSS  1
014   BSS  1
015   BSS  1
016   BSS  1
017   BSS  1
018   BSS  1
BEP   BSS  1
020   BSS  1
021   BSS  1
BFL   BSS  1
023   BSS  1
024   BSS  1
VFL   BSS  1
026   BSS  1
027   BSS  1
028   BSS  1
      PZE            SPARE
030   BSS  1
031   BSS  1
032   BSS  1
033   BSS  1
034   BSS  1
036   BSS  1
      PZE            SPARE
C1A   BSS  1
C2A   BSS  1
C3A   BSS  1
POA   BSS  1
PSA   BSS  1
OA    BSS  1
JOA   BSS  1
314   BSS  1
315   BSS  1
316   BSS  1
317   BSS  1
318   BSS  1
IOA   BSS  1
ITA   BSS  1
```

―Continued

```
FCIA BSS  1
1322 BSS  1
     BSS  1
1323 BSS  1
     BSS  1
1324 BSS  1
     BSS  1
1325 BSS  1
     BSS  1
1326 BSS  1
     BSS  1
1327 BSS  1
     BSS  1
FAOA BSS  1
1330 BSS  1
1331 BSS  1
1332 BSS  1
1333 BSS  1
1334 BSS  1
CIOA BSS  1
1604 BSS  1
1612 BSS  1
1613 BSS  1
NDBA BSS  1
1641 BSS  1
1667 BSS  1
1668 BSS  1
1669 BSS  1
     PZE              SPARE
1674 BSS  1
1675 BSS  1
1676 BSS  1
1677 BSS  1
1678 BSS  1
PPPA BSS  1
PBFA BSS  1
OLPA BSS  1
FSFA BSS  1
ERFA BSS  1
PCSA BSS  1
SW1A BSS  1
SW2A BSS  1
SW3A BSS  1
RTS4 BSS  1
SW5A BSS  1
SW6A BSS  1
SW7A BSS  1
SW8A BSS  1
SW9A BSS  1
SWAA BSS  1
DITA BSS  1
DWIA BSS  1
FNBA BSS  1
MAGA BSS  1
DSOA BSS  1
AIOA BSS  1
SOOA BSS  1
TSP1 PZE              TEMPORARY STORAGE
TSP2 PZE
TSP3 PZE
TSP4 PZE
TSC1 PZE
TSC2 PZE
CNSI PZE              CONSOLE INDEX DURING SIGN ON
NOCA PZE              NUMBER OF CONSOLES ACTIVE
SHOI PZE              SHOW INDEX DURING SIGN-ON
CDMC PZE              CONSOLE XMTR DMC NUM
TDMC PZE              XMTR DMC CHNL NUM STR
RDMC PZE              CONSOLE RCVR DMC NUMBER
RDNW PZE              SYS DISC READ NUM OF WRDS
RDTS PZE              SYS DISC READ TRK/SEC
RDER PZE              PARITY ERR ROUTINE ADDRESS
RDNT PZE              NEXT TASK AFTER SYS DISC READ
```

```
RDBA PZE              DISC READ INPT ADR
TMEF PZE              TAPE MERGE ERROR FLAG
POBF PZE              SECONDARY OVERLAY AREA BUSY FLAG
     PZE              SPARE
CCAE DAC    CCV0      VECTOR TO SIGN ON ABORT TASK
RDEP BSS    1
1104 BSS    1
1105 BSS    1
1106 BSS    1
1107 BSS    1
1201 DAC    NEWT
1202 DAC    PRNO      PROGRAM NUMBER
1205 BSS    1
1206 BSS    1
1207 BSS    1
1208 BSS    1
1209 BSS    1
1210 BSS    1
1211 BSS    1
1212 BSS    1
1213 BSS    1
1214 BSS    1
1215 BSS    1
1216 BSS    1
1217 BSS    1
1218 BSS    1
1219 BSS    1
1226 DAC    WTNO      WORK TAPE NUMBER BY SHOW
1229 DAC    TTRF      ASR RELEASE FLAGS VECTOR
1233 DAC    MXTS      MAX. SHOW DISC TRACK/SECTOR VECTOR
     PZE              SPARE
1302 DAC    RECN      DMC CHNL NO. FOR CONS. SCNR
1305 DAC    STNO      SCRATCH TAPE NUMBER
1310 DAC    WDNO      WORK DISC NUM BY SHOW
1312 DAC    TRCF      XMTR CLAIM FLAG VECTOR
1313 DAC    RCFL      RECIEVER CLAIM FLAG VECTOR
1328 DAC    NCTS      NO. CONSOLES ACTIVE THIS SHOW VECTOR
1340 DAC    CNSA      CONSOLE INDEX AVAILABLE BY SHOW
1600 DAC    NTRC      NO. TAPE RESIDENT CHNL SETS
1601 DAC    NDRC      NO. DISC RESIDENT CHNL SETS
1602 DAC    PCFL      PERIPHERAL CLAIM FLAG VECTOR
1603 DAC    CNDX      CONSOLE INDEX BY SHOW VECTOR
1606 BSS    1
1607 BSS    1
1608 BSS    1
1609 DAC    STDS      START TEMP. DISC STORAGE VECTOR BY SHOW
1610 BSS    1
1611 DAC    ETDS      END TEMP. DISC STORAGE VECTOR BY SHOW
1615 BSS    1
1616 BSS    1
1620 DAC    OVLN      TOTAL NUM OF OVLYS BY SHOW VEC
1627 BSS    1
1628 DAC    NDRO      NO. DISC RESIDENT OVERLAYS VECTOR
1642 DAC    NTRO      NO. TAPE RESIDENT OVERLAYS VECTOR
1643 BSS    1
1644 BSS    1
1647 BSS    1
1653 BSS    1
1654 BSS    1
1655 BSS    1
1656 BSS    1
1657 BSS    1
1658 BSS    1
1670 DAC    NCHF      NUMBER OF CHNL FEET RESERVED VECTOR
IDRA BSS    1
1685 DAC    CHSN      TOTAL NUMBER OF CHNL SETS BY SHOW
BTKA BSS    1
POEA BSS    1
CCPA BSS    1
BREA BSS    1
BRNA BSS    1
DMTA BSS    1
     PZE              SPARE
NDMA DAC    NDRM      NUM OF DISC RESIDENT MACROS
DRMA BSS    1
DMNA BSS    1
```

―Continued

```
MCRN PZE              NUM OF LAST MACRO DEFINED
CUP  PZE              Q THIS AFTER LIST CHNL SETS.OVLYS.MACROS.
ASNX BSS    1
ASSW HSS    1
PPUA BSS    1
CMCA BSS    1
NLAC PZE
MDCA DAC    MDCF
MDGA DAC    MDOF
WDFA DAC    WDFF
     PZE              SPARE
1700 BSS    1
1701 BSS    1
1702 BSS    1
1703 BSS    1
1704 DAC    SHNO      SHOW AND SUBSHOW NO.S BY SHOW
ASUA BSS    1
ASWA BSS    1
ASTA BSS    1
     PZE              SPARE
     PZE              SPARE
     PZE              SPARE
     PZE              SPARE
     PZE              SPARE
     PZE              SPARE
STMP BSS    2         SEC. OVERLAY TEMP STORAGE WORDS
EMTV BSS    2         EXTENDED MODE TRANSFER VECTOR
CKMA BSS    1
*                     STORAGE WORDS
*
*    ANIMATION CONSOLE SIGN-ON ROUTINE
*
*
     FIN
     ORG    '1000
*
*REQUEST NAME.
*
CC00 PZE
     DAC    *0
     JST*   TOIL      REQUEST AND INPUT
     DAC    AM01      ANIMATORS NAME
     DEC    3
     DAC    CCTS      INPUT STORAGE
     DEC    2
CC01 DAC    CC05      NEXT TASK
     JMP*   CC00+1
     BSS    2
PRNO PZE              PROGRAM NUMBER/SHOW
     BSS    2
TRNO PZE              XMTR NUM/SHOW
     BSS    2
WTNO PZE              WORKING TAPE NUMS
     BSS    2
STNO PZE              SCRATCH TAPE NUM
     BSS    2
WDNO PZE              WORKING DISC CONTROLLER NUM
     BSS    2
NEWT PZE              NEW WORK TAPE Y,N
RECN BSS    2         RECIEVER NO.
NDRO PZE              NUM OF DISC RESID OVLYS
```

We claim:
1. In a system for the acquisition of data for the sequential control of an animated presentation,
a plurality of variably positionable devices, each connected to be proportionally positioned according to supplied units of transmitted data, said devices connected to control said animated presentation,
manually positionable means for setting in accordance with the position of a selected one of said devices,
means for generating electrical signals in accordance with said setting,
means for generating timing signals incrementing at a predetermined rate,
means for storing said electrical signals in association with said timing signals,
means for shifting said electrical signals in said storing means for storage in association with different ones of said timing signals,
means for retrieving said electrical signals from said storing means and transmitting said signals to said selected one of said devices.

* * * * *

UNITED STATES PATENT OFFICE
CERTIFICATE OF CORRECTION

Patent No. 3,898,438                    Dated August 5, 1975

Inventor(s) ROBERT A. NATER, WILLIAM H. ROBERTS

It is certified that error appears in the above-identified patent and that said Letters Patent are hereby corrected as shown below:

Column 10, line 67, change "14.616" to -- 13.818 --.

IN THE DRAWING, FIGURE 5, block 163, change the legend from "SET PROCESSING TO MOVE LAST FRAME LAST" to -- SET PROCESSING TO MOVE LAST FRAME FIRST --.

Signed and Sealed this

Thirteenth Day of November 1979

[SEAL]

Attest:

RUTH C. MASON
Attesting Officer

LUTRELLE F. PARKER
Acting Commissioner of Patents and Trademarks